US010675819B2

(12) United States Patent
Li et al.

(10) Patent No.: US 10,675,819 B2
(45) Date of Patent: *Jun. 9, 2020

(54) MAGNETIC FIELD ALIGNMENT OF EMULSIONS TO PRODUCE POROUS ARTICLES

(71) Applicants: Massachusetts Institute of Technology, Cambridge, MA (US); Northeastern University, Boston, MA (US)

(72) Inventors: Linsen Li, Malden, MA (US); Jonathan Samuel Sander, Zurich (CH); Yet-Ming Chiang, Weston, MA (US); Randall Morgan Erb, Newton, MA (US)

(73) Assignees: Massachusetts Institute of Technology, Cambridge, MA (US); Northeastern University, Boston, MA (US)

( * ) Notice: Subject to any disclaimer, the term of this patent is extended or adjusted under 35 U.S.C. 154(b) by 687 days.

This patent is subject to a terminal disclaimer.

(21) Appl. No.: 15/390,295

(22) Filed: Dec. 23, 2016

(65) Prior Publication Data
US 2017/0173893 A1    Jun. 22, 2017

Related U.S. Application Data

(63) Continuation-in-part of application No. 14/874,253, filed on Oct. 2, 2015.
(Continued)

(51) Int. Cl.
*B29C 67/20* (2006.01)
*B03C 1/32* (2006.01)
(Continued)

(52) U.S. Cl.
CPC .............. *B29C 67/202* (2013.01); *B03C 1/32* (2013.01); *H01F 1/447* (2013.01); *H01M 4/04* (2013.01);
(Continued)

(58) Field of Classification Search
CPC .................................................... B29C 67/202
See application file for complete search history.

(56) References Cited

U.S. PATENT DOCUMENTS 3,284,243 A    11/1966    Von Sturm
3,765,943 A    10/1973    Biagetti
(Continued)

FOREIGN PATENT DOCUMENTS

CA    2270771    10/2000
CA    2426156 C    4/2011
(Continued)

OTHER PUBLICATIONS

International Search Report and Written Opinion in International Patent Application No. PCT/US2015/053761, dated Feb. 18, 2016.
(Continued)

*Primary Examiner* — Monica A Huson
*Assistant Examiner* — Kelsey C Grace
(74) *Attorney, Agent, or Firm* — Wolf, Greenfield & Sacks, P.C.

(57) ABSTRACT

The use of magnetic fields in the production of porous articles is generally described. Certain embodiments are related to methods of producing porous articles in which magnetic fields are applied to an emulsion to align emulsion droplets. In some embodiments, after the emulsion droplets have been aligned, the emulsion droplets and/or the medium surrounding the emulsion droplets can be removed to leave behind a porous article. According to certain embodiments, polyvinyl alcohol can be used, for example, to stabilize the
(Continued)

emulsion droplets and/or bind together components of the porous article. In some embodiments, water-soluble liquid alcohol can be used, for example, to stabilize the suspension of electronically conductive material within a phase of the emulsion.

20 Claims, 18 Drawing Sheets

Related U.S. Application Data

(60) Provisional application No. 62/347,475, filed on Jun. 8, 2016, provisional application No. 62/217,554, filed on Sep. 11, 2015, provisional application No. 62/059,315, filed on Oct. 3, 2014.

(51) Int. Cl.
| | |
|---|---|
| *H01M 4/525* | (2010.01) |
| *H01M 4/62* | (2006.01) |
| *H01M 4/04* | (2006.01) |
| *H01F 1/44* | (2006.01) |
| *H01M 4/131* | (2010.01) |
| *H01M 4/505* | (2010.01) |
| *H01M 4/1391* | (2010.01) |
| *H01M 4/587* | (2010.01) |
| *B29K 29/00* | (2006.01) |
| *B29K 105/00* | (2006.01) |
| *B29L 31/34* | (2006.01) |
| *H01M 4/02* | (2006.01) |

(52) U.S. Cl.
CPC ......... *H01M 4/131* (2013.01); *H01M 4/1391* (2013.01); *H01M 4/505* (2013.01); *H01M 4/525* (2013.01); *H01M 4/587* (2013.01); *H01M 4/623* (2013.01); *H01M 4/625* (2013.01); *B29K 2029/04* (2013.01); *B29K 2105/0064* (2013.01); *B29K 2995/0005* (2013.01); *B29K 2995/0008* (2013.01); *B29L 2031/3468* (2013.01); *H01M 2004/021* (2013.01)

(56) References Cited

U.S. PATENT DOCUMENTS

| | | |
|---|---|---|
| 3,864,167 A | 2/1975 | Broadbead et al. |
| 4,245,016 A | 1/1981 | Rampel |
| 4,555,454 A | 11/1985 | Shuster et al. |
| 4,579,637 A | 4/1986 | Jaisinghani et al. |
| 4,599,114 A | 7/1986 | Atkinson |
| 4,615,784 A | 10/1986 | Stewart et al. |
| 4,668,596 A | 5/1987 | Shacklette et al. |
| 4,758,483 A | 7/1988 | Armand et al. |
| 4,804,592 A | 2/1989 | Vanderborgh et al. |
| 4,889,777 A | 12/1989 | Akuto |
| 5,100,747 A | 3/1992 | Hayashida et al. |
| 5,187,209 A | 2/1993 | Hirai et al. |
| 5,213,895 A | 5/1993 | Hirai et al. |
| 5,227,267 A | 7/1993 | Goebel et al. |
| 5,294,504 A | 3/1994 | Otagawa et al. |
| 5,338,625 A | 8/1994 | Bates et al. |
| 5,399,447 A | 3/1995 | Chaloner-Gill et al. |
| 5,405,937 A | 4/1995 | Lemaire et al. |
| 5,436,093 A | 7/1995 | Huang et al. |
| 5,441,830 A | 8/1995 | Moulton et al. |
| 5,464,707 A | 11/1995 | Moulton et al. |
| 5,478,676 A | 12/1995 | Turi et al. |
| 5,518,833 A | 5/1996 | Repplinger et al. |
| 5,520,850 A | 5/1996 | Chaloner-Gill et al. |
| 5,527,641 A | 6/1996 | Koshiishi et al. |
| 5,554,459 A | 9/1996 | Gozdz et al. |
| 5,567,754 A | 10/1996 | Stramel |
| 5,578,396 A | 11/1996 | Fauteux et al. |
| 5,587,253 A | 12/1996 | Gozdz et al. |
| 5,588,971 A | 12/1996 | Fauteux et al. |
| 5,589,297 A | 12/1996 | Koga et al. |
| 5,591,544 A | 1/1997 | Fauteux et al. |
| 5,624,605 A | 4/1997 | Cao et al. |
| 5,635,138 A | 6/1997 | Amatucci et al. |
| 5,645,781 A | 7/1997 | Popovic' et al. |
| 5,654,115 A | 8/1997 | Hasebe et al. |
| 5,677,080 A | 10/1997 | Chen |
| 5,698,342 A | 12/1997 | Klein |
| 5,705,291 A | 1/1998 | Amatucci et al. |
| 5,714,053 A | 2/1998 | Howard et al. |
| 5,733,683 A | 3/1998 | Searson et al. |
| 5,759,714 A | 6/1998 | Matsufuji et al. |
| 5,769,996 A | 6/1998 | McArdle et al. |
| 5,789,100 A | 8/1998 | Burroughs et al. |
| 5,821,033 A | 10/1998 | Cromack et al. |
| 5,827,615 A | 10/1998 | Touhsaent et al. |
| 5,834,136 A | 11/1998 | Gao et al. |
| 5,840,087 A | 11/1998 | Gozdz et al. |
| 5,843,292 A | 12/1998 | Spiros |
| 5,846,675 A | 12/1998 | Sazhin et al. |
| 5,888,670 A | 3/1999 | Kawakami |
| 5,897,522 A | 4/1999 | Nitzan |
| 5,902,689 A | 5/1999 | Vleggar et al. |
| 5,910,382 A | 6/1999 | Goodenough et al. |
| 5,925,283 A | 7/1999 | Taniuchi et al. |
| 5,949,213 A | 9/1999 | Lanni |
| 6,063,519 A | 5/2000 | Barker et al. |
| 6,063,525 A | 5/2000 | LaFollette |
| 6,069,221 A | 5/2000 | Chasser et al. |
| RE36,843 E | 8/2000 | Lake et al. |
| 6,096,453 A | 8/2000 | Grunwald |
| 6,096,454 A | 8/2000 | Tran et al. |
| 6,096,494 A | 8/2000 | Tang et al. |
| 6,117,593 A | 9/2000 | Stachoviak et al. |
| 6,120,940 A | 9/2000 | Poehler et al. |
| 6,136,476 A | 10/2000 | Schutts et al. |
| 6,156,453 A | 12/2000 | Shimizu et al. |
| 6,159,389 A | 12/2000 | Miura et al. |
| 6,174,623 B1 | 1/2001 | Shackle |
| 6,190,798 B1 | 2/2001 | Okada et al. |
| 6,231,779 B1 | 5/2001 | Chiang et al. |
| 6,242,124 B1 | 6/2001 | Saito et al. |
| 6,280,875 B1 | 8/2001 | Kwak et al. |
| 6,280,879 B1 | 8/2001 | Andersen et al. |
| 6,287,720 B1 | 9/2001 | Yamashita et al. |
| 6,291,097 B1 | 9/2001 | Barker et al. |
| 6,300,016 B1 | 10/2001 | Jan et al. |
| 6,306,540 B1 | 10/2001 | Hiroi et al. |
| 6,322,924 B1 | 11/2001 | Hirahara et al. |
| 6,337,156 B1 | 1/2002 | Narang et al. |
| 6,342,317 B1 | 1/2002 | Patel et al. |
| 6,358,645 B1 | 3/2002 | Furukawa et al. |
| 6,376,393 B1 | 4/2002 | Newton et al. |
| 6,395,429 B1 | 5/2002 | Kang et al. |
| 6,403,263 B1 | 6/2002 | Roach |
| 6,410,189 B1 | 6/2002 | Yamada et al. |
| 6,413,284 B1 | 7/2002 | Chu et al. |
| 6,413,285 B1 | 7/2002 | Chu et al. |
| 6,432,585 B1 | 8/2002 | Kawakami et al. |
| 6,451,487 B1 | 9/2002 | Besner et al. |
| 6,454,977 B1 | 9/2002 | Kwok et al. |
| 6,495,283 B1 | 12/2002 | Yoon et al. |
| 6,511,780 B1 | 1/2003 | Veregin et al. |
| 6,528,033 B1 | 3/2003 | Barker et al. |
| 6,555,268 B1 | 4/2003 | Inoue et al. |
| 6,565,763 B1 | 5/2003 | Asakawa et al. |
| 6,599,662 B1 | 7/2003 | Chiang et al. |
| 6,645,675 B1 | 11/2003 | Munshi |
| 6,664,006 B1 | 12/2003 | Munshi |
| 6,730,438 B2 | 5/2004 | Nakanishi et al. |
| 6,753,111 B2 | 6/2004 | Kweon et al. |
| 6,764,525 B1 | 7/2004 | Whitacre et al. |
| 6,783,894 B2 | 8/2004 | Kajiura et al. |
| 6,787,232 B1 | 9/2004 | Chiang et al. |
| 6,797,435 B2 | 9/2004 | Kweon et al. |

(56) References Cited

U.S. PATENT DOCUMENTS

| | | |
|---|---|---|
| 6,800,399 B2 | 10/2004 | Matsumoto |
| 6,818,356 B1 | 11/2004 | Bates |
| 6,844,105 B1 | 1/2005 | Hanafusa et al. |
| 6,855,273 B2 | 2/2005 | Ravet et al. |
| 6,878,487 B2 | 4/2005 | Cho et al. |
| 6,982,132 B1 | 1/2006 | Goldner et al. |
| 7,026,071 B2 | 4/2006 | Mayes et al. |
| 7,033,702 B2 | 4/2006 | Dasgupta et al. |
| 7,087,348 B2 | 8/2006 | Holman et al. |
| 7,090,785 B2 | 8/2006 | Chiang et al. |
| 7,318,982 B2 | 1/2008 | Gozdz et al. |
| 7,338,734 B2 | 3/2008 | Chiang et al. |
| 7,387,851 B2 | 6/2008 | Gozdz et al. |
| 7,553,584 B2 | 6/2009 | Chiang et al. |
| 7,579,112 B2 | 8/2009 | Chiang et al. |
| 7,662,265 B2 | 2/2010 | Chiang et al. |
| 7,763,382 B2 | 7/2010 | Riley et al. |
| 7,781,098 B2 | 8/2010 | Chiang et al. |
| 7,988,746 B2 | 8/2011 | Chiang et al. |
| 8,148,009 B2 | 4/2012 | Chiang et al. |
| 8,168,326 B2 | 5/2012 | Chiang et al. |
| 8,277,975 B2 | 10/2012 | Chiang et al. |
| 9,065,093 B2 | 6/2015 | Chiang et al. |
| 10,164,242 B2 | 12/2018 | Chiang et al. |
| 2001/0005558 A1 | 6/2001 | Yoshioka et al. |
| 2001/0005562 A1 | 6/2001 | Yoshioka et al. |
| 2001/0007726 A1 | 7/2001 | Yoshioka et al. |
| 2001/0043709 A1 | 11/2001 | Panitzsch |
| 2002/0000034 A1 | 1/2002 | Jensen |
| 2002/0015278 A1 | 2/2002 | Fukuyama et al. |
| 2002/0028380 A1 | 3/2002 | Tanjo et al. |
| 2002/0036282 A1 | 3/2002 | Chiang et al. |
| 2002/0048706 A1 | 4/2002 | Mayes et al. |
| 2002/0071990 A1 | 6/2002 | Kweon et al. |
| 2002/0071991 A1 | 6/2002 | Kweon et al. |
| 2002/0074972 A1 | 6/2002 | Narang et al. |
| 2002/0192137 A1 | 12/2002 | Chaloner-Gill et al. |
| 2002/0195591 A1 | 12/2002 | Ravet et al. |
| 2003/0003352 A1 | 1/2003 | Kweon et al. |
| 2003/0008212 A1 | 1/2003 | Akashi et al. |
| 2003/0049529 A1 | 3/2003 | Cho et al. |
| 2003/0054250 A1 | 3/2003 | Kweon et al. |
| 2003/0082446 A1 | 5/2003 | Chiang et al. |
| 2003/0099884 A1 | 5/2003 | Chiang et al. |
| 2003/0114297 A1 | 6/2003 | Shinn et al. |
| 2004/0005265 A1 | 1/2004 | Chiang et al. |
| 2004/0018429 A1 | 1/2004 | Kweon et al. |
| 2004/0018430 A1 | 1/2004 | Holman et al. |
| 2004/0018431 A1 | 1/2004 | Gozdz et al. |
| 2004/0151887 A1 | 8/2004 | Forrest et al. |
| 2004/0185343 A1 | 9/2004 | Wang et al. |
| 2004/0265692 A1 | 12/2004 | Long et al. |
| 2005/0026037 A1 | 2/2005 | Riley, Jr. et al. |
| 2005/0034993 A1 | 2/2005 | Gozdz et al. |
| 2005/0048374 A1 | 3/2005 | Yonezawa |
| 2005/0082726 A1 | 4/2005 | Hilmas et al. |
| 2005/0175529 A1 | 8/2005 | Ceder et al. |
| 2005/0181280 A1 | 8/2005 | Ceder et al. |
| 2005/0272214 A1 | 12/2005 | Chiang et al. |
| 2006/0035143 A1 | 2/2006 | Kida et al. |
| 2006/0102455 A1 | 5/2006 | Chiang et al. |
| 2006/0234131 A1 | 10/2006 | Takami et al. |
| 2007/0009801 A1 | 1/2007 | Inagaki et al. |
| 2007/0275300 A1 | 11/2007 | Salot et al. |
| 2008/0099734 A1 | 5/2008 | Chiang et al. |
| 2008/0213662 A1 | 9/2008 | Chiang et al. |
| 2008/0254368 A1 | 10/2008 | Ooyama et al. |
| 2008/0292862 A1 | 11/2008 | Filippov et al. |
| 2008/0311470 A1 | 12/2008 | Gozdz et al. |
| 2009/0035664 A1 | 2/2009 | Chiang et al. |
| 2009/0202903 A1 | 8/2009 | Chiang et al. |
| 2009/0235520 A1 | 9/2009 | Atsumi et al. |
| 2009/0253025 A1 | 10/2009 | Whitacre |
| 2010/0003603 A1 | 1/2010 | Chiang et al. |
| 2010/0092867 A1 | 4/2010 | Lau et al. |
| 2010/0248028 A1 | 9/2010 | Riley et al. |
| 2011/0005065 A1 | 1/2011 | Chiang et al. |
| 2011/0038656 A1 | 2/2011 | Chiang et al. |
| 2011/0045346 A1 | 2/2011 | Chiang et al. |
| 2011/0070489 A1 | 3/2011 | Chiang et al. |
| 2011/0097623 A1 | 4/2011 | Chiang et al. |
| 2011/0151324 A1 | 6/2011 | Chiang et al. |
| 2011/0278170 A1 | 11/2011 | Chiang et al. |
| 2012/0315538 A1 | 12/2012 | Chiang et al. |
| 2015/0364753 A1 | 12/2015 | Chiang et al. |
| 2016/0096334 A1* | 4/2016 | Sander .................. B29C 67/202 |
| | | 264/427 |
| 2017/0087074 A1* | 3/2017 | Perusse .................. A61K 8/416 |

FOREIGN PATENT DOCUMENTS

| | | |
|---|---|---|
| CN | 1470083 A | 1/2004 |
| CN | 1901255 A | 1/2007 |
| CN | 1945881 A | 4/2007 |
| DE | 102007042217 A | 3/2009 |
| EP | 0 757 407 A1 | 2/1997 |
| EP | 967672 A1 | 12/1999 |
| EP | 1 113 511 A1 | 7/2001 |
| EP | 1 042 832 A1 | 10/2001 |
| EP | 1 184 918 | 3/2002 |
| EP | 1 231 651 | 8/2002 |
| EP | 1 231 653 | 8/2002 |
| EP | 1 860 722 A1 | 8/2002 |
| GB | 976971 | 12/1964 |
| JP | 53-98038 | 8/1978 |
| JP | 55-010738 A | 1/1980 |
| JP | 59-094379 | 5/1984 |
| JP | 59-152565 A | 8/1984 |
| JP | 60-183365 A | 9/1985 |
| JP | 61-4167 A | 1/1986 |
| JP | 63-121272 A | 5/1988 |
| JP | 63-289768 | 11/1988 |
| JP | 04-58455 | 2/1992 |
| JP | 05-029006 | 2/1993 |
| JP | 05-041211 A | 2/1993 |
| JP | 05-109429 | 4/1993 |
| JP | 60-104167 A | 4/1994 |
| JP | 06-236768 A | 8/1994 |
| JP | 71-01728 A | 4/1995 |
| JP | 07-153492 A | 6/1995 |
| JP | 07-262986 A | 10/1995 |
| JP | 08-138650 A | 5/1996 |
| JP | 08-321306 A | 12/1996 |
| JP | 09-022693 A | 1/1997 |
| JP | 09-147862 | 6/1997 |
| JP | 09-298057 A | 11/1997 |
| JP | 09-320569 A | 12/1997 |
| JP | 11-121006 | 4/1999 |
| JP | 11-121025 A | 4/1999 |
| JP | 11-121061 | 4/1999 |
| JP | 11-154508 | 6/1999 |
| JP | 11-162519 A | 6/1999 |
| JP | 2000-021415 A | 1/2000 |
| JP | 2000-045639 A | 2/2000 |
| JP | 2000-080406 A | 3/2000 |
| JP | 2000-106213 | 4/2000 |
| JP | 2000-173645 A | 6/2000 |
| JP | 2000-195525 A | 7/2000 |
| JP | 2000-195526 A | 7/2000 |
| JP | 2000-228213 A | 8/2000 |
| JP | 2000-248095 A | 9/2000 |
| JP | 2001-151834 | 6/2001 |
| JP | 2002-151055 A | 5/2002 |
| JP | 4-206366 B2 | 1/2009 |
| KR | 1019910007466 | 9/1991 |
| KR | 1998-071228 | 10/1998 |
| WO | WO 97/05666 A2 | 2/1997 |
| WO | WO 97/27635 A1 | 7/1997 |
| WO | WO 97/44843 | 11/1997 |
| WO | WO 98/12761 A1 | 3/1998 |
| WO | WO 98/16960 A2 | 4/1998 |
| WO | WO 98/48466 A1 | 10/1998 |
| WO | WO 99/33129 A1 | 7/1999 |
| WO | WO 99/56331 A1 | 11/1999 |

(56) References Cited

FOREIGN PATENT DOCUMENTS

| WO | WO 00/10736 A1 | 3/2000 |
|---|---|---|
| WO | WO 00/41256 A1 | 7/2000 |
| WO | WO 01/77501 A2 | 10/2001 |
| WO | WO 02/43168 A2 | 5/2002 |
| WO | WO 03/012908 A2 | 2/2003 |
| WO | WO 03/056646 A1 | 7/2003 |
| WO | WO 07/028972 A1 | 3/2007 |
| WO | WO 08/011061 A1 | 1/2008 |
| WO | WO 08/153749 | 12/2008 |
| WO | WO 2013/112670 A1 | 8/2013 |
| WO | WO 14/170024 A1 | 10/2014 |
| WO | WO 2016/054530 A1 | 4/2016 |

OTHER PUBLICATIONS

Aleshin, A.N. et al., "Transport Properties of Poly (3,4-Ethylenedioxythiophene)/Poly (Styrenesulfonate)," Synthetic Metals 94:173-7 (1998).
Allen, J.L., et al., "$LI_{1+x}FE_{1-x}PO_4$: Electronically conductive Lithium Iron Phospho-olivines with Improved Electrochemical Performance," *The Proceedings of The Electrochemical Society* 28:198-205 (2003).
Arbizzani et al, "Li1.01Mn1.974 surface modification by pol(3,4-ethylenedioxythiophene)," J. Power Sources, 2003;119-121:695-700.
Arbizzani et al., "$Li_{1.03}Mn_{1.97}O_4$ Surface Modification by Poly (3,4-Ethylenedioxithiophene)," Poster presented at 11$^{th}$ Intl. Meeting on Lithium Batteries, Jun. 23-28, 2002, Monterey, CA.
Armand et al., Conjugated dicarboxylate anodes for Li-ion batteries. Nature Materials Jan. 18, 2009. 8: 120-5. DOI: 10.1038/nmat2372.
Armand, M.B. et al., "Poly-Ethers as Solid Electrolytes," Proceedings of the Intl. Conference on Fast Ion Transport in Solids, Electrodes and Electrolytes, Lake Geneva, WI, 131-136 (1979).
Bae et al., Design of Battery Electrodes with Dual-Scale Porosity to Minimize Tortuosity and Maximize Performance. Advanced Materials. 2012. 5 pages. DOI: 10.1002/adma.201204055.
Bae et al., High density sintered electrode architecture to improve the energy density of rechargeable lithium batteries. Poster presented Jul. 1, 2010 at the 15th International Meeting on Lithium Batteries, Jun. 27-Jul. 2, 2010. Montreal, Quebec, Canada. 1 page.
Bae et al., Influence of controlled pore topology in sintered Li-ion battery cathodes on electrochemical performance. Presented at the Materials Research Society fall meeting in Nov. 2010. 18 pages.
Bervas et al., Investigation of the Lithiation and Delithiation Conversion Mechanisms in a Bismuth Fluoride Nanocomposites. J. Electrochem. Soc. Mar. 2, 2006. 153(4): A799-808.
Bouridah, A. et al., "Poly(Dimethylsiloxane)-Poly(Ethylene Oxide) Based Polyurethane Networks Used as Electrolytes in Lithium Electrochemical Solid State Batteries," *Solid State Ionics*, 15 (1985) pp. 233-240.
Broadhead et al., Chapter 2. Electrochemical Principles and Reactions. Handbook of Batteries. 1995:2.1-2.35.
Cernak et al., Aggregation dynamics of nonmagnetic particles in a ferrofluid. Physical Review E. Sep. 29, 2004;70(3):031504.
Chan et al, High-performance lithium battery anodes using silicon nanowires. Nature Nanotechnology. 2008. 3: 31-5. Doi:10.1038/nnano.2007.411. Published online Dec. 16, 2007.
Chen et al., Reducing Carbon in LiFePO4/C Composite Electrodes to Maximize Specific Energy, Volumetric Energy, and Tap Density. J Electrochem Soc. 2002;148(9):A1184-89.
Chen-Wiegart et al., "Tortuosity characterization of 3D microstructure at nano-scale for energy storage and conversion materials," Journal of Power Sources. 2014;249:349-56.
Chiang et al., Electrode architectures for enhancing energy density in rechargeable lithium batteries. Spring MRS Meeting Invited Talk Abstract. Abstract available prior to Apr. 7, 2010. San Francisco, California. 1 page.
Chiang et al., High Energy Density Low Tortuosity Battery Electrodes and Methods of Manufacture. MIT. Apr. 7, 2011. 12 pages.
Chiang, Aligned (Unit Tortuosity) Porosity: 3 approaches using a removable (fugitive) pore former. Presentation slideshow accompanying talk given at Spring MRS Meeting Invited Talk. Apr. 7, 2010. No handouts were distributed. 11 pages.
Chiang, Y.-M. et al., "High Capacity, Temperature-Stable Lithium Aluminum Manganese Oxide Cathodes for Rechargeable Batteries," *Electrochem Sol St Lett*, 2 (3) (1999) pp. 107-110.
Chiang, Design and Scalable Assembly of High Density Low Tortuosity Electrodes. Massachusetts Institute of Technology, Cambridge, MA. Jun. 9, 2016. Believed to have been distributed on May 9, 2016. Presented on Jun. 9, 2016.
Chiang, Design and Scalable Assembly of High Density Low Tortuosity Electrodes. Massachusetts Institute of Technology. Cambridge, MA. Jun. 17, 2015. Believed to have been distributed on May 1, 2015. Presented on Jun. 17, 2015.
Cho et al., Self-Assembling Colloidal-Scale Devices: Selecting and Using Short-Range Surface Forces Between Conductive Solids. Adv Funct Matter. 2007;17:379-89.
Choi et al., Determination of electrochemical active area of porous $Li_{1-\delta}CoO_2$ electrode using the GITT technique. Solid State Ionics. 1998;109:159-63.
Chung et al., Validity of Bruggeman relation for porous electrodes. Modelling and Simulation in Materials Science and Engineering. 2013;21:1-16.
Darling et al., Modeling a Porous Intercalation Electrode with Two Characteristic Particle Sizes. J Electrochem Soc. 1997;144:4201-08.
Darling et al., Modeling Side Reactions in Composite $Li_yMn_2O_4$ Electrodes. J Electrochem Soc. 1998;145:990-98.
Doyle et al., Analysis of capacity-rate data for lithium batteries using simplified models of the discharge process. J Appl Electrochem. 1997;27:846-56.
Doyle et al., Modeling of Galvanostatic Charge and Discharge of the Lithium/Polymer/Insertion Cell. J Electrochem Soc. 1993;140:1526-33.
Doyle, Design and Simulation of Lithium Rechargeable Batteris. Ph.D. Thesis. Unversity of California, Berkeley. 1995. 370 pages.
Ehrlich, Chapter 35. Lithium-Ion Batteries. Handbook of Batteries. 3$^{rd}$ ed. 2002:35.1.
Elliott, S.R., "Physics of Amorphous Materials," Longman Group Limited. New York. 1984.
Erb et al., Composites reinforced in three dimensions by using low magnetic fields. Science. Jan. 13, 2012;335(6065):199-204. Doi: 10.1126/science.1210822.
Erb et al., Magnetic assembly of colloidal superstructures with multipole symmetry. Nature. Feb. 19, 2009;457(7232):999-1002. doi: 10.1038/nature07766.
Erb et al., Beyond diffusion-limited aggregation kinetics in microparticle suspensions. Physical Review E. Nov. 2, 2009; 80(5):051402.
Fermigier et al., Structure evolution in a paramagnetic latex suspension. J Colloid Interface Science. 1992;154(2):522-39.
Furst et al., Permanently Linked Monodisperse Paramagnetic Chains. Langmuir. 1998;14(26):7334-36.
French, R.H. et al., "Full Spectral Calculation of Non-Retarded Hamaker Constants for Ceramic Systems from Interband Transition Strengths," Solid State Ionics 75:13-33 (1995).
French, R.H. et al., "Origins and Applications of London Dispersion Forces and Hamaker Constants in Ceramics," J. Am. Ceram. Soc. 83(9):2117-46 (2000).
Fuller et al., Simulation and Optimization of the Dual Lithium Ion Insertion Cell. J Electrochem Soc. 1994;141:1-10.
Gaubicher et al., Li/β-VOPO4: A New 4 V System for Lithium Batteries. J Electrochem Soc. 1999;146(12):4375-79.
Ghosh, S. et al., "Supramolecular Self-Assembly for Enhanced Conductivity in Conjugated Polymer Blends: Ionic Crosslinking in Blends of Poly(3,4,-Ethylenedioxythiophene)-Poly(Styrenesulfonate) and Poly(vinylpyrrolidone)," Adv. Mater. 10(14):1097 (1998).
Gray, F.M., "Solid Polymer Electrolytes," VCH Publishers Inc. New York. (1991).
Guyomard et al., Li Metal-Free Rechargeable $LiMn_2O_4$/Carbon Cells: Their Understanding and Optimization. J Electrochem Soc. 1992;139:937-48.
Hadziioannou, et al., "'Monocristaus de copolymeres trisequences styrene/isoprene/styrene presentant la structure cylindrique: I. Etude

(56) References Cited

OTHER PUBLICATIONS de l'orientation par diffraction des rayons X aux petits angles," Colloid Poly Sci., 257:15-22, 1979.
Hart, B. W., et al., "3-D Microbatteries," Electrochemistry Communications 5:120-3 (2003).
Huang et al., Approaching Theoretical Capacity of LiFePO4 at Room Temperature at High Rates. Electrochem Solid-State Letts. 2001;4(10):A170-72.
Idota, Y. et al., "Tin-Based Amorphous Oxide: A High-Capacity Lithium-Ion-Storage Material," Science, vol. 276 (May 30, 1997) pp. 1395-1397.
Kuwabata, S. et al., "Charge-Discharge Properties of Composites of $LiMn_2O_4$ and Polypyrole as Positive Electrode Materials for 4 V Class of Rechargeable Li Batteries," Electrochimica Acta 44(23-26):4593-600 (1999).
Le Cras, F. et al., "Lithium intercalation in Li—Mg—Mn—O and Li—Al—Mn—O spinels," Solid State Ionics, 89 (1996) pp. 203-213.
Li et al., Li-Storage via Heterogeneous Reaction in Selected Binary Metal Fluorides and Oxides, Journal of the Electrochemical Society. Oct. 21, 2004. 151 (11): A1878-85. doi: 10.1149/1.1801451.
Li et al., Synthesis and properties of poly(2,5,8,11,14,17,20,23-octaoxapentacosyl methacrylate)-block-poly(4-vinylpyridine). Makromol Chem. 1991;192:3043-50.
Li et al., Project ES071: Design and Scalable Assembly of High Density Low Tortuosity Electrodes. Poster. Submitted on May 9, 2016. Presented on Jun. 9, 2016.
Limthongkul, P. et al., "Nanocomposite Li-Ion Battery Anodes Produced by the Partial Reduction of Mixed Oxides," Chem Mat, 13 (2001) pp. 2397-2402.
Linden, Editor-in-Chief, "Handbook of Batteries," Second Edition, McGraw-Hill, Inc., USA, 1995 (no. month), p. 2. 19.
Long, J.W., et al., "Three-Dimensional Battery Architectures," Chem. Rev. 104(10):4463-92 (2004).
Matsumoto, O., et al., "Ionic Conductivity of Dual-Phase Polymer Electrolytes Comprise of MBR-SBR Latex Films Swollen with Lithium Slat Solutions", J. Electrochem Soc., vol. 141, No. 8, Aug. 1994, 1989-93.
Matsumoto, Osamu et al., "Vaporization of Graphite in Plasma Arc and Identification of C60 in the Deposit," J. Electrochem. Soc., vol. 139, No. 1, Jan. 1992, L8-9.
Mazouzi et al., High capacity and excellent cyclability of Nano-Silicon/CB/CMC composite anode from tailored electrode preparation. 216th Electrochemical Society Meeting. 2009: Abstract #417.
Meredith et al., II. Conduction in Heterogeneous Systems. In: Advances in Electrochemistry and Electrochemical Engineering. John Wiley& Sons. New York. 1962;2:15-47.
Milling, A. et al., "Direct Measurement of Repulsive Van Der Waals Interactions Using an Atomic Force Microscope," J. Colloid & Interface Science 180:460-5 (1996).
Minett, M.G. et al, "Polymeric Insertion Electrodes," Solid State Ionics, 28-30 (1988), pp. 1192-1196.
Moon et al., Production of highly aligned porous alumina ceramics by extruding prozen alumina/camphene body. Journal of European Ceramic Society. 2011;31:1945-50.
Nagaoka, K. et al, "High Ionic Conductivity in Poly(dimethyl Siloxane-co-Ethylene Oxide) Dissolving Lithium Perchlorate," J. Polymer Science. pp. 659-663, vol. 22, 1984.
Nagarajan et al., A Mathematical Model for Intercalation Electrode Behavior. I. Effect of Particle-Size Distribution on Discharge Capacity. J Electrochem Soc. 1998;145:771-79.
Nakahara et al., Rechargeable batteries with organic radical cathodes. Chemical Physical Letters. Jun. 27, 2002. 359 (5-6): 351-4.
Neumann et al., "Negative Hamaker Coefficients," Colloid and Polymer Science 257(4):413-9 (1979).
Newman et al., Theoretical Analysis of Current Distribution in Porous Electrodes. J Electrochem Soc. 1962;109:1183-91.
Newman, Chapter 22. Porous Electrodes. In: Electrochemical Systems. $2^{nd}$ Edition. Prentice Hall. Englewood Cliffs, New Jersey. 1991:450-95.
Nishide et al., Organic radical battery: nitroxide polymers as a cathode-active material. Chem. Phys. Lett. Electrochim. Acta. Nov. 30, 2004. 50(2-3): 827-31. doi:10.1016/j.electacta.2004.02.052.
Ohzuku, Tsutomu et al., "Synthesis and Characterization of $LiAl_{frax;1;4}Ni_{frax;3;4}O_2$ (R3m) for Lithium-Ion (Shuttlecock) Batteries," J. Electrochem. Soc., vol. 142, No. 12, Dec. 1995, pp. 4033-4039.
Ong et al., Double-Layer Capapcitance in Dual Lithium Ion Insertion Cell. J Electrochem Soc. 1999;146:4360-65.
Padhi et al., Phospho-olivines as Positive-Electrod Materials for Rechargeable Lithium Batteries. J Electrochem Soc. 1997;144(4):1188-94.
Pals et al., Thermal Modeling of the Lithium/Polymer Battery. I. Discharge Behavior of a Single Cell. J Electrochem Soc. 1995;142:3274-81.
Pals et al., Thermal Modeling of the Lithium/Polymer Battery. II. Temperature Profiles in a Cell Stack. J Electrochem Soc. 1995;142:3282-88.
Pierson, Chapter 6. Virteous Carbon. Handbook of Carbon, Graphite, Diamond and Fullerenes-Properties, Processing and Applications. 1993;122-40.
Plitz et al., Structure and Electrochemistry of Carbon-Metal Fluoride Nanocomposites Fabricated by a Solid State Redox Conversion Reaction. J. Electrochem. Soc. 2005. 152(2): A307-15. doi: 10.1149/1.1842035.
Ravet et al., Electroactivity of natural and synthetic triphylite. J Power Sci. 2001;97-98:503-07.
Ravet et al., Improved Iron Based Cathode Material. Abstract No. 2014. 127.
Reed et al., Introduction to the Principles of Ceramic Processing. J Wiley & Sons, New York. 1988:86-89.
Sander, Jonathan Samuel, "Scalable method for channeled low tortuous porosity in battery electrodes," Available online at: http://p3.snf.ch/Project-148768. Believed to have been made available on Jul. 7, 2013.
Sander, Jonathan Samuel, "Scalable method for channeled low tortuous porosity in battery electrodes," Available online at: http://p3.snf.ch/Project-154584. Believed to have been made available on Jul. 1, 2014.
Sander et al., High-performance battery electrodes via magnetic templating. Nature Energy. Jul. 11, 2016;1: 16099.
Sander et al., Magnetic Transport, Mixing and Release of Cargo with Tailored Nanoliter Droplets. Advanced Mater. May 15, 2012;24(19):2582-7.
Soon et al., Assembling unidirectionally frozen alumina/camphene bodies for aligned porous alumina ceramics with larger dimensions. Journal of European Ceramic Society. 2011;31:415-9.
Tarascon et al., Issues and challenges facing rechargeable lithium batteries. Nature. Nov. 15, 2001;414(6861):359-67.
Thorat et al., Quantifying tortuosity in porous Li-ion battery materials. Journal of Power Sources. 2009;3(15):1-9.
Tukamoto et al., Electronic Conductivity of LiCoO2 and its Enhancement by Magnesium Doping. J Electrochem Soc. 1997;144(9):3164-68.
Vaccaro et al., Electrochemical Investigations of Alkai-Metal Intercalation Reactions in $TiS_2$: Chronoamperometric Determination of Mass and Charge Transport Properties of Liquid Electrolyte Systems. J Electrochem Soc. 1982;129:682-88.
Van Oss, C.J. et al., "Applications of Net Repulsive Van Der Waals Forces Between Different Particles, Macromolecules or Biological Cells in Liquids," Colloids and Surfaces 1:45-56 (1980).
Van Oss, C.J. et al., "Comparison Between Antigen-Antibody Binding Energies and Interfacial Free Energies," Immunological Communications 6(4):341-54 (1977).
Van Oss, C.J. et al., "Repulsive Van Der Waals Forces. I. Complete Dissociation of Antigen-Antibody Complexes by Means of Negative Van Der Waals Forces," Immunological Communications 8(1):11-29 (1979).

(56) References Cited

OTHER PUBLICATIONS

Van Oss, C.J. et al., "Repulsive Van Der Waals Forces. II Mechanism of Hydrophobic Chromatography," Separation Science and Technology 14(4):305-17 (1979).
Vijayaraghavan et al., An analytical method to determine tortuosity in rechargeable battery electrodes. J Electrochemical Society. 2012;159(5):A548-552.
Wang, C. et al., "All Solid-State Li/$Li_xMnO_2$ Polymer Battery Using Ceramic Modified Polymer Electrolytes," J. Electrochemical Soc. 149(8):A967-72 (2002).
Yamada et al., Crystal Chemistry of the Olivine-Type Li(MnyFe1-y)PO4 and (MNyFe1-y)PO4 as Possible 4 V Cathode Materials for Lithium Batteries. J Electrochem Soc. 2001;148(8):A960-67.
Yamada et al., Optimized LiFePO4 for Lithium Battery Cathodes. J Electrochem Soc. 2001;148(3):A224-29.
Zacharias et al., Direct measurements of effective ionic transport in porous Li-ion electrodes. Journal of Electrochemical Society. 2013;160(2):A306-A311.
Zallen et al., 4.7. Continuum Percolation and the Critical Volume Fraction. The Physics of Amorphous Solids. J Wiley & Sons, NY. 1983:183-91.
International Preliminary Report on Patentability for PCT/US2015/053761, dated Apr. 13, 2017.
Mawdsley et al., Fracture behavior of alumina/monazite multilayer laminates. J Am Ceram Soc. 2000;83(4):802-8.
Van Hoy et al., Microfabrication of ceramics by co-extrusion. J Am Ceram Soc. Jan. 1998;81(1):152-8.

\* cited by examiner

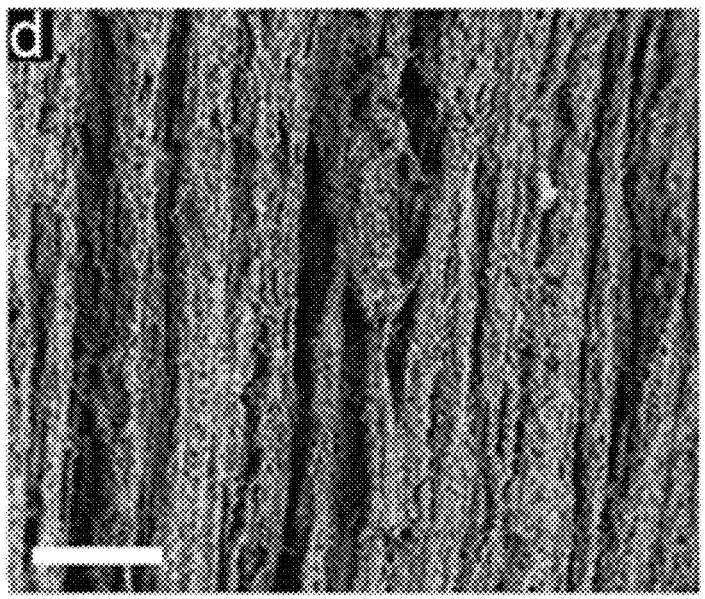
FIG. 9A            FIG. 9B
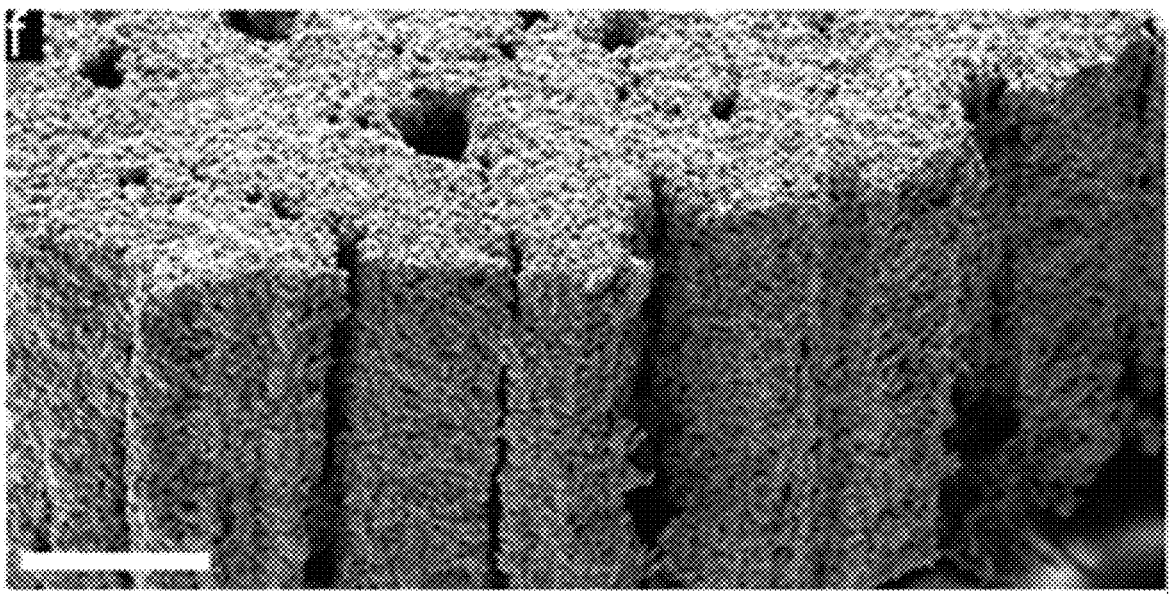
FIG. 9C

MAGNETIC FIELD ALIGNMENT OF EMULSIONS TO PRODUCE POROUS ARTICLES

RELATED APPLICATIONS

This application claims priority under 35 U.S.C. § 119(e) to U.S. Provisional Application No. 62/347,475, filed Jun. 8, 2016, and entitled "Processing of High-Capacity Low-Tortuosity Thick Electrodes for Lithium Ion-Batteries," which is incorporated herein by reference in its entirety for all purposes. This application is also a continuation-in-part of U.S. patent application Ser. No. 14/874,253, filed Oct. 2, 2015, and entitled "Pore Orientation Using Magnetic Fields," which claims priority under 35 U.S.C. § 119(e) to U.S. Provisional Application No. 62/217,554, filed Sep. 11, 2015, and entitled "Magnetically Aligned Low Tortuosity Electrodes" and U.S. Provisional Application No. 62/059,315, filed Oct. 3, 2014, and entitled "Magnetically Aligned Low Tortuosity Electrodes," all of which are incorporated herein by reference in their entireties for all purposes.

GOVERNMENT SPONSORSHIP

This invention was made with Government support under Contract No. DE-AC02-05CH11231 awarded by the Department of Energy. The Government has certain rights in the invention.

TECHNICAL FIELD

The use of magnetic fields in the production of porous articles is generally described.

BACKGROUND

Despite nearly two decades of evolution, many commercially-available Li-ion cells continue to have poor materials utilization, with only about 50% of cell volume devoted to active materials even in cells designed for high energy density (e.g., state-of-art 18650s). Electrode thickness or lack thereof, is believed to be a cause of the low volume and mass efficiency. Electrodes that can meet the duty cycles of plug-in hybrid electric vehicles (PHEVs) and electric vehicles (EVs) are typically only 60-100 μm thick; techno-economic modeling has shown that by simply doubling electrode thickness, the cost of a PHEV pack could be reduced by about $600. However, making electrodes thicker generally leads to increased diffusion pathways of the charge carrying lithium ions through the liquid electrolyte filled pores. Hence, at high rates only a fraction of the stored energy can be delivered since the battery fails due to limited ion transport in the liquid phase.

Increasing the porosity of the electrodes will increase the ion transport in the electrolyte but simultaneously diminish the energy density of the battery. Instead, changing the tortuosity of the electrode has shown to enable high rate capability while maintaining the energy density. The tortuosity $\tau = \varepsilon \cdot \sigma_0 / \sigma$ is a measure of the effectiveness of the pore structure in respect to mass transport, where $\varepsilon$ is the porosity, $\sigma_0$ is the transport coefficient of ions in the electrolyte and $\sigma$ is a measured transport coefficient of ions in the structure. Consequently a straight pore, relative to the diffusion direction, is equal to tortuosity of unity, while more random pore shapes can reach much higher values.

Measured tortuosities in batteries can exhibit values up to 27 but are usually in the range of 2-5, showing that there is much room for improvement. Low tortuous structures can be obtained by anisotropic pores, which are oriented in the direction of ion diffusion. These structures have shown to greatly improve the delivered capacity at high C-rates. For many applications, the anisotropic pores need high aspect ratios and small diameters.

While the benefits of low tortuosity pores in electrodes has been recognized, commercial methods for incorporating such pores into electrodes has had limited success. Accordingly, improved methods of making such pores, in electrodes and other porous structures, would be desirable.

SUMMARY

The use of magnetic fields in the production of porous articles is generally described. Certain embodiments are related to methods of producing porous articles in which magnetic fields are applied to an emulsion to align emulsion droplets. In some embodiments, after the emulsion droplets have been aligned, the emulsion droplets and/or the medium surrounding the emulsion droplets can be removed to leave behind a porous article. According to certain embodiments, polyvinyl alcohol can be used, for example, to stabilize the emulsion droplets and/or bind together components of the porous article. In some embodiments, water-soluble liquid alcohol can be used, for example, to stabilize the suspension of electronically conductive material within a phase of the emulsion. The subject matter of the present invention involves, in some cases, interrelated products, alternative solutions to a particular problem, and/or a plurality of different uses of one or more systems and/or articles.

According to certain embodiments, methods are provided. The method comprises, according to certain embodiments, exposing a matrix comprising a fluid and emulsion droplets within the fluid to a magnetic field such that the magnetic field causes at least a portion of the emulsion droplets to chain; and at least partially removing the fluid and/or the emulsion droplets from the matrix to form anisotropic pores within the matrix, wherein at least one of the fluid and the emulsion droplets contain water and a water-soluble liquid alcohol.

In some embodiments, the method comprises exposing a precursor composition of a porous article to a magnetic field which causes a set of emulsion droplets within a fluid of the precursor composition to assume an elongated orientation; and at least partially removing the fluid and/or the set of emulsion droplets from the composition, thereby forming the porous article, wherein the emulsion droplets and/or the fluid comprise a mixture comprising water and a water-soluble liquid alcohol.

The method comprises, according to certain embodiments, exposing a precursor composition of a porous article to a magnetic field which causes longitudinal axes of elongated regions of emulsion droplets within a fluid of the precursor to become substantially aligned with each other; consolidating the composition; and at least partially removing the fluid and/or the elongated regions of the emulsion droplets from the composition, thereby forming the porous article, wherein the emulsion droplets and/or the fluid comprise a mixture comprising water and a water-soluble liquid alcohol.

According to some embodiments, the method comprises exposing a matrix comprising a fluid, and emulsion droplets within the fluid to a magnetic field such that the magnetic field causes at least a portion of the emulsion droplets to chain; and at least partially removing the fluid and/or the emulsion droplets from the matrix to form anisotropic pores within the matrix, wherein at least one of the fluid and the emulsion droplets contain polyvinyl alcohol.

The method comprises, in some embodiments, exposing a precursor composition of a porous article to a magnetic field which causes a set of emulsion droplets within a fluid of the precursor composition to assume an elongated orientation; and at least partially removing the fluid and/or the set of emulsion droplets from the composition, thereby forming the porous article, wherein the emulsion droplets and/or the fluid comprise polyvinyl alcohol.

In certain embodiments, the method comprises exposing a precursor composition of a porous article to a magnetic field which causes longitudinal axes of elongated regions of emulsion droplets within a fluid of the precursor composition to become substantially aligned with each other; consolidating the composition; and at least partially removing the fluid and/or the elongated regions of the emulsion droplets from the composition, thereby forming the porous article, wherein the emulsion droplets and/or the fluid comprise polyvinyl alcohol.

In addition to inventive methods, inventive porous articles (e.g., electrodes) are also provided. In certain embodiments, the inventive porous articles can be fabricated according to certain of the inventive methods described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

In FIG. 3A, a stable emulsion of ferrofluid is mixed with electrode particles and additives. In FIG. 3B, the droplets are chained up in an external magnetic field. In FIGS. 3C-3D, (C) the continuous phase is evaporated until eventually (D) the particles are consolidated

FIGS. 7C-7D show a $LiCoO_2$ electrode with vertically aligned pores after removal of the solvent (scale bars 50 μm and 5 μm). FIG. 7E shows the electrode after sintering (scale bar 100 μm).

FIGS. 9A-9C are, according to certain embodiments, cross sectional images of sintered $LiCoO_2$ electrodes with aligned pore channels that were templated by magnetically chained emulsions, with the image in (C) taken from a slight angle (scale bars: 100 μm, 25 μm, and 100 μm, respectively).

DETAILED DESCRIPTION

Figure 1A:
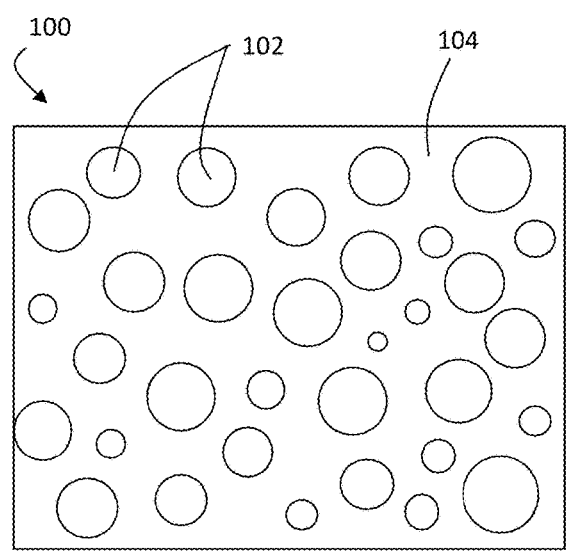
FIGS. 1A-1D are schematic cross-sectional diagrams illustrating the formation of porous articles using fugitive emulsion droplets, according to one set of embodiments.

The use of magnetic fields in the production of porous articles is generally described. Certain embodiments are related to the use of magnetic fields in the production of porous articles such as electrodes. Certain embodiments comprise exposing an emulsion (e.g., comprising a fluid and emulsion droplets disposed within the fluid) to a magnetic field such that droplets within the emulsion form one or more elongated regions (e.g., one or more regions in which multiple emulsion droplets chain). The one or more elongated regions may align with the applied magnetic field. The longitudinal axes of two or more elongated regions may, according to certain embodiments, be substantially aligned with each other. In some embodiments, after the magnetic field has been applied, at least a portion of the emulsion droplets and/or fluid within the emulsion can be at least partially removed. Removal of the emulsion droplets and/or the fluid can leave behind anisotropic pores within the remainder of the emulsion material.

According to certain embodiments, polyvinyl alcohol can be included in a water-containing phase of the emulsion (e.g., within emulsion droplets and/or within the emulsion fluid surrounding the emulsion droplets). The polyvinyl alcohol may, according to certain embodiments, stabilize the emulsion. In some embodiments, the polyvinyl alcohol can serve as a binder, for example, in addition to an emulsion stabilizer. For example, in some embodiments, after material (e.g., liquid) has been removed from the emulsion, the polyvinyl alcohol may be left behind with and bind together other solid material (e.g., electrode materials and/or conductive material). In some embodiments, in addition to the polyvinyl alcohol, the water-containing phase of the emulsion (e.g., within emulsion droplets and/or within the emulsion fluid surrounding the emulsion droplets) comprises a conductive additive (e.g., carbon black) and/or electrode material (e.g., particles of electrode material). In some such embodiments, the other phase of the emulsion (i.e., the phase that is not the water-containing phase) can comprise a magnetic fluid (e.g., a ferrofluid, such as an oil-based ferrofluid). In some such embodiments, at least a portion of the water-containing phase of the emulsion can be left behind to form an article comprising elongated pores, as described in more detail below.

In some embodiments, at least one water-soluble liquid alcohol can be included in a water-containing phase of the emulsion. The water-soluble liquid alcohol may, according to certain embodiments, aid in suspending electronically conductive material (e.g., carbon black) within a water-containing phase of the emulsion. In some embodiments, the water-soluble liquid alcohol can be present along with a conductive additive in a phase of the emulsion. In some such embodiments, the water-soluble liquid alcohol can be present (e.g., along with a conductive agent) in the phase of the emulsion that is left behind to form the porous article. In some embodiments, after material has been removed from the emulsion to form the porous article, conductive agent that was present in the same phase as the water-soluble liquid alcohol can form a percolating network of electronically conductive material that facilitates the transport of charge through the resulting porous structure (e.g., electrode). In some embodiments, in addition to the water-soluble liquid alcohol, the water-containing phase of the emulsion (e.g., within emulsion droplets and/or within the emulsion fluid surrounding the emulsion droplets) comprises a conductive additive (e.g., carbon black), electrode material (e.g., particles of electrode material), and/or a binder (e.g., polyvinyl alcohol). In some such embodiments, the other phase of the emulsion (i.e., the phase that is not the water-containing phase) can comprise a magnetic fluid (e.g., a ferrofluid, such as an oil-based ferrofluid). In some such embodiments, at least a portion of the water-containing phase of the emulsion can be left behind to form an article comprising elongated pores, as described in more detail below.

Unlike previous techniques, certain embodiments described in this specification use new techniques for the creation of anisotropic porosity that are scalable for large areas. The ability to scale manufacturing techniques for large areas can be important for cost effective production of batteries.

Certain embodiments are related to the fabrication of battery electrodes. Battery electrodes with aligned pore channels generally have a lower tortuosity in the direction of the alignment. It has been shown that such low tortuosity electrodes deliver more capacity at high discharge rates compared to electrodes with conventional microstructures. Certain embodiments described in this specification show how anisotropic pores that can be produced using magnetic field controlled alignment of magnetic and non-magnetic phases. Beneficial effects on the rate capability can be achieved for electrodes (e.g., in the form of a films) the use of which is at least partly limited by ion transport in the electrolyte. Beneficial effects on the rate capability can be achieved for electrodes including a variety of electrode materials such as, but not limited to, $LiCoO_2$, $Li(Ni,Co,Al)O_2$ (NCA), $LiMnO_3$—$LiMO_2$ alloys, and/or graphite. Other electrode materials can also be used, as described in more detail below.

Certain embodiments described in this disclosure allow for the creation of anisotropic pores in battery electrodes by the use of magnetically aligned structures. The application of magnetic fields can be integrated efficiently and cost effectively into the electrode fabrication process, according to certain embodiments.

Certain embodiments comprise exposing a precursor composition of a porous article, comprising an emulsion, to a magnetic field. According to certain embodiments, exposure of the precursor composition to a magnetic field can cause the rearrangement of emulsion droplets such that one or more elongated regions of emulsion droplets are present (and, in certain cases, aligned with each other) in the precursor. In some such embodiments, after application of the magnetic field, the emulsion droplets may re-align such that, for at least a portion of time, their free energies are minimized. Each elongated region can be made of multiple emulsion droplets arranged in an elongated orientation (e.g., in the case of a chain of emulsion droplets). According to certain embodiments, exposure of the precursor to the magnetic field can cause a set of emulsion droplets in a matrix of the precursor to chain.

Certain embodiments comprise at least partially removing the emulsion droplets from the precursor (e.g., a matrix of the precursor). Removal of the emulsion droplets from the precursor can result in the formation of pores that are at least partially defined by the elongated orientation of the emulsion droplets. For example, removal of the emulsion droplets can lead to the formation of anisotropic pores within the matrix within which the emulsion droplets were originally distributed.

In some embodiments, at least a portion of the fluid around the emulsion droplets may be removed to form the porous article. For example, in some embodiments, the liquid of the precursor may comprise a magnetic fluid, and at least a portion of the magnetic fluid may be removed from the precursor to form pores (e.g., anisotropic pores) that are at least partially defined by a spatial distribution of the magnetic fluid within the precursor (e.g., within a matrix of the precursor).

Some embodiments comprise exposing the precursor to a magnetic field to cause longitudinal axes of elongated regions of material (e.g., chained emulsion droplets) within the precursor to become substantially aligned with each other. In some such embodiments, the precursor is consolidated, and at least a portion of the elongated regions of material and/or a fluid of the precursor are removed from the precursor to form a porous article. Pores within the porous article can correspond to the elongated regions of material, according to certain embodiments.

Inventive articles are also described herein. For example, certain embodiments are related to inventive porous articles comprising pores at least partially defined by a set of emulsion droplets aligned in an elongated orientation and removed from the article. In some such embodiments, the porous article comprises polyvinyl alcohol. For example, polyvinyl alcohol that was present in the emulsion from which the porous article was formed may be present in the porous article, according to certain embodiments. The polyvinyl alcohol may bind together other solid material in the porous article, according to certain embodiments. In some embodiments, the porous article comprises a water-soluble liquid alcohol. For example, in certain embodiments, the emulsion from which the porous article was formed contains a water-soluble liquid alcohol, and at least a residual amount of the water-soluble liquid alcohol may remain in the porous article after it has been formed, according to some embodiments.

As noted above, certain embodiments are related to inventive methods of forming pores in articles. The pores may be formed, for example, in a precursor composition of a porous article. The precursor composition may comprise, for example, a matrix in which the pores are formed. According to certain embodiments, and as described in more detail below, the matrix can comprise a fluid within which emulsion droplets are suspended.

In some embodiments, the porous article can be made by at least partially removing emulsion droplets from a precursor of the porous article. One example of such an arrangement is illustrated in FIGS. 1A-1D. In FIG. 1A, matrix 100 comprises emulsion droplets 102 suspended in fluid 104. In the set of embodiments illustrated in FIG. 1A (and accompanying FIGS. 1B-1D), emulsion droplets 102 are fugitive emulsion droplets, which is to say, emulsion droplets 102 are ultimately at least partially removed from the matrix. In other embodiments (e.g., as illustrated in FIGS. 2A-2D, described in more detail below), the emulsion droplets may be non-fugitive emulsion droplets, which is to say, the emulsion droplets may remain within the matrix after material is removed to form the porous article.

According to certain embodiments, at least one phase within the matrix is magnetic. Referring to FIG. 1A, for example, emulsion droplets 102 and/or fluid 104 can be magnetic.

In certain embodiments, the matrix comprises a non-magnetic fluid in which magnetic emulsion droplets (e.g., droplets of ferrofluid) are suspended. In FIG. 1A, for example, fluid 104 can be a non-magnetic fluid (e.g., a water-based fluid, optionally also containing electrode material, binder, conductive agent, and/or a water-soluble liquid alcohol), according to certain embodiments. In some embodiments, emulsion droplets 102 can be magnetic emulsion droplets (e.g., droplets of magnetic fluid, such as an oil-based ferrofluid).

In some embodiments, the fluid of the matrix comprises a magnetic fluid (e.g., a ferrofluid) in which non-magnetic emulsion droplets are suspended. In FIG. 1A, for example, fluid 104 can be a ferrofluid, and emulsion droplets 102 can be non-magnetic emulsion droplets. In one exemplary set of embodiments, emulsion droplets 102 are water-containing droplets (optionally also containing electrode material, binder, conductive agent, and/or a water-soluble liquid alcohol), and fluid 104 is an oil-based ferrofluid.

The magnetic fluid and/or the magnetic emulsion droplets can be formed using a variety of types of magnetic particles. Magnetic fluid (e.g., fluid 104 in FIG. 1A) and/or magnetic emulsion droplets (e.g., emulsion droplets 102 in FIG. 1A) can be formed, for example, by suspending the magnetic particles within a liquid (e.g., an oil, in the case of an oil-based ferrofluid). The magnetic particles can, in some embodiments, be made of a magnetic material (e.g., the magnetic particles can have magnetic material both at their exposed surfaces and within their bulk). Examples of such particles include, but are not limited to, iron, nickel, cobalt, oxides thereof, and/or alloys thereof. The magnetic particles can, according to certain embodiments, be made of a non-magnetic material that is at least partially coated with a magnetic material. For example, in some embodiments, the bulk of the magnetic particles may be made of (in whole or in part) a non-magnetic polymer, metal, and/or salt (e.g., salts of Group I and/or Group II elements, such as any salts of sodium, potassium, calcium, strontium, and/or barium with counter ions such as nitrate, phosphate, carbonate, fluoride, chloride, and bromide anions) at least partially coated with a magnetic material (e.g., containing iron, cobalt, nickel, oxides thereof, and/or alloys thereof). In some embodiments, the coating material can be in the form of nanoparticles that at least partially coat the underlying material.

In some embodiments, the magnetic particles (e.g., within the fluid phase and/or within the emulsion droplet phase) can have a relatively high magnetic susceptibility. The use of such particles can be helpful in achieving alignment of emulsion droplets upon application of a magnetic field to the matrix, as described in more detail elsewhere herein. According to certain embodiments, the magnetic particles may have a non-dimensional magnetic volume susceptibility (as defined in the International System of Units) of at least about 0.001, at least about 0.01, at least about 0.1, or at least about 1 (and/or, in some embodiments, up to about 10, up to about 20, or more).

In certain embodiments in which the emulsion droplets are magnetic, the emulsion droplets have a relatively high magnetic susceptibility. According to certain embodiments, the emulsion droplets have a non-dimensional magnetic volume susceptibility (as defined in the International System of Units) of at least about 0.001, at least about 0.01, at least about 0.1, or at least about 1 (and/or, in some embodiments, up to about 10, up to about 20, or more). The non-dimensional magnetic volume susceptibility of as emulsion droplet (which includes both magnetic particles and liquid) corresponds to the non-dimensional magnetic volume susceptibility of the overall emulsion droplet (i.e., as a composite structure) that responds to the magnetic field, and does not correspond to the magnetic susceptibility of only the magnetic material components within the emulsion droplet.

In some embodiments, non-magnetic emulsion droplets may be used as fugitive emulsion droplets. For example, the emulsion droplets may comprise a water-based fluid emulsified within an oil-based ferrofluid, and the water-based emulsion droplets may be at least partially removed from the matrix to form the porous article. According to certain embodiments, when non-magnetic emulsion droplets are used as fugitive emulsion droplets, the matrix fluid is a magnetic fluid phase (e.g., comprising a magnetic fluid and/or magnetic particles) which can force the non-magnetic emulsion droplets into alignment (e.g., chaining) upon application of a magnetic field, as described in more detail elsewhere herein. For example, in some embodiments, the fugitive emulsion droplets are non-magnetic emulsion droplets, and the matrix fluid comprises magnetic particles. In some such embodiments, upon application of a magnetic field, the magnetic particles assume an alignment that forces the non-magnetic emulsion droplets into an elongated form. Application of the magnetic field may, in some cases, force the magnetic particles into an alignment that results in chaining of the non-magnetic emulsion droplets. In some embodiments in which the fugitive emulsion droplets are non-magnetic, the matrix fluid is a magnetic fluid (e.g., a ferrofluid).

In some embodiments in which the emulsion droplets are non-magnetic and the fluid phase of the emulsion comprises magnetic particles, the non-magnetic emulsion droplets are at least one order of magnitude (or at least two orders of magnitude, or at least three orders of magnitude) larger than the magnetic particles in the fluid phase.

In certain embodiments in which non-magnetic emulsion droplets are employed, the non-magnetic emulsion droplets have a relatively low magnetic susceptibility. According to certain embodiments, the non-magnetic emulsion droplets may have a non-dimensional magnetic volume susceptibility (as defined in the International System of Units) of less than about 0.001, less than about 0.0001, less than about 0.00001, less than about 0.000001, or less.

In some embodiments in which the emulsion droplets are fugitive emulsion droplets, the fluid phase of the matrix comprises electrode material (e.g., particles of Li(Ni,Co,Al)$O_2$, an $LiMnO_3$—$LiMO_2$ alloy, graphite, and/or other types of electrode materials, including those described elsewhere herein). For example, referring to FIG. 1A, in some embodiments, fluid 104 comprises electrode material. According to certain embodiments, the electrode material can be left behind after material has been removed from the matrix to form the porous article. For example, in some embodiments, the electrode material can be present in the fluid phase of the matrix, and emulsion droplets can be at least partially removed from the matrix, leaving behind electrode material within the resulting porous article. In some embodiments, a charge-storing electrode particle can be contained within the fluid of the matrix (e.g., in a suspension). Such particles include compounds that store charge in an electrochemical device by intercalating, alloying, or adsorbing a working ion. Such particles include but are not limited to ion-storing battery electrode particles of compounds such as an alkali ion-transition metal oxide, alkali ion transition metal phosphates, a metal or metal alloy capable of alloying with an alkali working ion, carbon in the form of disordered carbon, hard carbon, soft carbon, graphite, carbon nanotubes, fullerenes, graphenes, graphene oxides, and mixtures thereof. Specific non-limiting examples include $LiCoO_2$ (LCO), $LiFePO_4$ (LFP), $LiMn_2O_4$ (LMO), $Li(Ni,Mn,Co)O_2$ (NMC), $Li(Ni,Co,Al)O_2$ (NCA), $LiMnO_3$-$LiMO_2$ alloys where M comprises at least one first-row transition metal, silicon, tin, and their alloys, silicon-carbon mixtures or composites, sulfur and composites comprising sulfur, and/or other types of electrode particles).

In some embodiments, a binder (e.g., a polymeric binder) can be contained within the fluid of the matrix. For example, referring to FIG. 1A, in some embodiments, fluid 104 comprises a binder. In some such embodiments, polyvinyl alcohol can be used as the binder within the fluid matrix. Without being bound to any particular theory, it is believed that the use of polyvinyl alcohol as a binder can be particularly advantageous when emulsions are employed, as it has been found that polyvinyl alcohol can both stabilize the emulsion as well as serve as an effective binder of electrode particles in the resulting porous article.

In some embodiments, an emulsion stabilizer (e.g., a surfactant) may be contained within the fluid of the matrix. In some embodiments, polyvinyl alcohol can be used both as the binder and as the emulsion stabilizer.

In certain embodiments, a conductive additive (e.g., carbon particles, metal particles) may be present in the fluid of the matrix. For example, referring to FIG. 1A, in some embodiments, fluid 104 comprises one or more conductive additives.

A variety of fluids may be used in the matrix fluid component of the precursor (e.g., fluid 104 in FIGS. 1A-1D). The matrix fluid can be a liquid, according to certain embodiments. The matrix fluid may be aqueous or non-aqueous. In some embodiments, the matrix fluid component of the precursor comprises water. Other examples of matrix fluids that may be used include, but are not limited to hydrocarbons (e.g., butane, pentane, hexane); alcohols (e.g., ethylene glycol, isopropanol); aromatic compounds (e.g., benzene, naphtalene), and/or other compounds (e.g., n-methylpyrrolidone (NMP), dimethyl sulfoxide). Generally, the matrix fluid is selected such that it is immiscible with the emulsion droplets.

According to certain embodiments, the matrix fluid component of the precursor (e.g., fluid 104 in FIGS. 1A-1D) comprises water. In some such embodiments, the matrix fluid component comprises a water-soluble liquid alcohol, in addition to water. For example, in some embodiments, the matrix fluid component comprises methanol, ethanol, propanol, and/or butanol. In certain embodiments, it can be particularly advantageous to use ethanol as a water-soluble liquid alcohol. Suitable water-soluble liquid alcohols and associated arrangements are described in more detail below.

In some embodiments, the matrix fluid (e.g., fluid 104 in FIGS. 1A-1D) has a relatively high vapor pressure at 20° C. The use of fluids with relatively high vapor pressures can allow for the relatively easy removal of the fluid from the system (e.g., during a consolidation step or in another fluid removal step, described in more detail below), according to certain embodiments. In some embodiments, the matrix fluid component of the precursor has a vapor pressure of at least about 17.5 mmHg, at least about 18 mmHg, at least about 20 mmHg, at least about 50 mmHg, at least about 100 mmHg, at least about 500 mmHg, at least about 1000 mmHg, or at least about 2000 mmHg (and/or, in some embodiments, up to about 5000 mmHg, up to about 10,000 mmHg, or more) at 20° C.

Figure 1B:
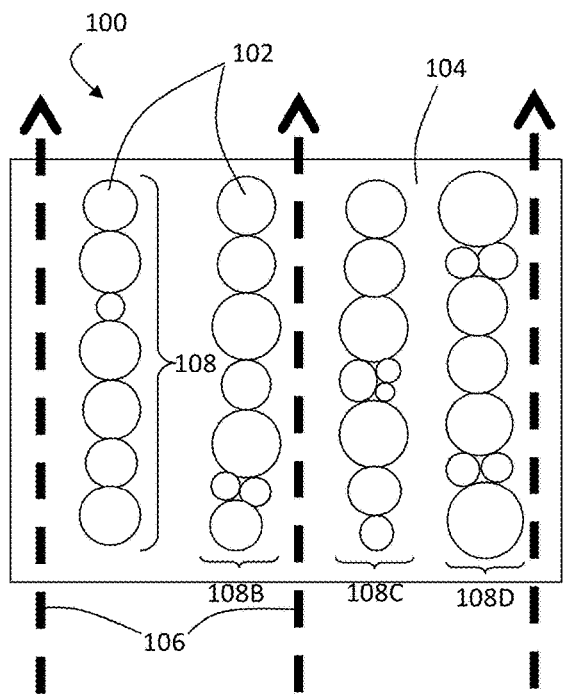

Some embodiments comprise exposing the precursor composition of the porous article (e.g., the matrix, such as matrix 100 in FIG. 1A) to a magnetic field. For example, as illustrated in FIG. 1B, matrix 100 has been exposed to a magnetic field such that the magnetic field (indicated via arrows 106) passes through matrix 100. The magnetic field may be applied using any suitable magnetic field source, such as a permanent magnet, an electromagnet, or any other suitable source of a magnetic field.

According to certain embodiments, exposing the precursor composition of the porous article to the magnetic field causes a set of emulsion droplets in the precursor composition to assume an elongated orientation. The emulsion droplets within the set may, prior to alignment, be originally present as individuated scattered or randomly positioned emulsion droplets. Certain embodiments comprise exposing a matrix comprising a liquid and fugitive emulsion droplets to a magnetic field such that the magnetic field causes at least a portion of the fugitive emulsion droplets to chain. Referring to FIG. 1B, for example, application of magnetic field 106 to matrix 100 causes a set of fugitive emulsion droplets 102 to assume an elongated orientation (within elongated region 108) within matrix 100. In FIG. 1B, fugitive emulsion droplets 102 have chained to form an elongated region 108 of emulsion droplets 102.

Certain embodiments comprise at least partially removing the set of emulsion droplets from the composition, thereby forming the porous article. In some such embodiments, pores of the porous article are at least partially defined by the elongated orientation of the set of emulsion droplets. For example, referring to FIGS. 1B and 1D, in some embodiments, fugitive emulsion droplets 102 within matrix 100 of FIG. 1B are at least partially removed from matrix 100 to form pores 110 within porous article 112 of FIG. 1D. Some embodiments comprise at least partially removing the fugitive emulsion droplets from the matrix to form anisotropic pores within the matrix. For example, in FIGS. 1B and 1D, fugitive emulsion droplets 102 within matrix 100 in FIG. 1B have been removed to form anisotropic pores 110 within porous article 112 of FIG. 1D.

Fugitive emulsion droplets can be removed from the matrix via a variety of mechanisms. According to certain embodiments, at least partially removing the fugitive emulsion droplets from the precursor composition (e.g., matrix) comprises removing at least about 30 wt %, at least about 40 wt %, at least about 50 wt %, at least about 75 wt %, at least about 90 wt %, at least about 95 wt %, or at least about 99 wt % of the fugitive emulsion droplet material from the precursor composition (e.g., matrix). In some embodiments, at least about 25 wt %, at least about 50 wt %, at least about 75 wt %, or at least about 90 wt % of the fluid phase remains in the porous article after the emulsion droplet material has been removed. In some embodiments, at least about 50 wt %, at least about 75 wt %, at least about 90 wt %, at least about 95 wt %, or at least about 99 wt % of the solids within the fluid phase remain in the porous article after the emulsion droplet material has been removed.

In some embodiments, at least a portion of the fugitive emulsion droplets can be removed by heating the fugitive emulsion droplets. Heating the fugitive emulsion droplets can lead to, for example, sublimation and/or evaporation of the fugitive emulsion droplets.

According to certain embodiments, at least partially removing the fugitive emulsion droplets from the matrix comprises washing the fugitive emulsion droplets with a fluid (e.g., a liquid), such as a solvent. For example, in some embodiments, at least a portion of the fugitive emulsion droplets can be removed by transporting a fluid through the emulsion such that the emulsion droplets are at least partially removed and at least a portion of the remaining matrix is left behind. In some such embodiments, the fluid that is transported through the emulsion can be miscible with the emulsion droplets and immiscible with the fluid phase in which the emulsion droplets are suspended.

According to certain embodiments, at least partially removing the fugitive emulsion droplets from the matrix comprises evaporating fugitive emulsion droplets from the matrix. Evaporating fugitive emulsion droplets from the matrix can involve the application of heat, according to certain embodiments. In other cases, evaporating fugitive emulsion droplets can be performed without applying heat (e.g., by exposing the fugitive emulsion droplets to the ambient environment, which may optionally be at least a partial vacuum, such that the fugitive emulsion droplets is evaporated without the application of heat). In some embodiments, evaporating fugitive emulsion droplets comprises exposing the fugitive emulsion droplets to at least a partial vacuum (e.g., to an absolute pressure of less than about 0.9 atm, less than about 0.8 atm, less than about 0.5 atm, less than about 0.25 atm, or lower).

According to certain embodiments, the step of at least partially removing the fugitive emulsion droplets from the matrix is performed without sintering particles within the matrix. Those of ordinary skill in the art are familiar with sintering, which is a process in which heat is applied to an article such that individuated particles within the article are fused to form a single mass. According to certain embodiments, fewer than 25%, fewer than 10%, fewer than 5%, fewer than 2%, fewer than 1%, fewer than 0.5%, or fewer than 0.1% of the particles within the precursor are sintered to another particle during the step of at least partially removing the fugitive emulsion droplets from the matrix. According to certain embodiments, fewer than 25%, fewer than 10%, fewer than 5%, fewer than 2%, fewer than 1%, fewer than 0.5%, or fewer than 0.1% of the electrode particles within the precursor are sintered to another electrode particle during the step of at least partially removing the fugitive emulsion droplets from the matrix. The invention is not limited to embodiments in which sintering does not occur during the removal of fugitive emulsion droplets, and in some embodiments, particles may be sintered (to any degree) during removal of fugitive emulsion droplets.

The method by which fugitive emulsion droplets are at least partially removed from the matrix can depend upon the material from which the fugitive emulsion droplets are made and/or the material from which the matrix fluid is made. For example, in some embodiments, the emulsion droplets contain oil-based ferrofluid, and the emulsion droplets may be washed with a hydrophobic liquid (e.g., a hydrocarbon oil) to remove the emulsion droplets. In some embodiments, the emulsion droplets contain liquid with a vapor pressure that is higher than the vapor pressure of the liquid(s) in the fluid phase of the emulsion, and the emulsion droplets may be selectively evaporated. Other removal mechanisms are also possible. Those of ordinary skill in the art, given the guidance provided by the present disclosure, would be capable of selecting an appropriate fugitive emulsion droplet removal mechanism for a particular set of materials using no more than routine experimentation.

According to certain embodiments, after at least part of the fugitive emulsion droplets are removed from the matrix, at least a portion of the remaining matrix is left behind. The remaining portion of the matrix can comprise a variety of materials. In some cases, the portion of the matrix that is left behind comprises electrode material (e.g., electrode particles). For example, referring to FIGS. 1A-1D, in some embodiments, fluid 104 of matrix 100 comprises a suspension of electrode particles (which electrode particles are not illustrated in FIGS. 1A-1D, for purposes of clarity). In some embodiments, after fugitive emulsion droplets have been at least partially removed from the matrix, electrode particles can be present within the remaining portions of the matrix. Referring to FIGS. 1A-1D, for example, in some embodiments, after fugitive emulsion droplets 102 (e.g., oil-based ferrofluid emulsion droplets) have been at least partially removed from matrix 100, electrode particles may be present within remaining portions 114 of the matrix (illustrated in FIG. 1D). The electrode particles can comprise, for example, LCO, LMO, NMC, NCA, an $LiMnO_3$—$LiMO_2$ alloy, silicon, and/or graphite. In some embodiments, the electrode particles comprise $Li(Ni,Co,Al)O_2$, an $LiMnO_3$—$LiMO_2$ alloy, and/or graphite. Other types of electrode materials (which can be used as electrode particles), described in more detail below, are also possible.

Other materials may also be present in the remaining portion of the matrix, in addition to or in place of electrode particles. For example, in some embodiments a binder (e.g., a polymeric binder, such as polyvinyl alcohol) and/or a conductive additive (e.g., carbon particles, metal particles) may be present in the matrix after the fugitive particles have been at least partially removed. In some embodiments, an emulsion stabilizer (e.g., a surfactant, such as polyvinyl alcohol) may be present in the matrix after the fugitive particles have been at least partially removed. Other materials are also possible.

While embodiments have been described in which emulsion droplets are removed from a precursor of a porous article to produce pores of the porous article, in some embodiments, fluid can be removed from the precursor to produce pores within the porous article. The fluid that is removed from the precursor can be a magnetic fluid, according to certain such embodiments. Thus, according to some embodiments, the porous article can be made by at least partially removing magnetic fluid from a precursor composition, whereby pores are at least partially defined by a spatial distribution of the magnetic fluid. One example of such an arrangements is illustrated in FIGS. 2A-2D.

Figure 2A:
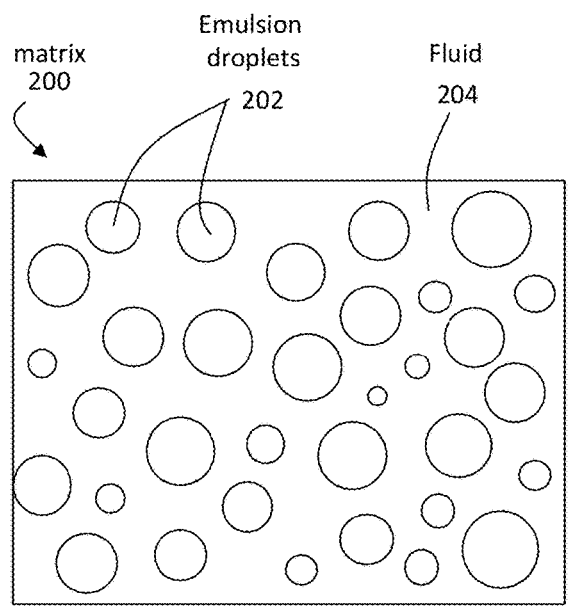
FIGS. 2A-2D are, according to some embodiments, schematic cross-sectional diagrams illustrating the formation of porous articles using fugitive magnetic fluid, according to one set of embodiments.

In FIG. 2A, (and accompanying FIGS. 2B-2D), emulsion droplets 202 of matrix 200 are suspended in magnetic fluid 204. In FIGS. 2A-2D, emulsion droplets 202 are non-fugitive emulsion droplets, which is to say, the emulsion droplets remain with the matrix material after other matrix material is removed to form the porous article. Any of a variety of types of magnetic fluids could be used as magnetic fluid 204. In some embodiments, the magnetic fluid is a ferrofluid.

A variety of types of materials can be included in the non-fugitive emulsion droplets, according to certain embodiments. In certain embodiments, non-magnetic particles can be suspended in the magnetic fluid. Any of the non-magnetic materials described above with respect to embodiments in which fugitive emulsion droplets are employed could be used, for example. According to certain embodiments, the particles suspended in the magnetic fluid can be electrode particles. The electrode particles may be made of any of the materials described above or elsewhere herein. In some embodiments, the electrode particles comprise LCO, LMO, NMC, NCA, an $LiMnO_3$-$LiMO_2$ alloy, silicon, and/or graphite. In some embodiments, the electrode particles comprise $Li(Ni,Co,Al)O_2$, an $LiMnO_3$—$LiMO_2$ alloy, and/or graphite.

Figure 2B:
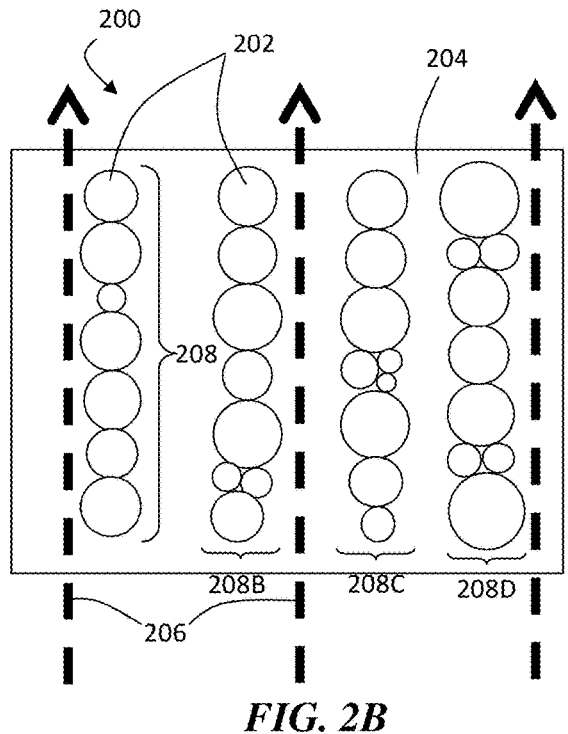

Some embodiments comprise exposing the precursor composition comprising the magnetic fluid and the non-fugitive emulsion droplets (e.g., the matrix, such as matrix 200 in FIG. 2A) to a magnetic field. For example, as illustrated in FIG. 2B, matrix 200 has been exposed to a magnetic field such that the magnetic field (indicated via arrows 206) passes through matrix 200. As noted above, the magnetic field may be applied using any suitable magnetic field source, such as a permanent magnet, an electromagnet, or any other suitable source of a magnetic field.

Similar to certain embodiments employing fugitive emulsion droplets, certain embodiments employing non-fugitive emulsion droplets suspended in fugitive magnetic fluid comprise exposing the precursor composition of the porous article to a magnetic field to cause the emulsion droplets in the precursor composition to assume an elongated orientation. For example, certain embodiments comprise exposing a matrix comprising a magnetic fluid and non-fugitive emulsion droplets to a magnetic field such that the magnetic field causes at least a portion of the emulsion droplets to chain. Referring to FIG. 2B, for example, application of magnetic field 206 to matrix 200 causes emulsion droplets 202 to assume an elongated orientation (illustrated as regions 208) within matrix 200. In FIG. 2B, emulsion droplets 202 have chained to form elongated region 208 of emulsion droplets 202.

Certain embodiments comprise at least partially removing the magnetic fluid from the composition, which can form anisotropic pores within the matrix. In some such embodiments, pores of the porous article are at least partially defined by the spatial distribution of the magnetic fluid in the matrix. For example, referring to FIGS. 2B and 2D, in some embodiments, magnetic fluid 204 within matrix 200 of FIG. 2B is at least partially removed from matrix 200 to form pores 210 within porous article 212 of FIG. 2D. Some embodiments comprise at least partially removing the magnetic fluid from the matrix to form anisotropic pores within the matrix. For example, in FIGS. 2B and 2D, magnetic fluid 204 within matrix 200 in FIG. 2B has been removed to form anisotropic pores 210 within porous article 212 of FIG. 2D.

According to certain embodiments, at least partially removing the magnetic fluid from the precursor composition (e.g., matrix) comprises removing at least about 30 wt %, at least about 40 wt %, at least about 50 wt %, at least about 50 wt %, at least about 75 wt %, at least about 90 wt %, at least about 95 wt %, or at least about 99 wt % of the magnetic fluid from the precursor composition (e.g., matrix). In some embodiments, at least about 25 wt %, at least about 50 wt %, at least about 75 wt %, or at least about 90 wt % of the emulsion droplet phase remains in the porous article after the magnetic fluid has been removed. In some embodiments, at least about 50 wt %, at least about 75 wt %, at least about 90 wt %, at least about 95 wt %, or at least about 99 wt % of the solids within the emulsion droplet phase remain in the porous article after the magnetic fluid has been removed.

Magnetic fluid can be removed from the matrix via a variety of mechanisms. According to certain embodiments, at least partially removing the magnetic fluid from the matrix comprises washing the magnetic fluid with another fluid (e.g., a liquid), such as a solvent. For example, in some embodiments, at least a portion of the magnetic fluid can be removed by contacting the magnetic fluid with another fluid that is miscible with the magnetic fluid such that the magnetic fluid is washed away. In certain embodiments, at least a portion of the magnetic fluid can be removed by draining the magnetic fluid from the matrix while leaving solid material (e.g., comprising solid material present within emulsion droplets 202 in FIGS. 2A-2D) behind. According to certain embodiments, at least partially removing the magnetic fluid from the matrix comprises evaporating magnetic fluid from the matrix. Evaporating magnetic fluid from the matrix can involve the application of heat, according to certain embodiments. In other cases, evaporating magnetic fluid can be performed without applying heat (e.g., by exposing the magnetic fluid to the ambient environment, which may optionally be at least a partial vacuum, such that magnetic fluid is evaporated without the application of heat). In some embodiments, evaporating magnetic fluid comprises exposing the magnetic fluid to at least a partial vacuum (e.g., to an absolute pressure of less than about 0.9 atm, less than about 0.8 atm, less than about 0.5 atm, less than about 0.25 atm, or lower).

According to certain embodiments, the step of at least partially removing the magnetic fluid from the matrix is performed without substantially sintering particles within the matrix. According to certain embodiments, fewer than 25%, fewer than 10%, fewer than 5%, fewer than 2%, fewer than 1%, fewer than 0.5%, or fewer than 0.1% of the particles within the precursor are sintered to another particle during the step of at least partially removing the magnetic fluid from the matrix. According to some embodiments, fewer than 25%, fewer than 10%, fewer than 5%, fewer than 2%, fewer than 1%, fewer than 0.5%, or fewer than 0.1% of the electrode particles within the precursor are sintered to another electrode particle during the step of at least partially removing the magnetic fluid from the matrix. The invention is not limited to embodiments in which sintering does not occur during the removal of magnetic fluid, and in some embodiments, particles may be sintered (to any degree) during removal of magnetic fluid.

The method by which magnetic fluid is at least partially removed from the matrix can depend upon the material from which the magnetic fluid is made and/or the material from which the emulsion droplets in the matrix are made. Those of ordinary skill in the art, given the guidance provided by the present disclosure, would be capable of selecting an appropriate magnetic fluid removal mechanism for a particular set of materials using no more than routine experimentation.

According to certain embodiments, after at least a part of the magnetic fluid is removed from the matrix, at least a portion of the remaining matrix is left behind. The remaining portion of the matrix can comprise a variety of materials. In some cases, the portion of the matrix that is left behind comprises particles, such as electrode particles. For example, referring to FIGS. 2A-2D, in some embodiments, after magnetic fluid 204 has been at least partially removed from the matrix, electrode particles within emulsion droplets 202 can be present within the remaining portions of the matrix. The electrode particles can comprise, for example, $Li(Ni,Co,Al)O_2$, an $LiMnO_3$—$LiMO_2$ alloy, and/or graphite. Other types of electrode materials, described in more detail below, are also possible.

Other materials may also be present in the remaining portion of the matrix, in addition to or in place of electrode particles. For example, in some embodiments a binder (e.g., a polymeric binder, such as polyvinyl alcohol) and/or a conductive additive (e.g., carbon particles, metal particles) may be present in the matrix after the magnetic fluid has been at least partially removed. In some embodiments, an emulsion stabilizer (e.g., a surfactant, such as polyvinyl alcohol) may be present in the matrix after the magnetic fluid has been at least partially removed. Other materials are also possible.

As outlined above, certain embodiments comprise applying a magnetic field to a precursor to cause a set of emulsion droplets in a matrix of the precursor to chain. Chaining of a plurality of emulsion droplets generally refers to a situation in which the emulsion droplets assume an elongated orientation that corresponds to a magnetic field line of an applied magnetic field. Chained emulsion droplets may directly contact at least one other emulsion droplets within the chain, such that the collection of emulsion droplets in contact with at least one other emulsion droplet forms a chain.

In certain embodiments in which a magnetic field is applied to a precursor such that emulsion droplets form one or more elongated regions within the matrix, the elongated region(s) can have relatively large aspect ratios. For example, in some embodiments, elongated regions made up of a plurality of emulsion droplets (e.g., regions 108, 108B, 108C, and 108D in FIG. 1B; regions 208, 208B, 208C, and 208D in FIG. 2B) can have an aspect ratio of at least about 3:1, at least about 5:1, at least about 10:1, at least about 50:1, at least about 100:1, or at least about 1000:1 (and/or, in some embodiments, up to about 10,000:1 up to about 100,000:1, or greater). In some embodiments, a chain of emulsion droplets can have an aspect ratio of at least about 3:1, at least about 5:1, at least about 10:1, at least about 50:1, at least about 100:1, or at least about 1000:1 (and/or, in some embodiments, up to about 10,000:1 up to about 100,000:1, or greater). The aspect ratio of an article is determined by comparing the largest cross-sectional dimension of the article to the largest dimension of the article that is orthogonal to the largest cross-sectional dimension of the article.

According to certain embodiments, exposing the precursor composition to the magnetic field causes emulsion droplets in the precursor composition to form multiple elongated regions (e.g., multiple chains). For example, referring to FIG. 1B, in some embodiments, application of magnetic field 106 causes emulsion droplets 102 within matrix 100 to form multiple elongated regions, including elongated region 108 and elongated regions 108B, 108C, and 108D. As another example, referring to FIG. 2B, in certain embodiments, application of magnetic field 206 causes emulsion droplets 202 within matrix 200 to form multiple elongated regions, including elongated region 208 and elongated regions 208B, 208C, and 208D.

According to certain embodiments, when multiple elongated regions (e.g., multiple chains) are formed, the longitudinal axes of at least some of the elongated regions (e.g., chains) can be substantially aligned with each other. For example, referring to FIG. 1B, the longitudinal axes of elongated regions 108, 108B, 108C, and 108D are substantially aligned with each other. As another example, referring to FIG. 2B, the longitudinal axes of elongated regions 208, 208B, 208C, and 208D are substantially aligned with each other. For the purposes of this determination, the longitudinal axis of an elongated region is linear and corresponds to the longest dimension that extends from one end of the elongated region to the other. In certain embodiments, after application of the magnetic field, the matrix comprises a collection of at least 10 (or at least 25, at least 50, at least 100, or at least 1000) elongated regions such that, for each elongated region in the collection, the longitudinal axis of the elongated region is within about 15° (or within about 10°, within about 5°, within about 2°, or within about 1°) of parallel to at least about 50% (or at least about 75%, at least about 90%, or at least about 95%) of the remaining elongated regions within the collection.

According to certain embodiments, removal of elongated regions of material (e.g., one or more elongated sets or chains of emulsion droplets within the matrix, magnetic fluid from the matrix) can result in the formation of anisotropic pores within the porous article. In some such embodiments, the anisotropic pores within the porous article can have relatively large aspect ratios. For example, in some embodiments, one or more anisotropic pores within the porous article (e.g., pores 110 in FIG. 1D, pores 210 in FIG. 2D) can have an aspect ratio of at least about 3:1, at least about 5:1, at least about 10:1, at least about 50:1, at least about 100:1, or at least about 1000:1 (and/or, in some embodiments, up to about 10,000:1 up to about 100,000:1, or greater).

According to certain embodiments, removal of fugitive emulsion droplets and/or magnetic fluid from the matrix can result in the formation of multiple anisotropic pores in the porous article. For example, referring to FIG. 1D, removal of fugitive emulsion droplets 102 results in the formation of multiple anisotropic pores 110 in article 112 of FIG. 1D. As another example, referring to FIG. 2D, removal of magnetic fluid 204 results in the formation of multiple anisotropic pores 210 in article 212 of FIG. 2D. According to certain embodiments, when multiple anisotropic pores are formed, the longitudinal axes of at least some of the anisotropic pores can be substantially aligned with each other. For example, referring to FIG. 1D, the longitudinal axes of pores 110 are substantially aligned with each other. As another example, referring to FIG. 2D, the longitudinal axes of anisotropic pores 210 are substantially aligned with each other. For the purposes of this determination, the longitudinal axis of a pore is linear and is the longest dimension that extends from one end of the pore to the other. In certain embodiments, the porous article (e.g., article 112 in FIG. 1D and/or article 212 in FIG. 2D) comprises a collection of at least 10 (or at least 25, at least 50, at least 100, or at least 1000) anisotropic pores such that, for each anisotropic pore in the collection, the longitudinal axis of the anisotropic pore is within about 15° (or within about 10°, within about 5°, within about 2°, or within about 1°) of parallel to at least about 50% (or at least about 75%, at least about 90%, or at least about 95%) of the remaining anisotropic pores within the collection.

In some embodiments, the porous article (e.g., electrode) comprises a collection of at least 10 (or at least 25, at least 50, at least 100, or at least 1000) anisotropic pores such that, on average (calculated as a number average), the longitudinal axes of the anisotropic pores in the collection are within 15°, within 10°, within 5°, or within 2° of normal (i.e., perpendicular) to an exterior plane of the porous article (e.g., electrode). To illustrate, in FIG. 1D, porous article 112 comprises four anisotropic pores 110, each of which has a longitudinal axis that forms an angle of essentially 0° with the normal of external surface 130 of article 112. Thus, the four anisotropic pores in FIG. 1D—on average—are within 15° (and are also within 10°, within 5°, and within 2°) of normal to exterior surface 130 of article 112.

In some embodiments, the anisotropic pores within the collection (e.g., of at least 10, at least 25, at least 50, at least 100, or at least 1000 anisotropic pores) have longitudinal axes defining a distribution of orientations with respect to the normal of a plane of the porous article. In some such embodiments, the maximum of the angles formed between the longitudinal axes of the anisotropic pores in the collection and the normal of the plane is less than 45°, less than 30°, less than 25°, less than 15°, less than 10°, less than 5°, or less than 2°.

Certain embodiments comprise consolidating the precursor composition (e.g., consolidating the matrix) to form the porous article. The consolidation step, when present, can employ any mechanism that enhances the mechanical stability of the portions of the matrix that remain after the fugitive emulsion droplets and/or fugitive magnetic fluid is removed from the precursor composition. In some embodiments, consolidating the composition comprises consolidating the composition at least to the extent that the composition becomes self-supporting in the absence of the fugitive emulsion droplets. In certain embodiments, consolidating the composition comprises consolidating the composition at least to the extent that the composition becomes self-supporting in the absence of the magnetic fluid. Those of ordinary skill in the art would understand that a self-supporting material is a material that is able to maintain its shape outside a container under the force of gravity. According to certain embodiments, the self-supporting material does not dissociate into multiple pieces upon suspending the material from one end under the force of gravity.

Consolidation of the matrix can be achieved via a number of suitable mechanisms. In some embodiments, consolidation of the matrix comprises hardening at least a portion of the matrix (e.g., via polymerization, cross-linking, gelation, solidification of a liquid, of any other hardening mechanism). For example, in some embodiments, consolidating the matrix comprises polymerizing the matrix. The matrix may comprise, for example, a monomer or other polymerizable component, and consolidating the matrix may comprise activating a polymerization step (e.g., by adding or activating a chemical initiator, such as a polymerization agent). In some embodiments, consolidating the matrix comprises gelling the matrix. For example, the matrix may comprise a gel precursor (e.g., a monomer or other material that can be reacted to form a gel matrix), and consolidating the matrix may comprise initiating a gelation reaction. According to certain embodiments, consolidating the matrix comprises solidifying a liquid phase of the matrix. According to certain embodiments, consolidating the matrix comprises removing at least a portion of the liquid from the matrix. In some embodiments, the consolidation step comprises sintering particles (e.g., sintering electrode particles) within the matrix.

Figure 1C:
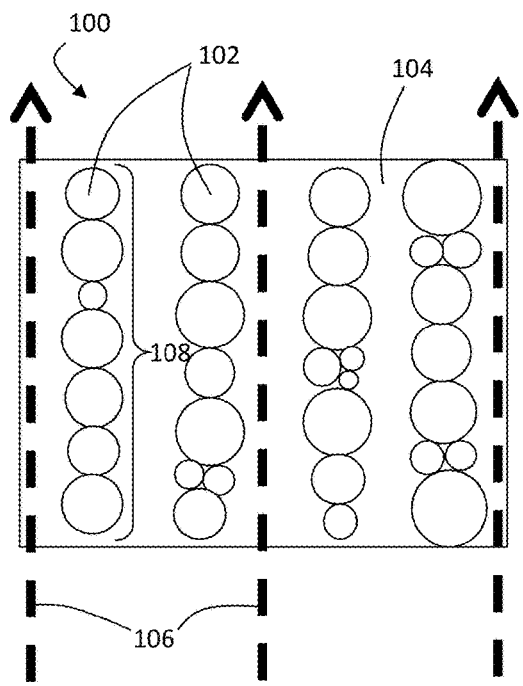
Figure 1D:
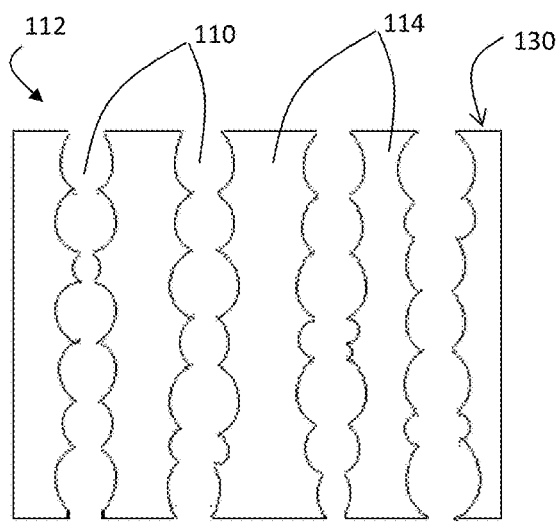

The consolidation step and the fugitive material removal step may be performed as separate steps, according to certain embodiments. For example, in some embodiments, the consolidation step may be performed prior to at least partially removing the fugitive emulsion droplets from the matrix. Referring to FIG. 1D, for example, in some embodiments, the material within portions 114 of article 112 may be consolidated prior to removing at least a portion of fugitive emulsion droplets 102 from matrix 100. In other embodiments, the consolidation step may be performed after removing at least portions of fugitive emulsion droplets from the matrix.

In certain embodiments, a consolidation step may be performed prior to at least partially removing magnetic fluid from the matrix. Referring to FIG. 2D, for example, in some embodiments, material within emulsion droplets 202 may be consolidated prior to removing at least a portion of magnetic fluid 204 from matrix 200. In other embodiments, the consolidation step may be performed after removing at least a portion of the magnetic fluid from the matrix.

In certain cases, it may be beneficial to perform the consolidation and fugitive material removal as separate steps, as doing so may aid in obtaining more complete removal of fugitive material from the precursor while maintaining the desired shape of the final porous article. Of course, the invention is not limited to separate consolidation and fugitive material removal steps (when the optional consolidation step is present), and in other embodiments, consolidation and fugitive material removal steps can be performed simultaneously.

According to certain embodiments, the consolidation step is performed in the substantial absence of sintering. According to certain embodiments, fewer than 25%, fewer than 10%, fewer than 5%, fewer than 2%, fewer than 1%, fewer than 0.5%, or fewer than 0.1% of the particles within the precursor are sintered to another particle during the consolidation step. According to some embodiments, fewer than 25%, fewer than 10%, fewer than 5%, fewer than 2%, fewer than 1%, fewer than 0.5%, or fewer than 0.1% of the electrode particles within the precursor are sintered to another electrode particle during the consolidation step. The invention is not limited to embodiments in which sintering does not occur during the consolidation step, and in some embodiments, particles may be sintered (to any degree) during consolidation.

In some embodiments, inventive methods may include an optional matrix fluid removal step. For example, certain embodiments comprise removing at least a portion of the matrix fluid (e.g., at least a portion of the matrix liquid) to form the porous article. Referring to FIGS. 1B-1C, for example, in some embodiments, at least a portion of fluid 104 can be removed from matrix 100 to form the matrix illustrated in FIG. 1C (which can contain less fluid 104 than matrix 100 in FIG. 1B). As another example, referring to FIGS. 2B-2C, in some embodiments, at least a portion of fluid 204 can be removed from matrix 200 to form the matrix illustrated in FIG. 2C (which can contain less fluid 204 than matrix 200 in FIG. 2B).

The matrix fluid removal step, when present, can employ any of a variety of suitable mechanisms. In certain embodiments, at least partially removing the matrix fluid comprises evaporating matrix fluid. Evaporating matrix fluid from the precursor can involve the application of heat, according to certain embodiments. In other cases, evaporating matrix fluid can be performed without applying heat (e.g., by exposing the matrix fluid to the ambient environment, which may optionally be at least a partial vacuum, such that matrix fluid is evaporated without the application of heat). In some embodiments, evaporating matrix fluid comprises exposing the matrix fluid to at least a partial vacuum (e.g., to an absolute pressure of less than about 0.9 atm, less than about 0.8 atm, less than about 0.5 atm, less than about 0.25 atm, or lower). According to certain embodiments, at least partially removing the matrix fluid comprises washing the matrix fluid with another fluid (e.g., a liquid), such as a solvent. In some embodiments, at least partially removing the matrix fluid comprises draining the matrix fluid from the precursor composition.

The matrix fluid removal step and the fugitive material removal step may be performed as separate steps, according to certain embodiments. For example, in some embodiments, the matrix fluid removal step may be performed prior to at least partially removing the fugitive emulsion droplets from the matrix. Referring to FIGS. 1B-1D, for example, in some embodiments, matrix fluid 104 may be at least partially removed prior to removing at least a portion of fugitive emulsion droplets 102 from matrix 100. In other embodiments, the matrix fluid removal step may be performed after removing at least portions of fugitive emulsion droplets from the matrix. Matrix fluid removal can also be performed simultaneously with removal of at least a portion of the fugitive emulsion droplets from the matrix, according to some embodiments.

Figure 2C:
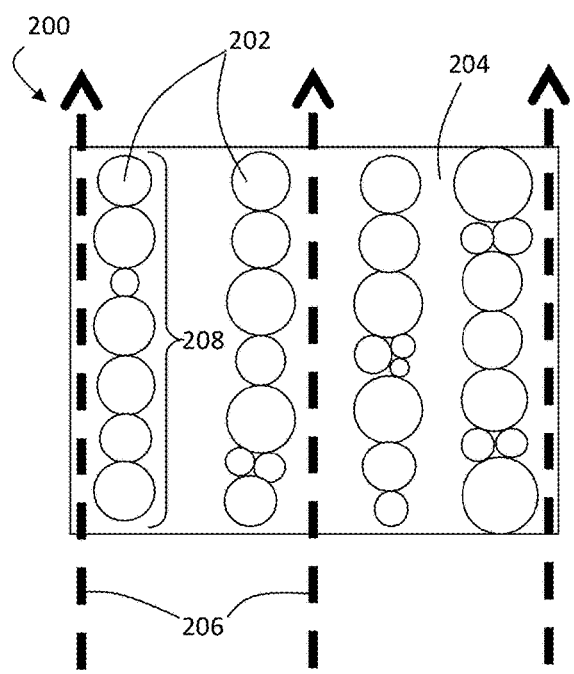
Figure 2D:
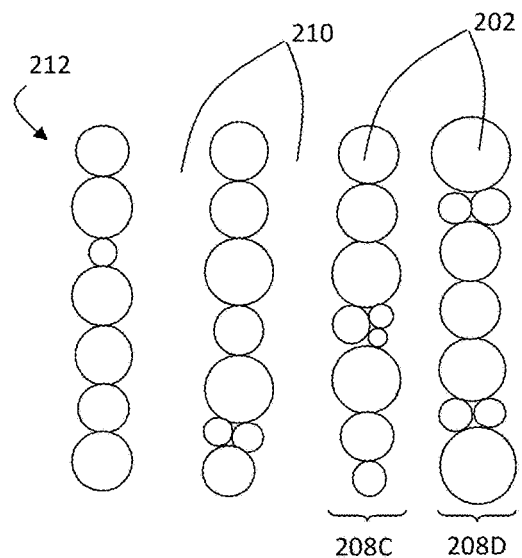

In certain embodiments, a matrix fluid removal step may be performed prior to at least partially removing magnetic fluid from the matrix, Referring to FIG. 2B-2D, for example, in some embodiments, magnetic fluid 204 may be at least partially removed from matrix 200 (e.g., to form the matrix illustrated in FIG. 2C from the matrix illustrated in FIG. 2B) prior to performing an optional consolidation step, after which additional magnetic fluid 204 may be removed from the remainder of the matrix (e.g., to form article 212 illustrated in FIG. 2D from matrix 200 illustrated in FIG. 2C).

According to certain embodiments, an optional matrix fluid removal step and an optional consolidation step may each be performed independently (in time) from each other.

The emulsion droplets used to form elongated regions can have any suitable size. In some embodiments, at least some of the emulsion droplets have a maximum cross-sectional dimension of about 5 mm or less, about 1 mm or less, about 100 µm or less, about 50 µm or less, about 10 µm or less, about 5 µm or less, about 1 µm or less, about 500 nm or less, about 100 nm or less, or about 50 nm or less. In some embodiments, at least some of the emulsion droplets have a maximum cross-sectional dimension of at least about 10 nm, at least about 20 nm, at least about 50 nm, at least about 100 nm, at least about 500 nm, or at least about 1 µm. In some embodiments, the number average of the maximum cross-sectional dimensions of the emulsion droplets can be about 5 mm or less, about 1 mm or less, about 100 µm or less, about 50 µm or less, about 10 µm or less, about 5 µm or less, about 1 µm or less, about 500 nm or less, about 100 nm or less, about 50 nm or less, and/or, in some embodiments, at least about 10 nm, at least about 20 nm, at least about 50 nm, at least about 100 nm, at least about 500 nm, or at least about 1 µm.

The use of multiple particles/emulsion droplets within an elongated region of fugitive material (e.g., multiple particles within a chain of fugitive material) to form anisotropic pores (e.g., as described above with respect to FIGS. 1A-1D and 2A-2D) can be advantageous, according to certain embodiments. For example, magnetically-driven movement of relatively small particles and/or emulsion droplets has been found to be easier to achieve, in certain cases, than magnetically-driven movement of sets of elongated rods, as the individuated particles/emulsion droplets are less likely to meet interference from other components of the matrix during magnetically-driven arrangement of the particles. In addition, the use of particles and/or emulsion droplets to form chains of elongated regions of fugitive material provides flexibility in the size of pores that are formed in the final porous article.

The magnetic fields to which the precursor and/or matrix compositions are exposed can be generated using a variety of equipment and/or methods. In certain embodiments, the magnetic field can be generated using a permanent magnet. All or part of the permanent magnet may be made of, for example, neodymium, ferrite, metals and alloys comprising one or more of iron, chromium, and/or cobalt, or other permanently magnetic materials. In some embodiments, the magnetic field can be generated using an electromagnet.

According to certain embodiments, the magnetic field can have a field strength of at least 20 Gauss (e.g., 20-30 Gauss).

Magnetic fields with higher strengths (e.g., at least 100 Gauss, at least 500 Gauss, or stronger) could also be used.

Certain embodiments comprise exposing the precursor composition and/or matrix to a magnetic field having a magnetic field gradient. For example, in some embodiments, the precursor composition and/or matrix is exposed to a magnetic field having a magnetic field gradient of at least about 100 Oe/cm, at least about 500 Oe/cm, or at least about 1000 Oe/cm (and/or, in some embodiments, up to about 3000 Oe/cm, or more). The use of a magnetic field with a magnetic field gradient can, according to certain embodiments, allow one to align the ends of the elongated regions of material (e.g., elongated regions 108 in FIG. 1B, elongated regions 208 in FIG. 2B) such that the ends are in substantially the same plane. Such alignment may be useful in making electrodes or other porous articles with pore endpoints that lie within substantially a single plane.

According to certain embodiments, the magnetic field can be configured such that the magnetic field lines are substantially linear as they pass through the precursor composition and/or matrix. For example, as illustrated in FIGS. 1B-1C and 2B-2C, the magnetic field lines (indicated by the dashed arrows) are linear. One of ordinary skill in the art, given the present disclosure, would be capable of generating linear or substantially linear magnetic field lines by, for example, selecting an appropriate position of the magnetic field source (e.g., a magnet and/or an electromagnet) and/or by adjusting the strength of the magnetic field. In certain embodiments, at least one magnetic field line that passes through the precursor composition and/or matrix has a minimum radius of curvature, within the precursor composition and/or matrix, of at least about 1 meter, at least about 5 meters, at least about 10 meters, or at least about 100 meters.

According to certain embodiments, the source of the magnetic field (e.g., a permanent magnet, an electromagnet) can be positioned such that the shortest distance between the magnetic field source and the emulsion is between 0.5 inches and 0.7 inches. In certain cases, positioning the magnetic field source too close to the emulsion can cause flocculation and/or coalescence of the emulsion droplets, which can prevent the formation of elongated pores. In some cases, if the magnetic field source is positioned too far away from the emulsion, the magnetic field within the emulsion can be too small to cause emulsion droplet chaining. It should be understood that the invention is not limited to embodiments in which the magnetic field source is positioned between 0.5 inches and 0.7 inches away from the emulsion, and in other embodiments, other distances can be used.

Some embodiments are related to inventive porous articles. Certain of the inventive porous articles described herein can be used as electrodes (e.g., in batteries).

Certain embodiments are related to porous articles comprising pores at least partially defined by a set of emulsion droplets removed from the article, the set of emulsion droplets removed from the article being aligned in an elongated orientation. One example of such an article is illustrated in FIG. 1D. In FIG. 1D, porous article 112 comprises pores 110. Each of pores 110 in porous article 112 is defined by a set of emulsion droplets (e.g., sets 108, 108B, 108C, and 108D of particles 102) removed from the article, for example, as described above with respect to FIGS. 1B-1D. The sets of emulsion droplets removed from pores 110 in FIG. 1D, as illustrated in FIGS. 1B-1C, are aligned in an elongated orientation. For example, referring to FIG. 1B, emulsion droplets 102 are arranged in set 108 such that set 108 is aligned in an elongated orientation (vertically, as shown in FIG. 1B).

Those of ordinary skill in the art would be capable of determining whether a pore is at least partially defined by a set of emulsion droplets being removed from the article, for example, by visually inspecting a cross-section of the pore (optionally, after magnification). For example, pores at least partially defined by a set of emulsion droplets being removed from the article may have sidewalls with multiple concave surface portions, the intersections of which may define peaks indicating the boundary between adjacent emulsion droplets previously occupying the space of the pore. In some cases, residual emulsion material may be present on or within the sidewalls of a pore that is at least partially defined by a set of emulsion droplets being removed from an article within which the pore is positioned.

According to certain embodiments, the pores of the porous article may be in an orientation associated with magnetic field lines. For example, the longitudinal axes of the pores may be parallel to (or substantially parallel to) magnetic field lines of the magnetic field used to align the emulsion droplets that were removed to form the pore. Referring to FIG. 1D, for example, the longitudinal axes of pores 110 are oriented such that they are parallel to magnetic field lines 106 of FIG. 1B.

In some embodiments, the method by which the porous article is produced does not involve substantial sintering. Thus, according to certain embodiments, the porous article is not substantially sintered. According to certain embodiments, fewer than 25%, fewer than 10%, fewer than 5%, fewer than 2%, fewer than 1%, fewer than 0.5%, or fewer than 0.1% of the particles within the precursor used to make the porous article are sintered to another particle during the formation of the porous article. According to certain embodiments, fewer than 25%, fewer than 10%, fewer than 5%, fewer than 2%, fewer than 1%, fewer than 0.5%, or fewer than 0.1% of the electrode particles within the precursor used to make the porous article are sintered to another electrode particle during the formation of the porous article. Thus, according to some embodiments, the porous article contains sintered groups of particles that represent fewer than 25%, fewer than 10%, fewer than 5%, fewer than 2%, fewer than 1%, fewer than 0.5%, or fewer than 0.1% of the individuated particles used to make the porous article. In some embodiments, the porous article contains sintered groups of electrode particles that represent fewer than 25%, fewer than 10%, fewer than 5%, fewer than 2%, fewer than 1%, fewer than 0.5%, or fewer than 0.1% of the individuated electrode particles used to make the porous article. One of ordinary skill in the art would be capable of calculating the percentage of individuated particles used to make a porous article that are present within sintered groups of particles (S %) as follows:

$$S\% = \frac{P_s}{P_s + P_I} \times 100\%$$

wherein $P_S$ is the number of particles present within sintered groups of particles in the porous article and $P_I$ is the number of individuated, non-sintered particles in the porous article. $P_S$ and $P_I$ may be determined, for example, by examining images of the porous article, optionally under suitable magnification.

The invention is not limited to embodiments in which sintering does not occur during production of the porous article, and in some embodiments, particles may be sintered (to any degree) during the production of the porous article.

According to certain embodiments, the porous article may comprise anisotropic pores having longitudinal axes that are substantially aligned relative to each other. In some embodiments, the porous article comprises a collection of at least 10 (or at least 25, at least 50, at least 100, or at least 1000) anisotropic pores such that, for each anisotropic pore in the collection, the longitudinal axis of the anisotropic pore is within about 15° (or within about 10°, within about 5°, within about 2°, or within about 1°) of parallel to at least about 50% (or at least about 75%, at least about 90%, or at least about 95%) of the remaining anisotropic pores within the collection.

In some embodiments, the porous article (e.g., electrode) comprises a collection of at least 10 (or at least 25, at least 50, at least 100, or at least 1000) anisotropic pores such that, on average (calculated as a number average), the longitudinal axes of the anisotropic pores in the collection are within 15°, within 10°, within 5°, or within 2° of normal (i.e., perpendicular) to an exterior plane of the porous article (e.g., electrode). In some embodiments, the anisotropic pores within the collection (e.g., of at least 10, at least 25, at least 50, at least 100, or at least 1000 anisotropic pores) have longitudinal axes defining a distribution of orientations with respect to the normal of a plane of the porous article. In some such embodiments, the maximum of the angles formed between the longitudinal axes of the anisotropic pores in the collection and the normal of the plane is less than 45°, less than 30°, less than 25°, less than 15°, less than 10°, less than 5°, or less than 2°.

In some embodiments, the anisotropic pores of the porous article can extend from one boundary of the porous article to another boundary (e.g., an opposed boundary) of the porous article. For example, in the set of embodiments illustrated in FIG. 1D, anisotropic pores 110 extend from the top boundary of article 112 the bottom boundary of article 112 (which is opposed to the top boundary of article 112). In other embodiments, the anisotropic pores might only extend partially through the porous article. In certain embodiments, anisotropic pores of the porous article extend at least about 50%, at least about 75%, or at least about 90% of the distance between boundaries (e.g., opposed boundaries) of the porous article.

In certain embodiments, the porous articles described herein comprise anisotropic pores with relatively low geometric tortuosities. For example, in certain embodiments, the porous article can comprise at least some anisotropic pores (e.g., at least 10, at least 25, at least 50, at least 100, or at least 1000 anisotropic pores) with geometric tortuosities of less than about 3, less than about 2.5, less than about 2, less than about 1.5, less than about 1.2, or less than about 1.1 (and, in certain embodiments, down to substantially 1). The geometric tortuosity of a particular anisotropic pore is calculated as the effective path length divided by the projected path length. One of ordinary skill in the art would be capable of determining the geometric tortuosity of a given pore by examining an image (e.g., a magnified image such as a scanning electron micrograph, a microscope enhanced photograph, or an unmagnified photograph), determining the effective path length by tracing a pathway from one end of the pore to the other through the middle of the pore, and determining the projected path length by measuring the straight-line distance between the ends of the pore.

According to certain embodiments, the porous article comprises anisotropic pores having lengths of at least about 10 microns, at least about 100 microns, at least about 1 mm, at least about 5 mm, at least about 10 mm, or at least about 100 mm (and/or, in certain embodiments, up to about 200 mm, up to about 500 mm, up to about 1 m, or longer). In certain embodiments, the porous article comprises anisotropic pores having a minimum cross-sectional diameter of less than about 100 microns or less than about 10 microns (and/or down to about 1 micron, down to about 0.1 microns, or less).

The portions of the matrix that remain after removal of fugitive material (e.g., emulsion droplets and/or surrounding magnetic fluid) can be porous, according to certain embodiments. For example, referring to FIG. 1D, in some embodiments, portions 114 of article 112 can be porous. As another example, referring to FIG. 2D, regions 208 can be porous in some embodiments.

In some embodiments, the porous article can include high-tortuosity pores, in addition to low-tortuosity pores. In some such embodiments, the high-tortuosity pores may be present in the matrix that remains after removal of fugitive material (e.g., emulsion droplets and/or magnetic fluid). For example, high-tortuosity pores may be present, in some embodiments, in portions 114 in FIG. 1D and/or regions 208 in FIG. 2D. In some embodiments, the high-tortuosity pores may have geometric tortuosities that are at least about 2 times, at least about 3 times, at least about 5 times, or at least about 10 times the geometric tortuosities of the low-tortuosity pores in the porous article. In some embodiments, the high-tortuosity pores may have geometric tortuosities of at least about 3, at least about 3.5, at least about 4, at least about 5, or at least about 10 (and/or, in some embodiments, up to about 20, or more). In certain embodiments, a porous article (e.g., electrode) comprising low-tortuosity (e.g., substantially straight) pores within a porous matrix can have a total porosity (counting contributions from both the low-tortuosity pores and the high-tortuosity pores within the porous matrix in which the low-tortuosity pores are formed) of from about 20% to about 60%, from about 29% to about 39%, or from about 30% to about 33%. Other total porosities are also possible. In some embodiments, the percentage of the total porosity occupied by the low-tortuosity (e.g., substantially straight) pores is from about 20% to about 80%, from about 25% to about 60%, or from about 25% to about 47%. Other percentages are also possible. The percentage of total porosity that is occupied by a particular subset of pores is calculated by dividing the volume occupied by the subset of pores by the total volume of all of the pores. To determine the volume occupied by pores (or subsets of pores), one can perform mercury intrusion porosimetry or direct imaging of the pore microstructure using cross-sections of the material or three-dimensional reconstructions of such cross-sections including tomographic methods including X-ray and electron tomography.

As noted above, certain aspects are related to the creation of anisotropic porosity by magnetic alignment. Certain embodiments use the response of a magnetic phase (e.g., whether in the form of magnetic emulsion droplets or a magnetic surrounding fluid) and a non-magnetic phase (e.g., whether in the form of non-magnetic emulsion droplets or a non-magnetic surrounding fluid) to an external magnetic field. Magnetic particles and/or emulsion droplets can be ferro or paramagnetic. The non-magnetic phase can have a magnetic susceptibility that is at least two orders of magnitude smaller than the magnetic phase. In general, if a field is applied to a mixture containing magnetizable particles/emulsion droplets, the system tries to minimize its magnetic energy by aligning all magnetic moments in the field direction. In addition, the external field generally induces a local field in the magnetizable particles or in the magnetic domains. The minimum energy conformation due to this local field is generally when all particles (and/or droplets) and domains are chained up in a row. Thus spherical magnetic emulsion droplets (or magnetic particles in a magnetic suspension) generally chain up in the field direction. Similarly, in a nonmagnetic particle in a magnetic fluid an inverse gradient is generally created and the resulting response is analogous. Certain embodiments use various manifestations of such orientations in the field direction for the creation of anisotropic porosity.

As noted above, some embodiments involve chaining of emulsion droplets in an electrode matrix. An external magnetic field that is imposed on magnetizable emulsion droplets in a liquid generally induces a local field in each of the emulsion droplets. This local dipole m is generally proportional to the external magnetic field, and can be expressed as:

$$m = \mu_0 \frac{4}{3}\pi (r^3) \chi H \qquad [1]$$

where $\mu_0$ is the magnetic permeability of vacuum, r is the emulsion droplet radius, $\chi$ is the magnetic susceptibility of the emulsion droplet and H the external magnetic field. Here and in the following analysis, one can make a non-limiting assumption that, in many cases, the magnetic permeability of the matrix fluid is close to that of vacuum. Due to the local dipole, the potential energy of two spheres separated by d in an angle relative to the field direction θ can be calculated as:

$$U(d, \theta) = \frac{m^2}{4\pi\mu_0} \frac{1 - 3\cos^2\theta}{d^3} \qquad [2]$$

The lowest energy state is generally when the emulsion droplets form close-packed chains at θ=0 and therefore reached when the emulsion droplets (and/or magnetic particles in fluid surround the emulsion droplets) chain up.

In one specific embodiment fugitive emulsion droplets are chained within a slurry of electrode materials and additives (e.g., binder, conductive additive) by imposing an external magnetic field. After chaining of the emulsion droplets, the solvent can be evaporated and the electrode particles can consolidate around the chained emulsion droplets. Instead of (or in addition to) solvent removal the electrode can also be consolidated by other means such as gelation or polymerization of the matrix. In some embodiments, the fugitive emulsion droplets are removed (for example, by dissolution) leaving behind anisotropic pores.

Figure 3A:
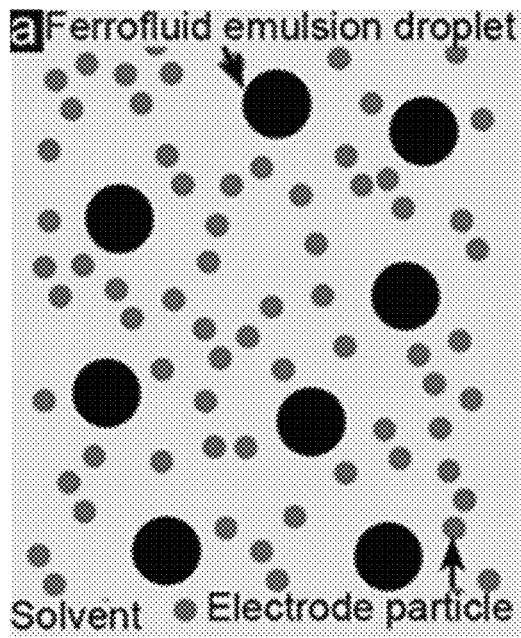
FIGS. 3A-3D are schematic representation of electrode fabrication by chaining of magnetic emulsion droplets.
Figure 3B:
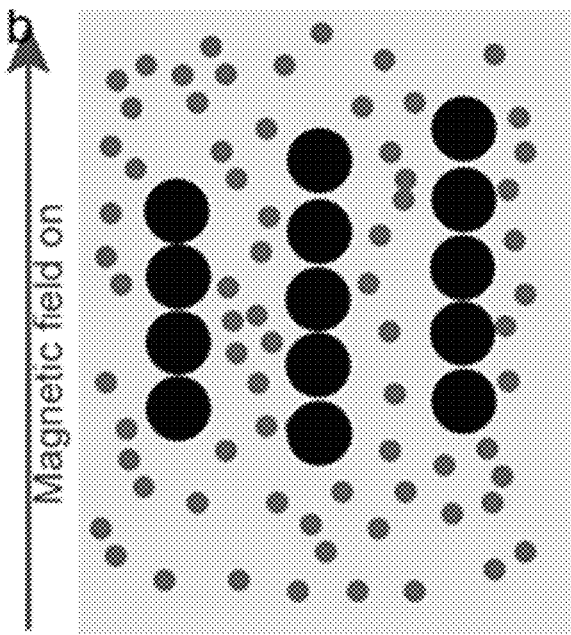
Figure 3C:
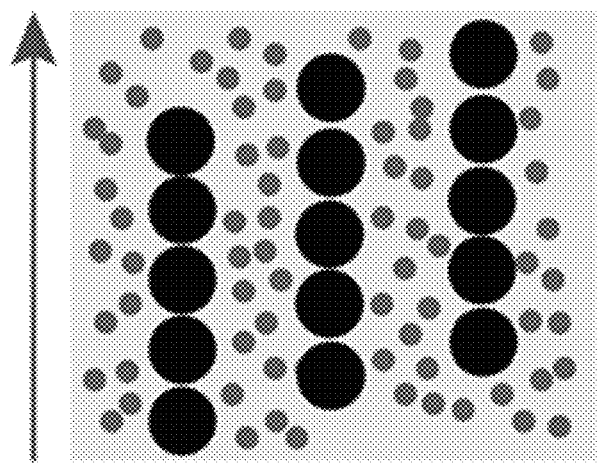
Figure 3D:
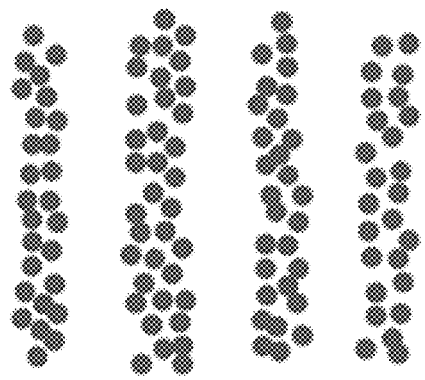

Some embodiments comprise chaining of magnetic emulsion droplets in an electrode matrix. In one embodiment chaining of magnetic emulsion droplets is used to create anisotropic pores in an electrode matrix. The magnetic fluid from which the emulsion droplets are made can include a solvent with well-dispersed superparamagnetic iron oxide nanoparticles, which is usually referred to as a ferrofluid. In order to create anisotropic pores, the ferrofluid can be emulsified in an immiscible solvent and stabilized using surfactant. The resulting emulsion droplets can be chained up in a suspension of electrode particles and other additives (e.g., a binder and/or surfactant such as PVA, a conductive additive, and/or a water-soluble liquid alcohol) by imposing an external magnetic field. One non-limiting example is illustrated in FIGS. 3A-3D. FIGS. 3A-3D are a schematic representation of electrode fabrication by chaining of magnetic emulsion droplets. In FIG. 3A, a stable emulsion of ferrofluid is mixed with electrode particles. The mixture can also contain, in some embodiments, a binder and/or surfactant such as PVA, a conductive additive, and/or a water-soluble liquid alcohol. In FIG. 3B, the droplets are chained up in an external magnetic field. In FIG. 3C, the continuous phase is evaporated until eventually (as shown in FIG. 3D) the particles are consolidated. Due to the force imposed in the emulsion droplets, chaining of magnetic emulsion droplets without their coalescence generally involves the use of an emulsion with excellent emulsion stability. In some embodiments, the solvent of the ferrofluid has a lower vapor pressure than the solvent of the electrode particle suspension. After chaining the emulsion droplets the solvent of the electrode slurry can be evaporated and the electrode can consolidate with the emulsion droplets chained up. After consolidation, the emulsion droplets can be washed away with excess of a miscible solvent, leaving behind oriented pore channels. According to certain embodiments, binder and/or surfactant (such as PVA), conductive additive (such as carbon black), and/or water-soluble liquid alcohol (such as ethanol) can also be left behind and may be present within the porous article.

Certain embodiments comprise chaining of non-magnetic emulsion droplets (e.g., containing electrode particles) in a magnetic fluid. Similar to magnetic emulsion droplets in a non-magnetic fluid forming chains in an external magnetic field, non-magnetic emulsion droplets will generally chain up in a magnetic fluid under an external magnetic field. This system can be described in a continuum approach, in which the non-magnetic emulsion droplets are orders of magnitude larger than the surrounding magnetic nanoparticles within the magnetic fluid. In such an exemplary system, the magnetic susceptibility of the non-magnetic emulsion droplets can be orders of magnitude smaller than the ferrofluid and can be taken to be 0. Upon applying an external magnetic field, the void (magnetic hole) produced by the particle can induce a dipole opposite to the field direction. The angular dependence of the potential energy can be represented in a similar fashion in regards to an effective moment as:

$$U(d, \theta) \propto m_{\mathit{eff}}^2 \frac{1 - 3\cos^2\theta}{d^3} \qquad [3]$$

The effective moment for the case of a nonmagnetic emulsion droplets in a ferrofluid can be expressed as:

$$m_{\mathit{eff}} = \frac{4}{3}\pi r^3 \frac{3\chi_{\mathit{ff}}}{3 + 2\chi_{\mathit{ff}}} H \qquad [4]$$

where $\chi_{\mathit{ff}}$ is the magnetic susceptibility of the ferrofluid. Magnetically induced chaining of non-magnetic emulsion droplets can effectively produce chains of various lengths.

In one set of embodiments to create anisotropic pores, electrode particles, a binder, and additives are dispersed within emulsion droplets within an oil-based ferrofluid and high vapor pressure solvent (e.g. hexane). In some embodiments, an external magnetic field can be applied and a magnetic gradient can be induced in the non-magnetic emulsion droplets, which can induce chaining of the emulsion droplets. The field can be kept constant while the high vapor pressure solvent evaporates. According to certain embodiments, after the evaporation of the high vapor pressure solvent, the binder solidifies and electrode particles are consolidated in a chained structure. Due to the chained structures, elongated pore channels remain between the electrode particle chains.

Figure 4:
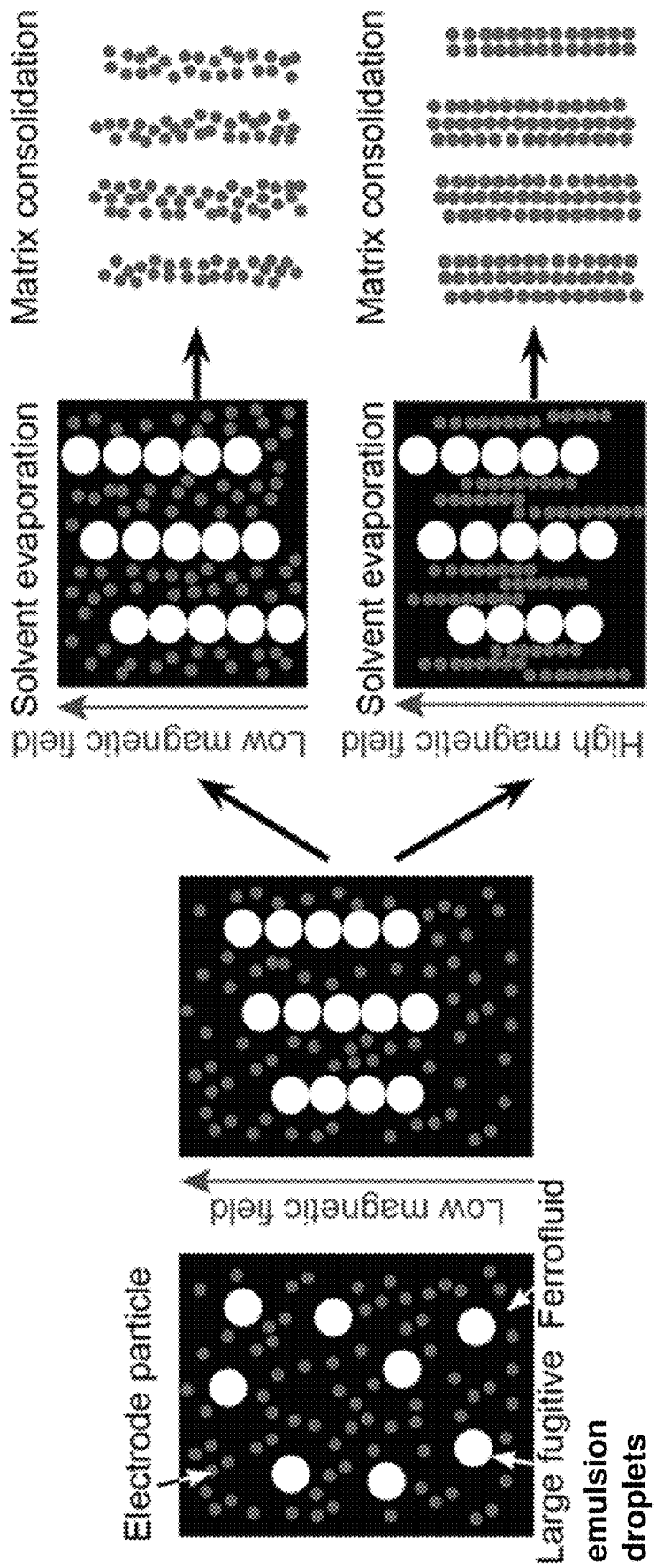
FIG. 4 is a schematic illustration of pore formation by chaining a combination of non-magnetic emulsion droplets in a magnetic fluid that also contains electrode particles. At low magnetic fields only the large fugitive emulsion droplets (and not the electrode particles) chain. After evaporation of the solvent and removal of the fugitive emulsion droplets, large pore channels remain. If the field is increased, the smaller electrode particles also chain up and form microchannels between the large pore channels.

Certain embodiments comprise chaining of a mixture of non-magnetic electrode particles and fugitive non-magnetic emulsion droplets in a magnetic fluid. From Equations 3 and 4 it can be deduced that the attractive magnetic force acting on two non-magnetic particles at a given distance is generally proportional to the particle radius to the power of 6. Thus, in a mixture of larger and smaller non-magnetic domains, the larger domains (e.g., non-magnetic emulsion droplets) will generally preferably form chains, especially at moderate magnetic fields, where Brownian randomization disturbs chaining of the smaller ones (e.g., the non-magnetic electrode particles). In one embodiment, a mixture of non-magnetic electrode particles, additives (e.g., a binder/surfactant and/or a conductive additive), and fugitive non-magnetic emulsion droplets that are about one order of magnitude larger, are mixed in a ferrofluid and a high vapor pressure solvent (e.g. hexane) (FIG. 4). Upon imposing a magnetic field the non-magnetic emulsion droplets can chain up with a preference for the large fugitive pore former to chain. The electrode matrix can be consolidated, for example, by solvent evaporation, polymerization, or gelation, and the fugitive pore former can be removed. As a result, according to certain embodiments, large anisotropic pore channels are formed in the resulting electrode. According to some embodiments, depending on the profile of the applied magnetic field, large macro porous channels from removal of the fugitive pore formers can be combined with micro porous channels resulting from chaining up the electrode particles (FIG. 4). For example, in some embodiments, if the field is increased, the smaller electrode particles can also chain up and form micro-channels between those.

Certain embodiments involve the use of magnetic fluid. Those of ordinary skill in the art are familiar with magnetic fluids, which are fluids that become magnetized in the presence of a magnetic field. The magnetic fluid can comprise, in some cases, a liquid that is itself magnetic. In certain cases, the magnetic fluid comprises a suspension of magnetic particles (e.g., magnetic nanoparticles) suspended within a non-magnetic liquid. In some embodiments, the magnetic fluid is a colloid. The magnetic fluid may be, in some cases, a ferrofluid.

It should be understood that fluids include not only liquids and gases, but also colloids and other suspensions of solid materials within fluid materials. In each instance in which a fluid is described, the fluid can comprise a liquid, according to certain embodiments.

As noted above, one or more binders (e.g., a polymeric binder) may be present in certain of the precursor compositions and/or the porous articles described herein. In some embodiments, the binder can also function as a surfactant. The binder may, according to certain embodiments, bind together particles that form the porous article described herein. For example, in some embodiments, the binder may bind together electrode particles and/or conductive additives within the porous articles. In certain embodiments, the binder comprises polyvinyl alcohol (PVA). In some embodiments, other binders can be used, in addition to or in place of PVA. Non-limiting examples of such binders include polyvinyl pyrrolidone (PVP), polyethylene oxide (PEO), polyvinylidene fluoride (PVDF)-based polymers, polyacryl amide (PA), ethylene-tetrafluoroethylene copolymers (ETFE), cellulose derivatives (e.g., methylcellulose (MC), carboxy methylcellulose (CMC) and hydroxypropyl methylcellulose (HPMC)), polytetraethylene (PTFE), polybutadiene, polyacrylonitrile, ethylene propylene diene terpolymers, styrene-butadiene rubbers (SBR), polyimides, and mixtures thereof. In certain embodiments, the binder may be soluble in the matrix liquid of the precursor composition. In some embodiments, the binder comprises at least one amphiphilic compound that possesses both hydrophilic functional groups (such as, for example, —OH, —COOH, —NH$_2$, —COOCH$_3$, and/or —CONH$_2$) and a hydrophobic backbone (such as, for example, a backbone having a chain of one to five carbon atoms). In some such embodiments, the binder comprises at least one of carbon, hydrogen, oxygen, and nitrogen. In some such embodiments, the binder comprises carbon, hydrogen, oxygen, and nitrogen. In some such embodiments, the binder comprises carbon, hydrogen, and oxygen. In some such embodiments, the binder comprises carbon, hydrogen, and nitrogen.

According to certain embodiments, one or more conductive additives may be present in certain of the precursor compositions and/or the porous articles described herein. The conductive additive may be present, for example, as particles of electronically conductive material. In some embodiments, the conductive additive comprises carbon particles and/or metal particles. In certain embodiments, the conductive additive comprises a metal, a metal carbide, a metal nitride, carbon black, graphitic carbon powder, carbon fibers, carbon microfibers, vapor-grown carbon fibers (VGCF), fullerenes, carbon nanotubes (CNTs) (including multiwall carbon nanotubes (MWNTs) and single wall carbon nanotubes (SWNTs)), graphene sheets, and materials comprising fullerenic fragments that are not predominantly a closed shell or tube of the graphene sheet, and mixtures thereof. In certain embodiments, the use of carbon black as a conductive additive can be particularly advantageous. The conductive additive, when present, can have a composition that is different from the electrode material. In certain embodiments, the conductive additive is made up of at least 50 wt % carbon. In some embodiments, the conductive additive is made up of at least 75 wt %, at least 90 wt %, at least 95 wt %, or at least 99 wt % carbon. In some embodiments in which a conductive additive is used (and especially conductive additives containing a relatively high amount of carbon), the phase in which the conductive additive is located during fabrication of the porous article (e.g., the fluid phase surrounding the emulsion droplets, the emulsion droplets) also contains a water-soluble liquid alcohol (including, but not limited to, any of the water-soluble liquid alcohols described elsewhere herein). Without wishing to be bound by any particular theory, it is believed that the presence of a water-soluble liquid alcohol can enhance the degree to which the conductive additive (especially carbon-based conductive additives) is stably distributed within a water-based phase of the emulsion.

As noted elsewhere herein, certain embodiments make use of emulsions, in which one fluid phase is distributed (or emulsified) within another fluid phase such that two distinct fluid phases are present over the time scale over which the emulsion is employed. In certain embodiments, the emulsion can include a stabilizer, such as a surfactant. In certain embodiments, the stabilizer comprises polyvinyl alcohol (PVA). In some such embodiments, the stabilizer acts as both an emulsion stabilizer and a binder in the final porous article. In some embodiments, other stabilizers can be used, in addition to or in place of PVA. Exemplary surfactants that could be employed according to certain embodiments include, but are not limited to, pluronic F-120, sodium dodecyl sulfate (SDS), ammonium lauryl sulfate, sodium lauryl sulfate, dioctyl sodium sulfosuccinate, perfluorooctanesulfonate (PFOS), perfluorobutanesulfonate, alkyl aryl ether phosphate, alkyl ether phosphate, alkyl carboxylates, fatty acid salts (soaps), sodium stearate, sodium lauroyl sarcosinate, carboxylate fluorosurfactants, perfluorononanoate, perfluorooctanoate (PFOA or PFO), cetyl trimethylammonium bromide (CTAB), hexadecyl trimethyl ammonium bromide, cetyl trimethylammonium chloride (CTAC), cetylpyridiniumchloride (CPC), polyethoxylated tallow amine (POEA), benzalkonium chloride (BAC), benzethonium chloride (BZT), sorbitan monooleate (also referred to as Span 80), triton X-100, glyceryl laurate, sorbitan alkyl esters, cocamide MEA, cocamide DEA, dodecyldimethylamine oxide, and combinations thereof.

As noted above, in certain embodiments, it can be advantageous to use polyvinyl alcohol, for example, as an emulsion stabilizer and/or a binder in the final porous article. In some embodiments, it can be advantageous to include the polyvinyl alcohol in the same phase (emulsion droplets or fluid surrounding the emulsion droplets) as the solid material (e.g. electrode material) from which the final porous article is formed.

In some embodiments, the polyvinyl alcohol can be present in the phase surrounding the emulsion droplets. For example, referring to FIGS. 1A-1D, in some embodiments, fluid phase 104 contains polyvinyl alcohol. In some such embodiments, fluid phase 104 contains both polyvinyl alcohol and solid particles (e.g., electrode material and/or a conductive additive). In some such embodiments, fluid phase 104 can be a water-based fluid phase. In some such embodiments, fluid phase 104 further comprises a water-soluble alcohol (e.g., ethanol or any of the water-soluble alcohols described elsewhere herein). In certain of these embodiments, the emulsion droplets contain a ferrofluid, such as an oil-based ferrofluid.

In some embodiments, the polyvinyl alcohol can be present in the emulsion droplets. For example, referring to FIGS. 2A-2D, in some embodiments, emulsion droplets 202 contain polyvinyl alcohol. In some such embodiments, emulsion droplets 202 contain both polyvinyl alcohol and solid particles (e.g., electrode material and/or a conductive additive). In some such embodiments, emulsion droplets 202 can make up a water-based fluid phase. In some such embodiments, emulsion droplets 202 further comprises a water-soluble alcohol (e.g., ethanol or any of the water-soluble alcohols described elsewhere herein). In certain of these embodiments, the fluid surrounding the emulsion droplets can contain a ferrofluid, such as an oil-based ferrofluid.

In some embodiments in which polyvinyl alcohol is employed, the polyvinyl alcohol can have a relatively high average molecular weight. Without wishing to be bound by any particular theory, it is believed that using higher molecular weight polyvinyl alcohol increases the viscosity of the phase in which it is present, which has been found, in certain cases, to enhance the degree to which aligned pores may be formed in the resulting matrix. In certain embodiments, the average molecular weight of the polyvinyl alcohol is at least 1000 g/mol; at least 5000 g/mol; at least 10,000 g/mol; at least 50,000 g/mol; at least 100,000 g/mol; or at least 200,000 g/mol. In certain embodiments, the average molecular weight of the polyvinyl alcohol is up to 250,000 g/mol; up to 500,000 g/mol; up to 1,000,000 g/mol; up to 5,000,000 g/mol; or higher. Combinations of these ranges are also possible (e.g., at least 1000 g/mol and up to 5,000,000 g/mol). The molecular weight of the polyvinyl alcohol is calculated as the weight average molecular weight. Weight average molecular weight is determined as follows:

$$M_w = \frac{\sum M_i^2 N_i}{\sum M_i N_i}$$

where $N_i$ is the number of molecules of molecular weight $M_i$. The weight average molecular weight described herein refers to that which would be obtained by the use of gel permeation chromatography.

According to certain embodiments, the polyvinyl alcohol can be relatively highly hydrolyzed. For example, in some embodiments, the polyvinyl alcohol can have a percentage hydrolysis of at least 50%, at least 80%, at least 88%, or at least 99%. It has been found that, according to certain embodiments, high levels of hydrolysis of the polyvinyl alcohol can be helpful in stabilizing the emulsion.

As noted above, in certain embodiments, it can be advantageous to use at least one water-soluble liquid alcohol. The water-soluble liquid alcohol(s) can be used, according to certain embodiments, to aid in the dispersion of a conductive additive (e.g., carbon black) within the phase in which the water-soluble liquid alcohol is present. In some embodiments, it can be advantageous to include the water-soluble liquid alcohol(s) in the same phase (emulsion droplets or fluid surrounding the emulsion droplets) as the conductive additive (e.g. carbon black). For example, it has been found that in certain cases, acetylene black and/or other carbon black particles do not disperse well in pure water. Even after sonication treatments, the carbon black particles may lie on the surface of the water (rather than being dispersed within it). In some such embodiments, when fluid is removed from the precursor, the resulting article does not include well-aligned pores. It has been found that adding, for example, ethanol can lead to better mixing of carbon black within the water, which can lead to better pore alignment, higher carbon black contents in the final article, and larger article thicknesses.

In some embodiments, the water-soluble liquid alcohol(s) can be present in the phase surrounding the emulsion droplets. For example, referring to FIGS. 1A-1D, in some embodiments, fluid phase 104 contains a water-soluble liquid alcohol(s). In some such embodiments, fluid phase 104 contains both a water-soluble liquid alcohol(s) and at least one conductive additive (e.g., carbon black). In some such embodiments, fluid phase 104 can be a water-based fluid phase. In some such embodiments, fluid phase 104 further comprises polyvinyl alcohol and/or electrode material. In certain of these embodiments, the emulsion droplets contain a ferrofluid, such as an oil-based ferrofluid.

In some embodiments, the water-soluble liquid alcohol(s) can be present in the emulsion droplets. For example, referring to FIGS. 2A-2D, in some embodiments, emulsion droplets 202 contain water-soluble liquid alcohol(s). In some such embodiments, emulsion droplets 202 contain both water-soluble liquid alcohol(s) and at least one conductive additive (e.g., carbon black). In some such embodiments, emulsion droplets 202 can make up a water-based fluid phase. In some such embodiments, emulsion droplets 202 further comprise polyvinyl alcohol and/or electrode material. In certain of these embodiments, the fluid phase surrounding the emulsion droplets contains a ferrofluid, such as an oil-based ferrofluid.

A variety of types of water-soluble liquid alcohol(s) can be employed, according to certain embodiments. In some embodiments, the water-soluble liquid alcohol comprises a carbon chain length of up to 10 carbon atoms. One of ordinary skill in the art would understand the concept of carbon chain length, which refers to the number of carbon atoms covalently bonded to each other within the alcohol molecule. For example, isopropyl alcohol has a carbon chain length of 3, n-hexanol has a carbon chain length of 6, and 1-decanol has a carbon chain length of 10. In some embodiments, the water-soluble liquid alcohol comprises at least one of methanol, ethanol, a propanol, a butanol, a pentanol, a hexanol, a heptanol, an octanol, a nonanol, a decanol. In certain embodiments, the water-soluble liquid alcohol comprises at least one of methanol, ethanol, a propanol, and a butanol. It can be particularly advantageous, in certain cases, to use ethanol as the water-soluble liquid alcohol.

The water-soluble liquid alcohols described herein can be used in a variety of suitable amounts. In some embodiments, the ratio of water to the sum of the water-soluble liquid alcohols in the matrix/precursor composition is at least 2:1 (and/or at least 3:1, at least 5:1, at least 10:1, at least 18:1, or at least 19:1), by weight, during at least a portion of the time prior to at least partially removing fluid from the precursor (e.g., prior to at least partially removing the emulsion droplets, prior to at least partially removing the fluid surrounding the emulsion droplets). In some embodiments, the ratio of water to the sum of the water-soluble liquid alcohols in the matrix/precursor composition is less than 1000:1 (and/or less than 500:1, less than 200:1, less than 100:1, or less than 50:1), by weight, during at least a portion of the time prior to at least partially removing fluid from the precursor (e.g., prior to at least partially removing the emulsion droplets, prior to at least partially removing the fluid surrounding the emulsion droplets). Combinations of these ranges are also possible (e.g., at least 2:1 and less than 1000:1). In certain embodiments, the weight ratio of water to the sum of the water-soluble liquid alcohols within a single phase of the matrix/precursor (e.g., within the emulsion droplets or within the fluid surrounding the emulsion droplets) can fall within any of these ranges during at least a portion of the time prior to at least partially removing fluid from the precursor (e.g., prior to at least partially removing the emulsion droplets, prior to at least partially removing the fluid surrounding the emulsion droplets). According to certain embodiments, the weight ratio of water to the sum of the water-soluble liquid alcohols within a single phase of the matrix/precursor falls within any of the above ranges when the emulsion is first formed.

In some embodiments, the ratio of water to ethanol in the matrix/precursor composition is at least 2:1 (and/or at least 3:1, at least 9:1, at least 14:1, at least 18:1, or at least 19:1), by weight, during at least a portion of the time prior to at least partially removing fluid from the precursor (e.g., prior to at least partially removing the emulsion droplets, prior to at least partially removing the fluid surrounding the emulsion droplets). In some embodiments, the ratio of water to ethanol in the matrix/precursor composition is less than 1000:1 (and/or less than 500:1, less than 200:1, less than 100:1, or less than 50:1), by weight, during at least a portion of the time prior to at least partially removing fluid from the precursor (e.g., prior to at least partially removing the emulsion droplets, prior to at least partially removing the fluid surrounding the emulsion droplets). Combinations of these ranges are also possible (e.g., at least 2:1 and less than 1000:1). In certain embodiments, the weight ratio of water to ethanol within a single phase of the matrix/precursor (e.g., within the emulsion droplets or within the fluid surrounding the emulsion droplets) can fall within any of these ranges during at least a portion of the time prior to at least partially removing fluid from the precursor (e.g., prior to at least partially removing the emulsion droplets, prior to at least partially removing the fluid surrounding the emulsion droplets). According to certain embodiments, the weight ratio of water to ethanol within a single phase of the matrix/precursor falls within any of the above ranges when the emulsion is first formed.

According to certain embodiments, the amount of the water-soluble liquid alcohol(s) present in the water-containing phase can be large enough to allow for good dispersion of the solid material within the phase and small enough to prevent overly aggressive evaporation of the water-soluble liquid alcohol(s) from the matrix (which can disrupt pore alignment). For example, it has been found experimentally that, in certain cases, the use of water to ethanol weight ratios of 19:1 and higher can avoid aggressive evaporation of fluid, and can produce final articles with well-aligned pores.

As noted above, a variety of electrode materials can be used in conjunction with the embodiments described herein, and can be incorporated into a finished porous article. Any electrode material that is capable of participating in an electrochemical reaction may be used. Electrodes for use in electrochemical systems that utilize various working ions are contemplated, including systems in which $H^+$; $OH^-$; $Li^+$, $Na^+$, and/or other alkali ions; $Ca^{2+}$, $Mg^{2+}$, and/or other alkaline earth ions; and/or $Al^{3+}$ are used as the working ions. In each of these instances, a negative electrode material and a positive electrode material may be required, the negative electrode material storing the working ion of interest at a lower absolute electrical potential than the positive electrode material. The cell voltage can be determined approximately by the difference in ion-storage potentials of the two electrode materials.

In certain embodiments, charge-storing electrode particles can be contained within the fluid of the matrix (e.g., in a suspension) and/or the final porous article. Such particles include compounds that store charge in an electrochemical device by intercalating, alloying, or adsorbing a working ion. Such particles include but are not limited to ion-storing battery electrode particles of compounds such as an alkali ion-transition metal oxide, alkali ion transition metal phosphates, a metal or metal alloy capable of alloying with an alkali working ion, carbon in the form of disordered carbon, hard carbon, soft carbon, graphite, carbon nanotubes, fullerenes, graphenes, graphene oxides, and mixtures thereof. Specific non-limiting examples include $LiCoO_2$ (LCO), $LiFePO_4$ (LFP), $LiMn_2O_4$ (LMO), $Li(Ni,Mn,Co)O_2$ (NMC), $Li(Ni,Co,Al)O_2$ (NCA), $LiMnO_3$—$LiMO_2$ alloys where M comprises at least one first-row transition metal, silicon, tin, and their alloys, silicon-carbon mixtures or composites, sulfur and composites comprising sulfur, and/or other types of electrode particles.

In some embodiments, an organic electrode material is used that stores the working ion of interest at a potential useful for either the positive or negative electrode of a battery. Such organic electrode materials include "p"-doped conductive polymers such as polyaniline or polyacetylene based materials, polynitroxide or organic radical electrodes (such as those described in: H. Nishide et al., *Electrochim. Acta*, 50, 827-831, (2004), and K. Nakahara, et al., *Chem. Phys. Lett.*, 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials*, DOI: 10.1038/nmat2372).

Other suitable positive electrode materials include solid compounds known to those skilled in the art as those used in NiMH (Nickel-Metal Hydride) Nickel Cadmium (NiCd) batteries. Still other positive electrode materials for Li storage include those used in carbon monofluoride batteries, generally referred to as $CF_x$, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", *J. Electrochem. Soc.*, 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

As another example, fullerenic carbon including single-wall carbon nanotubes (SWNTs), multiwall carbon nanotubes (MWNTs), or metal or metalloid nanowires may be used as electrode materials. One example includes the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi:10.1038/nnano.2007.411.

Other exemplary electrode materials for a positive electrode in a lithium system include the general family of ordered rocksalt compounds $LiMO_2$ including those having the α-$NaFeO_2$ (so-called "layered compounds") or orthorhombic-$LiMnO_2$ structure type or their derivatives of different crystal symmetry, atomic ordering, or partial substitution for the metals or oxygen. In such embodiments, M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC"). Other families of exemplary electrode materials include those of spinel structure, such as $LiMn_2O_4$ and its derivatives, "high voltage spinels" with a potential vs. Li/Li$^+$ that exceeds 4.3V including but not limited to $LiNi_{0.5}Mn_{1.5}O_4$, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds, and vanadium oxides $V_xO_y$ including $V_2O_5$ and $V_6O_{11}$.

In one or more embodiments, an electrode material comprises a transition metal polyanion compound, for example as described in U.S. Pat. No. 7,338,734. In one or more embodiments, an electrode material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)z(A_{1-a}M''_a)_x M'_y(X_2D_7)_z$ and have values such that (1−a)x plus the quantity ax times the formal valence or valences of M" plus y times the formal valence or valences of M' is equal to z times the formal valence of the $XD_4$, $X_2D_7$ or $DXD_4$ group. In such compounds, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electrode material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive electrode material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. In some embodiments, M includes Fe, and z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments an electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments an electrode material comprises carbon monofluoride or its derivatives.

In some embodiments the energy storage device (e.g., containing one or more of the electrodes described herein) is a lithium-based energy storage device (e.g., a lithium-based battery), and the negative electrode material comprises graphite, graphitic boron-carbon alloys, hard or disordered carbon, lithium titanate spinel, and/or a solid metal, metal alloy, metalloid and/or metalloid alloy that reacts with lithium to form intermetallic compounds, including the metals Sn, Bi, Zn, Ag, and Al, and the metalloids Si and Ge. In some embodiments, $Li_4Ti_5O_{12}$ can be included as an electrode material (e.g., a negative electrode material).

Exemplary electrode materials for a negative electrode in the case of a lithium working ion include graphitic or non-graphitic carbon, amorphous carbon, or mesocarbon microbeads; an unlithiated metal or metal alloy, such as metals including one or more of Ag, Al, Au, B, Ga, Ge, In, Sb, Sn, Si, or Zn, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions.

In some embodiments, oxides of general formula $A_xM_yO_z$ may be used as electrode materials, wherein A comprises a working ion that may be one or more of Na, Li, K, Mg, Ca, and Al; M comprises a transition metal that changes its formal valence state as the working ion is intercalated or deintercalated from the compound; O corresponds to oxygen; x can have a value of 0 to 10; y can have a value of 1 to 3; and z can have a value of 2 to 7.

The electrode material can include one or more lithium metal "polyanion" compounds, including but not limited to compounds described in U.S. Pat. No. 7,338,734, to Chiang et al. which is incorporated herein by reference in its entirety for all purposes. Such compounds include the compositions $(A)_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, wherein A is at least one of an alkali metal or hydrogen, M' is a first-row transition metal, X is at least one of phosphorus, sulfur, arsenic, boron, aluminum, silicon, vanadium, molybdenum and tungsten, M" is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0 \leq a \leq 0.1$, x is equal to or greater than 0, y and z are greater than 0 and have values such that x, plus y(1−a) times a formal valence or valences of M', plus ya times a formal valence or valence of M", is equal to z times a formal valence of the $XD_4$, $X_2D_7$, or $DXD_4$ group. In some embodiments, the compound crystallizes in an ordered or partially disordered structure of the olivine $(A_xMXO_4)$, NASICON $(A_x(M',M'')_2(XO_4)_3)$, $VOPO_4$, $LiFe(P_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

Other such compounds comprise the compositions $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)_z$, wherein A is at least one of an alkali metal or hydrogen; M' is a first-row transition metal; X is at least one of phosphorus, sulfur, arsenic, boron, aluminum, silicon, vanadium, molybdenum and tungsten; M" any of a Group IIA, IIIA, IVA, VA, VIA, VIIA, VIIIA, IB, IIB, IIIB, IVB, VB, and VIB metal; D is at least one of oxygen, nitrogen, carbon, or a halogen; $0 \leq a \leq 0.1$; and x, y, and z are greater than zero and have values such that (1−a)x plus the quantity ax times the formal valence or valences of M" plus y times the formal valence or valences of M' is equal to z times the formal valence of the $XD_4$, $X_2D_7$ or $DXD_4$ group. In some of these embodiments, the compound crystallizes in an ordered or partially disordered structure of the olivine $(A_xMXO_4)$, NASICON $(A_x(M',M'')_2(XO_4)_3)$, $VOPO_4$, $LiFe(P_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

Still other such compounds comprise the compositions $(A_{b-a}M''_a)_xM'_y(XD_4)_z$, $(A_{b-a}M''_a)_xM'_y(DXD_4)_z$, or $(A_{b-a}M''_a)_xM'_y(X_2D_7)_z$, wherein A is at least one of an alkali metal or hydrogen; M' is a first-row transition metal; X is at least one of phosphorus, sulfur, arsenic, boron, aluminum, silicon, vanadium, molybdenum and tungsten; M" any of a Group IIA, IIIA, IVA, VA, VIA, VIIA, VIIIA, IB, IIB, IIIB, IVB, VB, and VIB metal; D is at least one of oxygen, nitrogen, carbon, or a halogen; $0 \leq a \leq 0.1$; $a \leq b \leq 1$; and x, y, and z are greater than zero and have values such that (b−a)x plus the quantity ax times the formal valence or valences of M" plus y times the formal valence or valences of M' is equal to z times the formal valence of the $XD_4$, $X_2D_7$ or $DXD_4$ group. In some of these embodiments, the compound crystallizes in an ordered or partially disordered structure of the olivine $(A_xMXO_4)$, NASICON $(A_x(M', M'')_2(XO_4)_3)$, $VOPO_4$, $LiFe(P_2O_7)$ or $Fe_4(P_2O_7)_3$ structure-types, and has a molar concentration of the metals (M'+M") relative to the concentration of the elements X that exceeds the ideal stoichiometric ratio y/z of the prototype compounds by at least 0.0001.

Rechargeable lithium batteries can include the following combinations of cathode materials/anode materials: $LiMn_2O_4/VO_2$, $Li(Ni_{1-x}Co_x)O_2/LiV_3O_8$, $LiCoO_2/LiV_3O_8$, $LiMn_2O_4/TiP_2O_7$, $LiMn_2O_4/LiTi_2(PO_4)_3$, $Li(Ni_{0.33}Mn_{0.33}Co_{0.33})O_2/Li_xV_2O_5$, $V_2O_5/Li_xV_2O_5$, $LiMn_2O_4/Li_xV_2O_5$, $LiMn_2O_4/NaTi_2(PO_4)_3$, $LiMn_2O_4/Li_3Fe_2(PO_4)_3$, $LiMn_2O_4/LiFeP_2O_7$, $LiMn_2O_4/LiFe_4(P_2O_7)_3$, $LiCoO_2/C$, $Li_{0.5}Mn_2O_4/LiCoO_2$, $\gamma\text{-}MnO_2/Zn$, and $TiO_2$ (anatase)/Zn.

In some embodiments, a positive electrode material can comprise a material of the general formula $Li_xFe_yP_aO_z$, (wherein, for example, x can be between about 0.5 and about 1.5, y can be between about 0.5 and about 1.5, a can be between about 0.5 and about 1.5, and z can be between about 3 and about 5), and a negative electrode material comprising a material of the general formula $Li_{x'}Ti_{y'}O_{z'}$ (wherein, for example, x' can be between about 3 and about 5, y' can be between about 4 and about 6, and z' can be between about 9 and about 15 or between about 11 and about 13). As a specific example, in some embodiments, the negative electrode material can comprise $LiFePO_4$ and the positive electrode material can comprise $Li_4Ti_5O_{12}$. In some embodiments, the positive and/or negative electrode materials can include cation or anion doped derivatives of these compounds.

Other specific combinations of electrode materials that can be used in certain of the electrodes described herein (listed here as anode/cathode pairs) include, but are not limited to, $LiV_3O_8/LiCoO_2$; $LiV_3O_8/LiNiO_2$; $LiV_3O_8/LiMn_2O_4$; and $C/Na_{0.44}MnO_2$.

Sodium can be used as the working ion in conjunction with cathode or anode compounds that intercalate sodium at suitable potentials, or that store sodium by surface adsorption and the formation of an electrical double layer as in an electrochemical capacitor or by surface adsorption accompanied by charge transfer. Materials for such systems have been described in US Patent Application US 2009/0253025, by J. Whitacre, for use in conventional secondary batteries.

Cathode materials that can be used include, but are not limited to, layered/orthorhombic $NaMO_2$ (birnessite), cubic spinel $\lambda\text{-}MnO_2$ based compounds, $Na_2M_3O_7$, $NaMPO_4$, $NaM_2(PO_4)_3$, $Na_2MPO_4F$, and tunnel-structured $Na_{0.44}MO_2$, where M is a first-row transition metal. Specific examples include $NaMnO_2$, $Li_xMn_2O_4$ spinel into which Na is exchanged or stored, $Li_xNa_yMn_2O_4$, $Na_yMn_2O_4$, $Na_2Mn_3O_7$, $NaFePO_4$, $Na_2FePO_4F$, and $Na_{0.44}MnO_2$. Anode materials can include materials that store sodium reversibly through surface adsorption and desorption, and include high surface area carbons such as activated carbons, graphite, mesoporous carbon, carbon nanotubes, and the like. They also may comprise high surface area or mesoporous or nanoscale forms of oxides such as titanium oxides, vanadium oxides, and compounds identified above as cathode materials but which do not intercalate sodium at the operating potentials of the negative electrode.

According to certain embodiments, electrodes (e.g., battery electrodes) and batteries comprising electrodes are also provided. For example, one aspect relates to battery electrodes (e.g., for use in rechargeable or non-rechargeable batteries), which may be made according to any of the methods described herein.

The electrode can be a positive electrode or a negative electrode.

In one set of embodiments, a battery (e.g., a rechargeable or non-rechargeable battery) comprising an electrode obtainable by any of the methods and/or using any of the systems described herein is provided. The battery may also contain a counter electrode, which may be fabricated according to any of the methods described herein or via another method. The battery can also contain an electrolyte. Other components may include an ionically-conductive separator, a battery housing or other packing materials, and the like. In some embodiments, the porous electrode can be at least partially filled with electrolyte. In some embodiments, the porous electrode can include low tortuosity in the primary direction of ion transport during charge and discharge of the battery in which the electrode is used. In some embodiments, the electrodes can have a high volume fraction of electrode active material (low porosity).

Certain of the porous articles and methods described herein can be used in and applied to many battery types, including primary (disposable) and secondary (rechargeable) batteries. Certain of the porous articles and methods described herein can be used to produce batteries that use a variety of "chemistries" including non-aqueous or aqueous battery chemistries using lithium ions, sodium ions, magnesium ions, aluminum ions, protons, or hydroxyl ions as the working ions. Non-limiting examples of such batteries include lithium primary batteries, lithium-ion batteries, alkaline batteries, nickel metal hydride batteries, and nickel-cadmium batteries. In certain embodiments, such electrodes and/or batteries are configured for use in systems in which the working ion is lithium.

While the fabrication of porous electrodes has primarily been described, it should be understood that the methods described herein can also be used to make other porous articles. For example, according to certain embodiments, methods described herein may be used to make porous filters. According to some embodiments, certain of the methods described herein can be used to make porous cellular scaffolding material. In some embodiments, certain of the methods described herein can be used to make porous heat transfer media.

In certain embodiments, the porous articles described herein can be relatively thick. For example, according to certain embodiments, the porous articles (e.g., electrodes) can have a thickness of at least 100 micrometers, at least 200 micrometers, at least 300 micrometers, or at least 400 micrometers. In some embodiments, the porous articles (e.g., electrodes) can have thicknesses up to 1 mm, 2 mm, 5 mm, or more. Combinations of these ranges are also possible (e.g., at least 100 micrometers and up to 5 mm).

Certain embodiments incorporate methods and/or articles described, for example, in International Patent Publication No. WO 2016/054530, published on Apr. 7, 2016, filed as Application No. PCT/US2015/053761 on Oct. 2, 2015, and entitled "Pore Orientation Using Magnetic Fields" (enclosed herewith); and U.S. Patent Publication No. 2016/0096334, published on Apr. 7, 2016, filed as application Ser. No. 14/874,253 on Oct. 2, 2015, and entitled "Pore Orientation Using Magnetic Fluids," each of which is incorporated herein by reference in its entirety for all purposes.

The following examples are intended to illustrate certain embodiments of the present invention, but do not exemplify the full scope of the invention.

Example 1

This example describes the use of magnetic fields in the production of porous electrodes. In particular, this example describes the preparation of low-tortuosity thick $LiCoO_2$ electrodes using magnetic fields.

420 mg of jet-milled $LiCoO_2$ powder (Umicore) was first thoroughly mixed with 11 mg acetylene black (Alfa Aesar). Then, 221 mg of 5 wt % polyvinyl alcohol (PVA, Miwiol 40-88, Mw~205,000, 88% hydrolyzed, Sigma Aldrich) aqueous solution, 280 µL deionized water, and 30 µL ethanol were added. Addition of the ethanol facilitated dispersion of the acetylene black nanoparticles. The resulting suspension was sonicated using a bath sonicator for 20 min before 30 µL of oil-based ferrofluid (EMG905, Ferrotec) was added. Microemulsions were made using a probe sonifier (Branson S250A) for 6 pulses at intensity of 2, 20% duty cycle. The microemulsions included droplets of the oil-based ferrofluid within the surrounding aqueous suspension (comprising the $LiCoO_2$, acetylene black, PVA, and ethanol, in addition to water). The as-prepared suspension/emulsion was casted into a silicon mold, onto aluminum foil, or onto a polyethylene separator membrane, which was placed 0.5 inch above a 2.54 cm×2.54 cm by 1.27 cm Neodynium block magnet (BY0Y08, K&J magnetics) and dried overnight at room-temperature to make electrodes. After drying, the $LiCoO_2$/Carbon/PVA electrodes were rinsed with solvent and dried at 110° C. overnight.

In this method, PVA served as both the binder for the electrodes and the surfactant to stabilize the emulsion-based slurry.

Figure 5A:
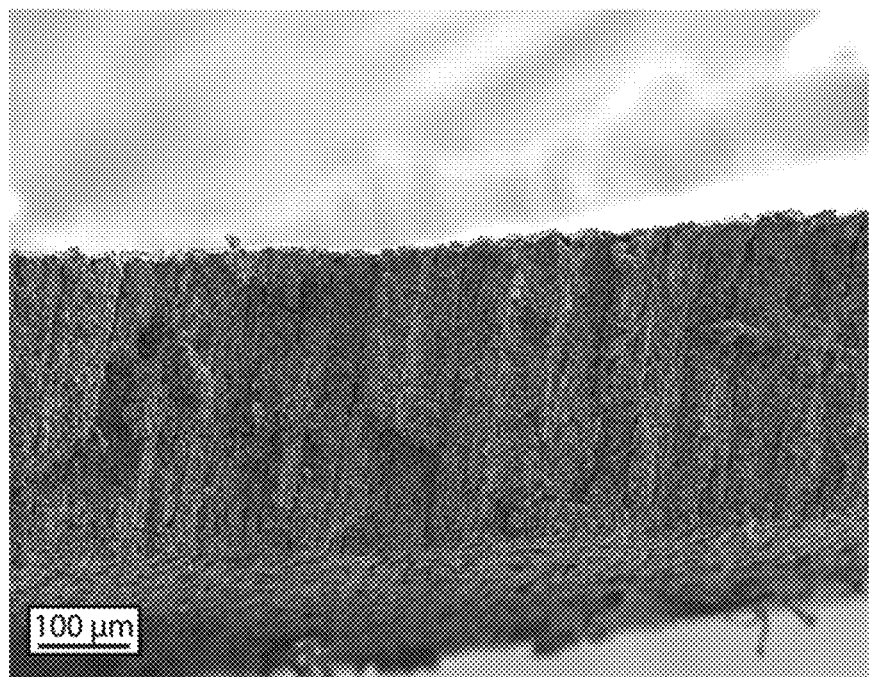
FIGS. 5A-5B are, according to certain embodiments, micrographs of an exemplary electrode.
Figure 5B:
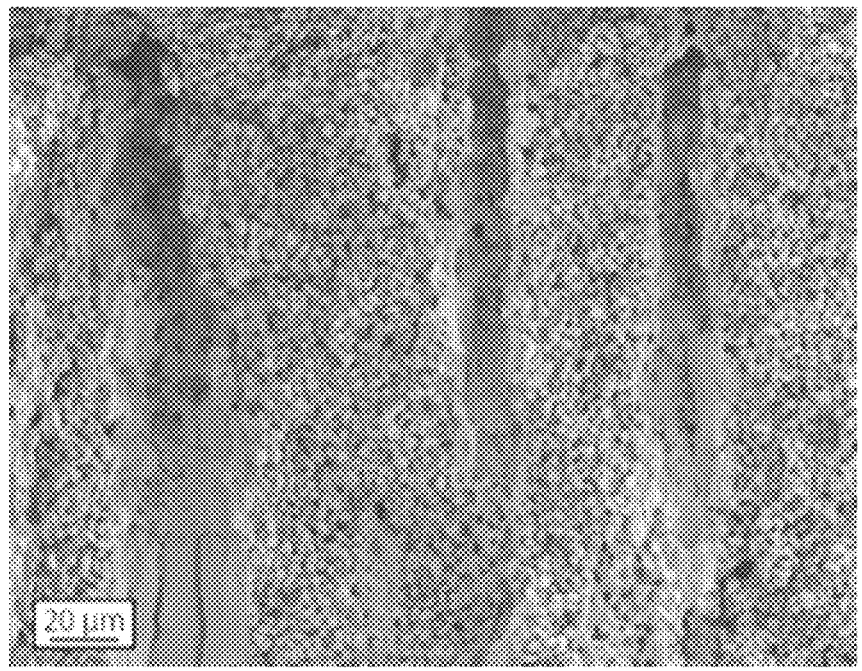

FIG. 5A is a micrograph of an exemplary electrode produced according to this example. FIG. 5B is a magnified micrograph of the exemplary electrode shown in FIG. 5A. The electrode shown in FIGS. 5A-5B was not sintered.

Electrochemical cells were assembled in which electrodes similar to that shown in FIGS. 5A-5B were used as the cathode. The electrodes were assembled in a 2032 coin cell, against a lithium metal anode, using a 1M $LiPF_6$ solution in ethylene carbonate and dimethyl carbonate (EC/DMC, 1:1 volume ratio) as an electrolyte.

Figure 5C:
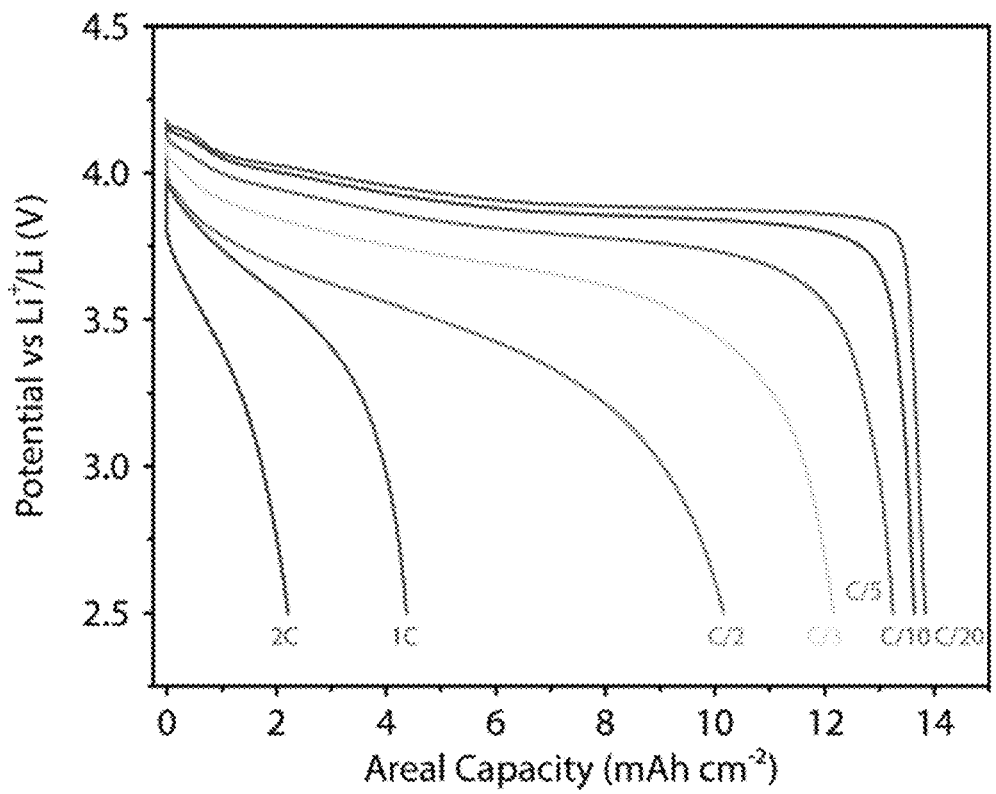
FIG. 5C is a plot of potential as a function of areal capacity for an electrochemical cell comprising an $LiCoO_2$ based cathode, according to some embodiments.

FIG. 5C is a plot of potential as a function of areal capacity for an electrochemical cell comprising an $LiCoO_2$ based cathode fabricated according to this example. As may be observed from FIG. 5C, $LiCoO_2$-based cathodes with aligned pores delivered an areal capacity in excess of 10 $mAh/cm^2$ even at C/2 rate. (The theoretical capacity of such cells is about 14 $mAh/cm^2$).

Figure 5D:
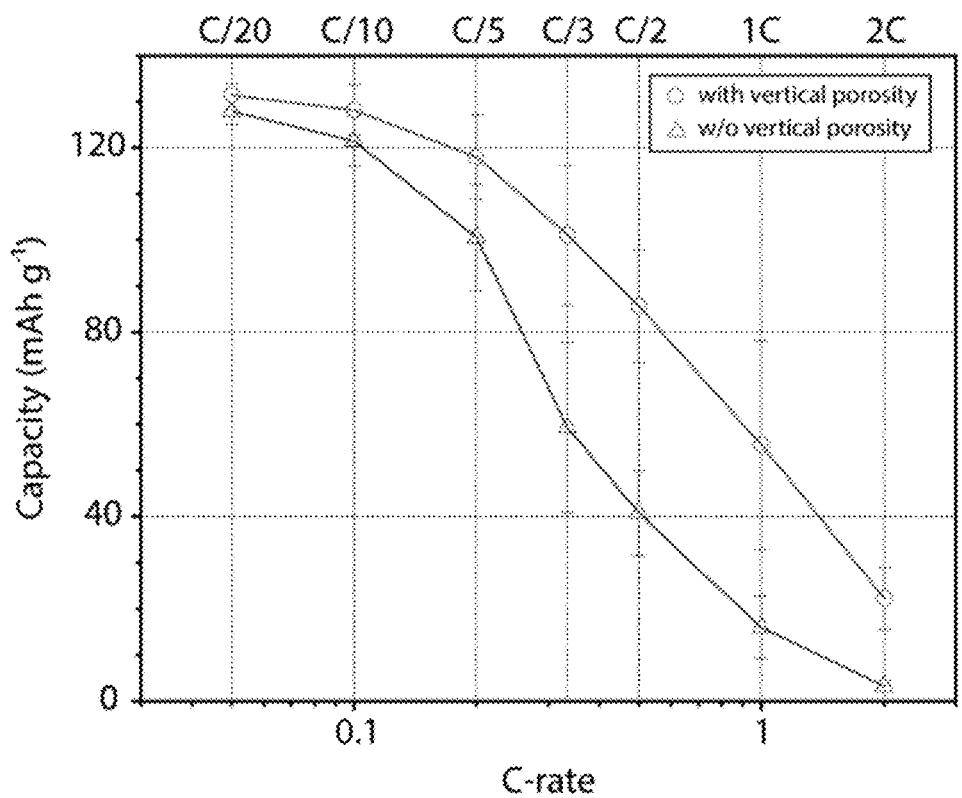
FIG. 5D is an exemplary plot of capacity as a function of C-rate for two types of electrochemical cells.

FIG. 5D is a plot of capacity as a function of C-rate for two types of electrochemical cells, one type comprising an $LiCoO_2$ based cathode fabricated according to this example (and which includes vertically aligned pores) and a second type comprising an $LiCoO_2$ based cathode having a similar composition but without magnetic-field induced vertical porosity. The electrodes were 430 to 450 microns thick, and the theoretical capacities of the corresponding cells were about 14 $mAh/cm^2$. Four samples of each type were tested. As shown in FIG. 5D, the electrochemical cell comprising the cathode with vertically aligned pores exhibited substantial improvement in performance.

Figure 5E:
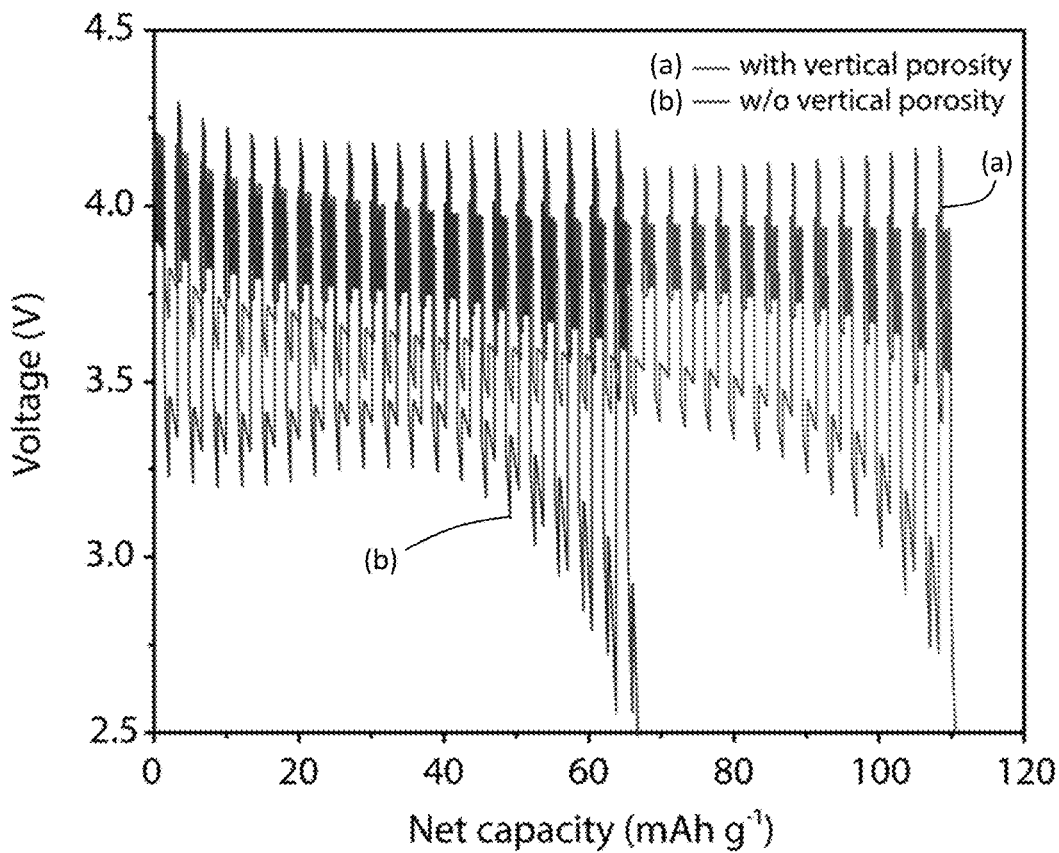
FIGS. 5E-5F are exemplary plots of results obtained from dynamic stress tests (DST) of cells containing cathodes with and without aligned pores.
Figure 5F:
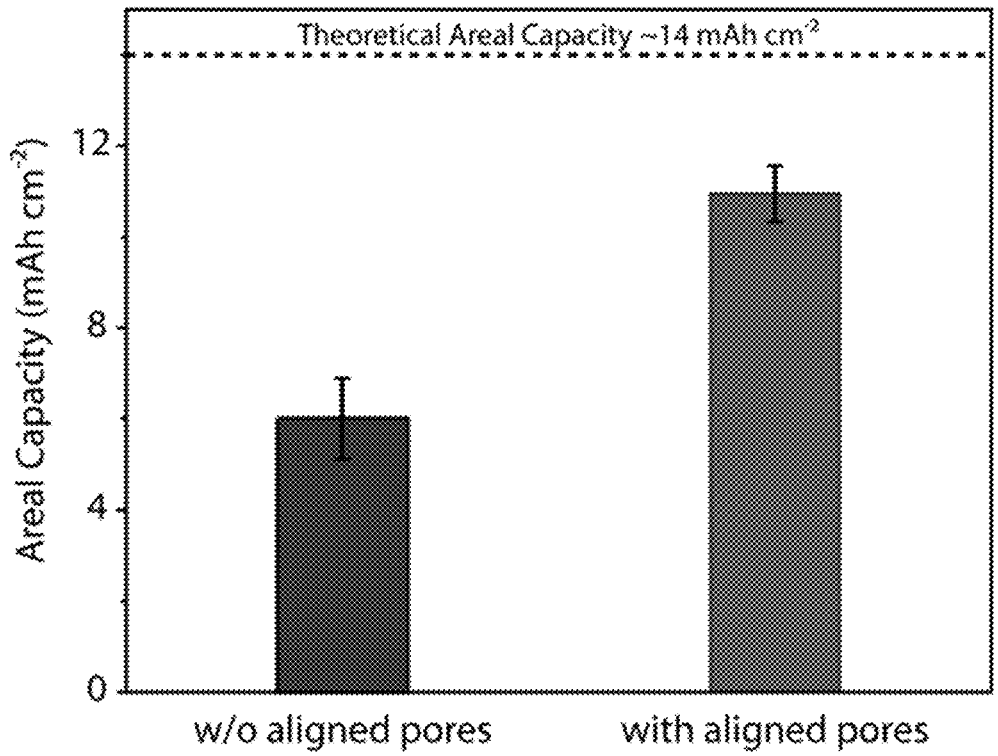

FIGS. 5E-5F includes plots of results obtained from dynamic stress tests (DST) of cells containing cathodes with and without aligned pores. In these dynamic stress tests, the maximum discharge was 2C, the maximum charge rate was 1C, and the peak power was above 700 W/kg. FIG. 5E is a plot of voltage as a function of net capacity, and FIG. 5F is a graph of the mean areal capacities of the electrode with and without aligned pores. The cells including electrodes with aligned pores exhibited a mean areal capacity of 11.2 mAh/cm$^2$ and those with unaligned pores exhibited a mean areal capacity of 6.5 mAh/cm$^2$.

Additional cathodes were fabricated in which sodium carboxymethyl cellulose (CMC-Na), sodium alginate, and polyacrylic acid (PAA) were used as binders (in place of the PVA described above). The CMC-Na, sodium alginate, and PAA did not substantially stabilize the emulsion, and their use, without PVA, produced relatively poor results.

Example 2

This example describes the use of magnetic fields in the production of porous electrodes. In particular, this example describes the preparation of low-tortuosity thick MesoCarbon MicroBeads (MCMB) graphite electrodes using magnetic fields.

240 mg of jet-milled MCMB graphite powders were first thoroughly mixed with 2 mg acetylene black (Alfa Aesar). Then, 255 mg 5 wt % polyvinyl alcohol (PVA, Miwiol 40-88, Mw~205000, 88% hydrolyzed) aqueous solution, 250 μL deionized water, and 35 μL ethanol were added. Addition of ethanol facilitated dispersion of the acetylene black nanoparticles. The resulting suspension was sonicated using a bath sonicator for 20 min before 30 μL of oil-based ferrofluid (EMG905, Ferrotec) was added. Microemulsions were made using a probe sonifier (Branson S250A) for 4 pulses at intensity of 2, 20% duty cycle. The microemulsions included droplets of the oil-based ferrofluid within the surrounding aqueous suspension (comprising the MCMB, acetylene black, PVA, and ethanol, in addition to water). The as-prepared suspension/emulsion was casted into a silicon mold, which was placed 0.5 inch above a 2.54 cm×2.54 cm by 1.27 cm Neodynium block magnet (BY0Y08, K&J magnetics) and dried overnight at room-temperature to make electrodes. After drying, the MCMB graphite/Carbon/PVA electrodes were rinsed with solvent and dried at 110° C. overnight.

Figure 6A:
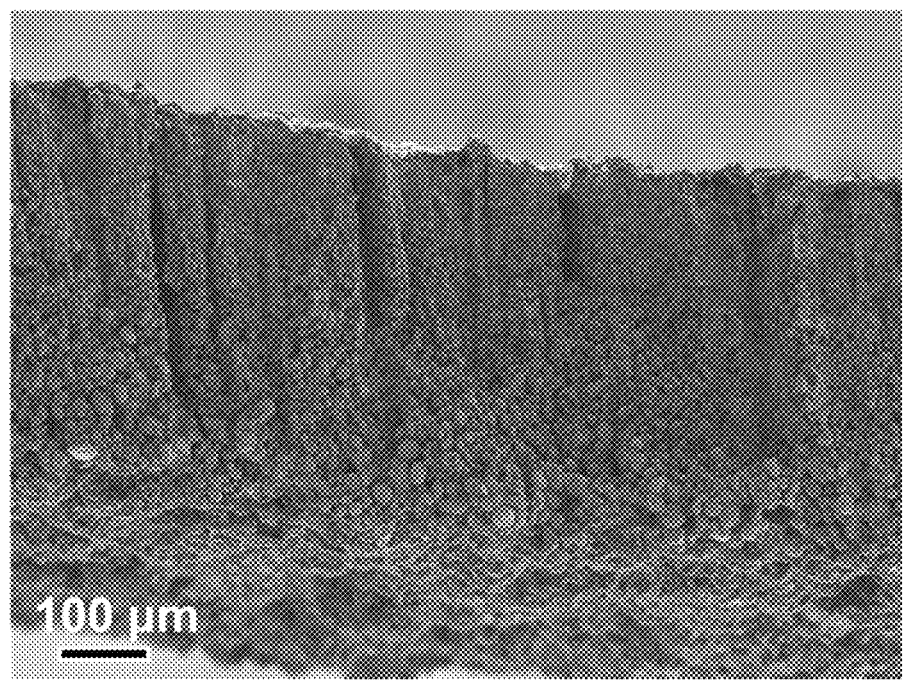
FIG. 6A is a micrograph of an exemplary electrode, according to certain embodiments.

FIG. 6A is a micrograph of an exemplary electrode produced according to this example. The electrode shown in FIG. 6A was not sintered.

Figure 6B:
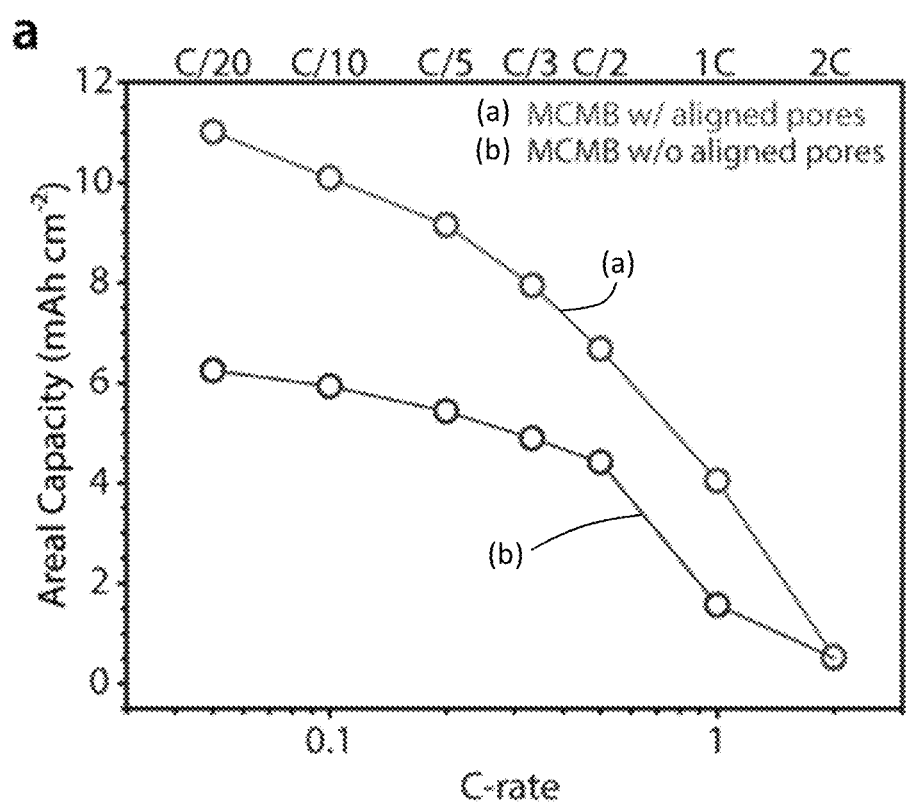
FIG. 6B is a plot of areal capacity as a function of C-rate for tested electrochemical cells comprising electrodes with aligned pores and tested electrochemical cells comprising electrodes without aligned pores.

Electrochemical cells were assembled in which electrodes similar to that shown in FIG. 6A were used as the cathode. The electrodes were assembled in a 2032 coin cell, against a lithium metal anode, using a 1M LiPF$_6$ solution in ethylene carbonate and dimethyl carbonate (EC/DMC, 1:1 volume ratio) as an electrolyte. FIG. 6B is a plot of areal capacity as a function of C-rate for electrochemical cells comprising electrodes with aligned pores and electrochemical cells comprising electrodes without aligned pores. As can be seen in FIG. 6B, electrochemical cells comprising electrodes with aligned pores demonstrated areal capacities greater than 10 mAh/cm$^2$.

Example 3

This example describes the creation of low tortuous pore channels in a LiCoO$_2$ matrix via chaining of magnetic emulsion droplets in an electrode matrix. One set of experiments involved chaining magnetic emulsion droplets in a sintered electrode matrix. Another set of experiments involved chaining of magnetic emulsion droplets in an electrode matrix that can be consolidated without sintering.

Chaining of Magnetic Emulsion Droplets in a Sintered Electrode Matrix

LiCoO$_2$ electrodes with aligned pore channels were produced by chaining of ferrofluid emulsion droplets. A 20 μl ferrofluid (EFH 1, Ferrotec, Bedford, N.H.) was emulsified in 300 μl water+5 wt % PVA (50,0000 g/mol, Sigma Aldrich) using an ultra sonic probe (Branson Scientific, 10 seconds, 20% duty cycle, intensity 1) (See FIG. 7A). PVA acted as a stabilizer for the emulsion droplets, as well as a binder in the final electrode green body. The emulsion was mixed with 300 μl of a 50 wt % LiCoO$_2$ suspension in water. The mixture was cast in a PDMS mold on top of a 2.5 cm$^2$ neodymium block magnet (K&J magnetics Inc.). After at least 24 h the water and ferrofluid solvent has been evaporated. The electrodes were sintered between 975° C. and 1000° C. for 6 h with a heating rate of 9° C./min and a 2 h hold at 500° C. in order to burn out the rods and binder.

Figures 7A, 7B:
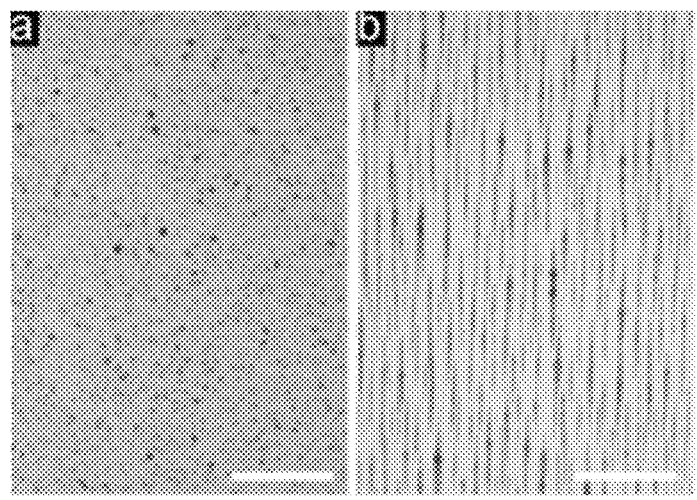
FIGS. 7A-7E are images of ferrofluid emulsion droplets in water (A) before and (B) after aligning them in a vertical field (scale bars 200 μm).
Figures 7C, 7D:
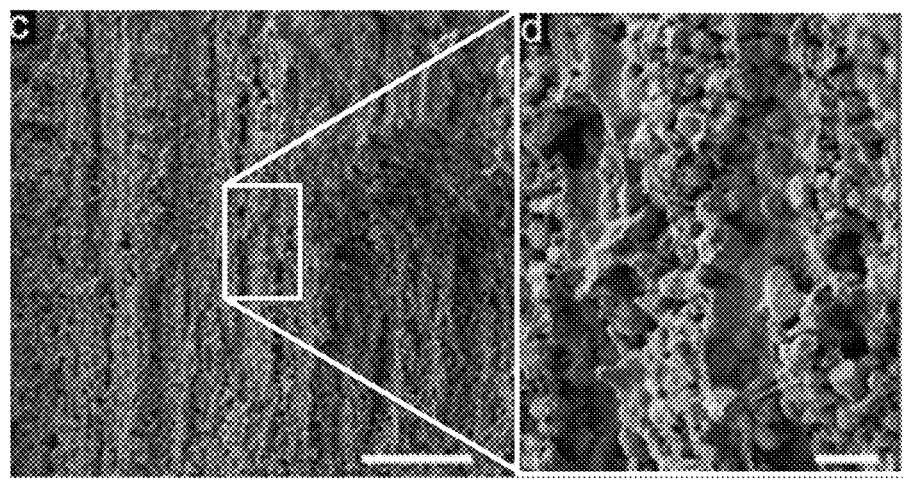
Figure 7E:
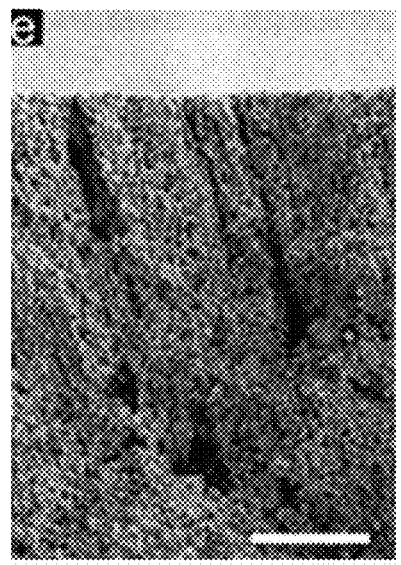

FIGS. 7A and 7B are micrographs of ferrofluid emulsion droplets in water (A) before and (B) after aligning them in a vertical field (scale bars 200 μm). FIG. 7A shows very stable droplets of an oil based ferrofluid in water that can be chained in an external magnetic field without coalescing (See FIG. 7B). If such droplets are mixed with LiCoO$_2$ particles and chained up the anisotropic structure can be preserved while the electrode is dried (see FIGS. 7C and 7D) and sintered (see FIG. 7E). FIGS. 7C-7E show the LiCoO$_2$ electrode with vertically aligned pores (C and D) after removal of the solvent (scale bars 50 μm and 5 μm) and (E) after sintering (scale bar 100 μm).

Figure 8A:
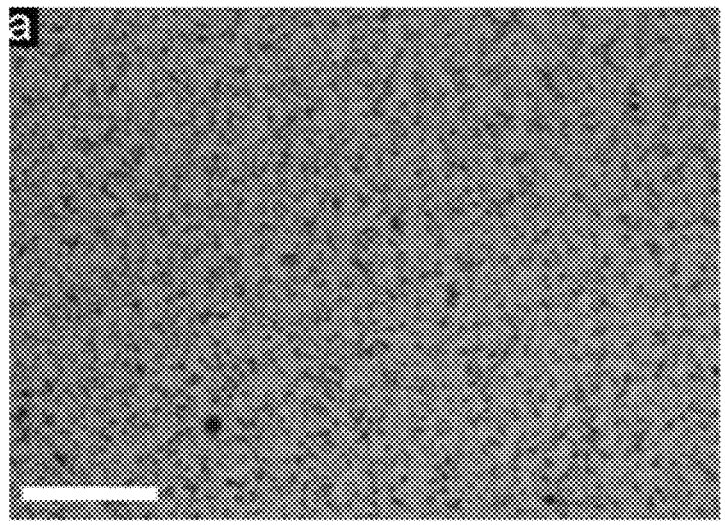
FIGS. 8A-8B show emulsion droplets of an oil-based ferrofluid stabilized with pluronic F-120 in DMSO with 4 wt % PVDF binder (A) without a field and (B) after chaining in a vertically applied magnetic field.
Figure 8B:
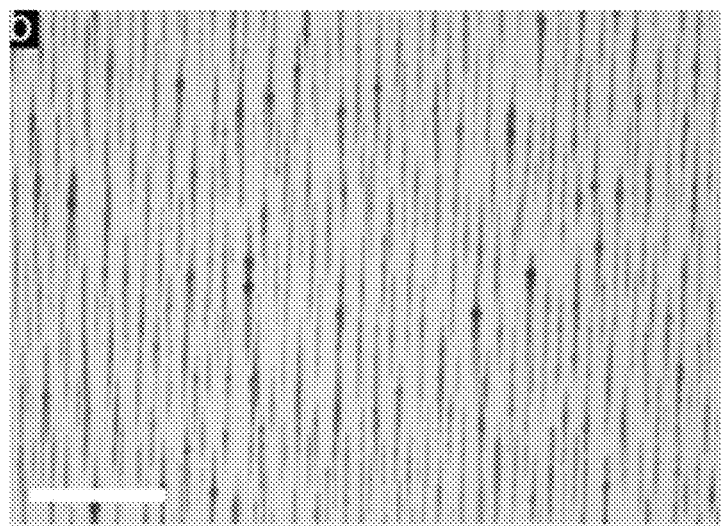

Chaining of Magnetic Emulsion Droplets in an Electrode Matrix that can be Consolidated without Sintering Not all electrode particles can be sintered and therefore it is important to demonstrate creation of anisotropic porosity in a conventional composite electrode. According to certain embodiments, key requirements to create anisotropic porosity in electrodes by chaining of magnetic droplets are the stability of the ferrofluid emulsion in the solvent and the solubility of an electrochemically stable binder in the same solvent. A commonly used binder for LiCoO$_2$ composite electrodes is PVDF (polyvinylidene fluoride). A stable emulsion of oil-based ferrofluid in DMSO (Dimethyl sulfoxide, Sigma Aldrich, USA) with 4 wt/vol % dissolved PVDF as battery binder and 1 wt % pluronic F-120 (Sigma Aldrich, USA) as surfactant was created using an ultrasonic probe (see FIG. 8A). FIGS. 8A-8B show emulsion droplets of an oil-based ferrofluid stabilized with pluronic F-120 in DMSO with 4 wt % PVDF binder (A) without a field and (B) after chaining in a vertically applied magnetic field. As shown in FIG. 8B, the emulsion was very stable even upon application of an external magnetic field of several hundred Gauss. In FIG. 8B the chaining of the emulsion droplets can be observed. Similarly to the experiments involving chaining of magnetic emulsion droplets in a sintered electrode matrix, this emulsion can be used for creation of anisotropic porosity by mixing it with LiCoO$_2$ particles and drying the emulsion in a magnetic field. If DMSO is used as a solvent, in certain cases, the mixture has to be dried at slightly elevated temperatures (e.g., about 60° C.). Experiments showed that the emulsions were stable at this temperature. After evaporation of DMSO, the electrode can be transferred to kerosene in order to remove most of the iron oxide. Due to the electrochemical stability of the binder, this electrode can directly be used in a battery without sintering.

Example 4

This example describes the fabrication and electrochemical testing of low-tortuosity electrodes.

A set of electrodes was fabricated by forming magnetic emulsion droplets in an electrode material suspension, applying a magnetic field, consolidating the matrix, and sintering the electrode. Magnetic emulsion droplets were made using dispersions of super paramagnetic iron oxide nanoparticles in a hydrocarbon oil (EFH, Ferrotec) that is emulsified in water with 1 wt % polyvinyl alcohol (PVA). The PVA acted as both an emulsion stabilizer and as a binder for the electrode green body. Under an applied magnetic field, the magnetic emulsion droplets developed dipole moments that generated magnetic fields. These dipole fields scaled with the external field and exhibited local gradients that applied force onto neighboring droplets. The energetic minimum for the droplets was to chain in the direction of the applied magnetic field. With PVA as the stabilizer, no coalescence events were observed at fields up to 1000 Oe.

To texture the LCO electrode with magnetic droplets, the magnetic oil phase was directly mixed with the $LiCoO_2$ particle slurry in the presence of PVA. Briefly, the suspension was hand-mixed and emulsified via ultrasonication to create small magnetic droplets. The sonicated solution was then mold-casted and subjected to an external magnetic field that had a strong gradient. The mag-droplets chained under the external field and the solution consolidated into an electrode green body overnight during solvent evaporation. The magnetic permeability of the LCO particles was orders of magnitude lower than the magnetic droplets and did not significantly affect the assembly process. FIGS. 9A-9C show cross sections of sintered LCO electrodes with anisotropic pores that were created using magnetically chained emulsion droplets as pore templates. Polydispersity of magnetic droplets, when present, led to pore structures of lower uniformity, compared to the uniformity observed when magnetic micro-rods were used as the sacrificial template. However, even the non-uniform pore channels produced when magnetic emulsion droplets were employed were continuous through several hundreds of microns of the electrode (FIGS. 9A and 9C). Additionally, the use of magnetic emulsion droplets to produce low-tortuosity electrodes provides geometric flexibility and is amenable to non-sintered fabrication routes, since the solvent of the sacrificial magnetic emulsion phase can simply be evaporated.

Previous results of low tortuous batteries that have dual scale porosity showed that the spacing of the pore channels is important to improve the battery tortuosity. At high channel spacing, electrochemical ions generally have to diffuse long distances in the horizontal direction through the micro porosity before they reach a channel where they are then transported vertically to the current collector. Thus, the effective pathway can still be longer than direct vertical transport through a highly-tortuous, micro-porous but relatively thin electrode.

Figure 10A:
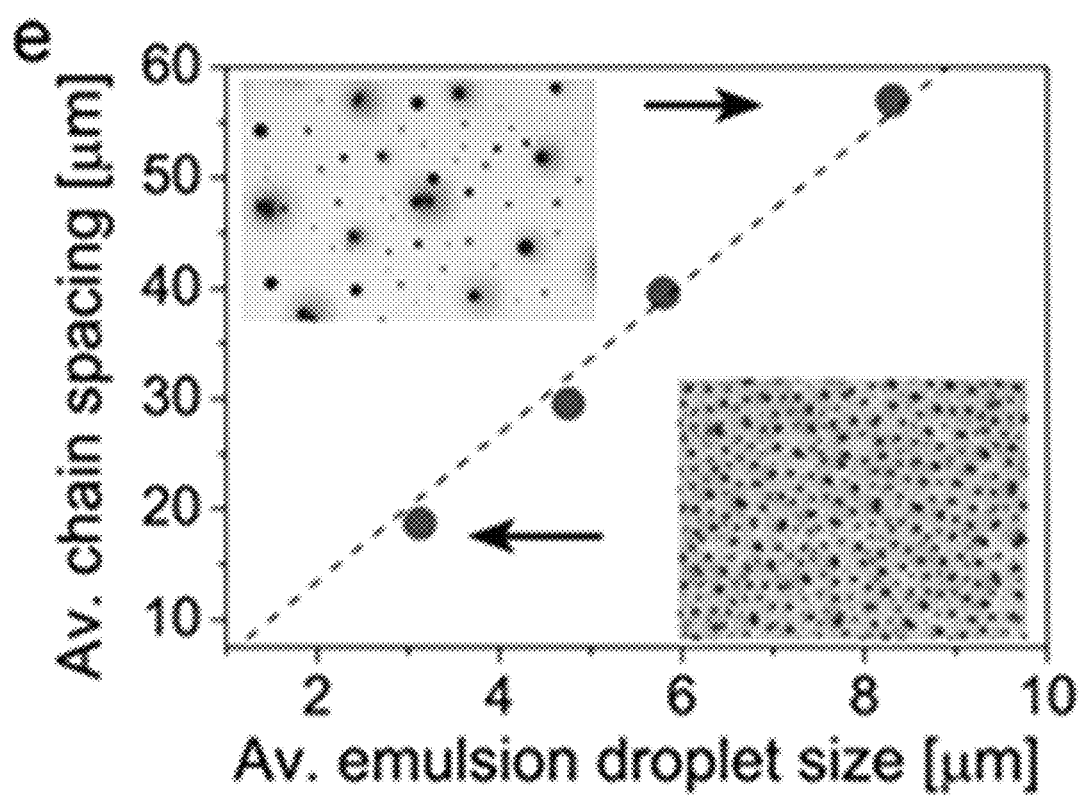
FIGS. 10A-10D are, according to some embodiments, (A) a plot of average chain spacing as a function of the average emulsion droplet size in water (The insets show top views on vertically chained emulsions, with the dashed line indicating the theoretical dependency for hexagonally packed chains); (B and C) top views of sintered LCO electrodes with anisotropic pore channels made by magnetically chained emulsions with (B) larger and (C) smaller average emulsion droplet size (scale bars: 50 μm, 50 μm and 10 μm, respectively); (D) a plot of areal capacity vs. discharge rate for 280 μm-290 μm thick electrodes with aligned pores made by magnetically chained emulsions (30-33% total porosity).
Figure 10B:
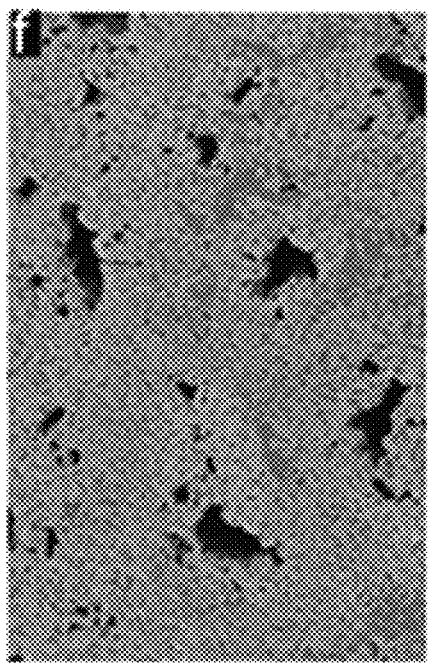
Figure 10C:
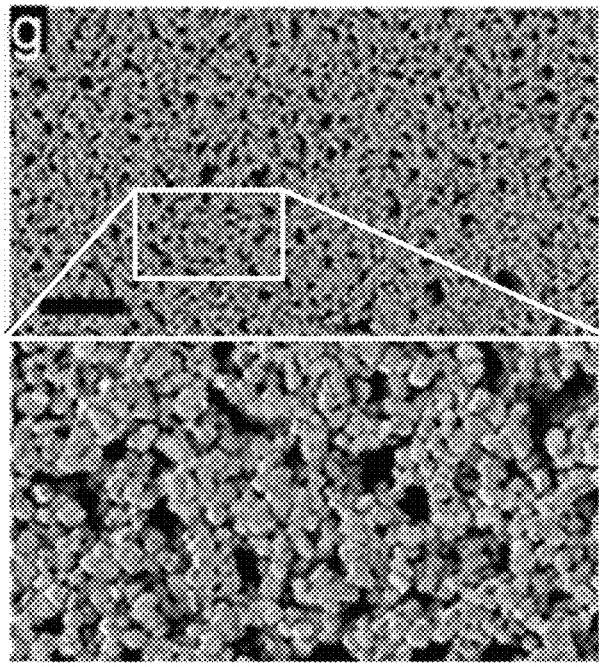
Figure 10D:
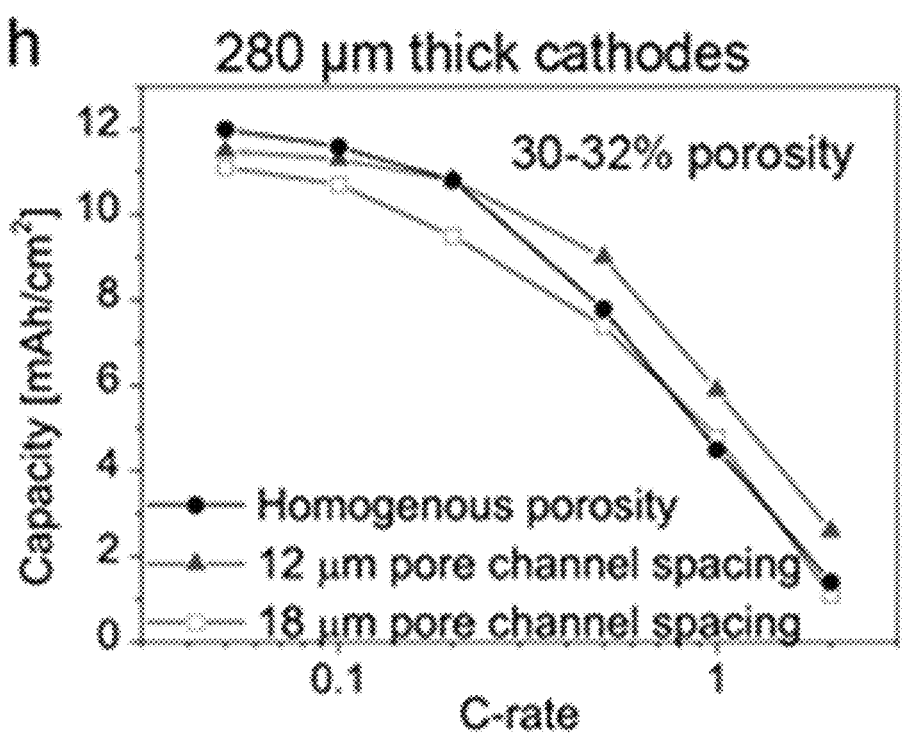
Figure 11A:
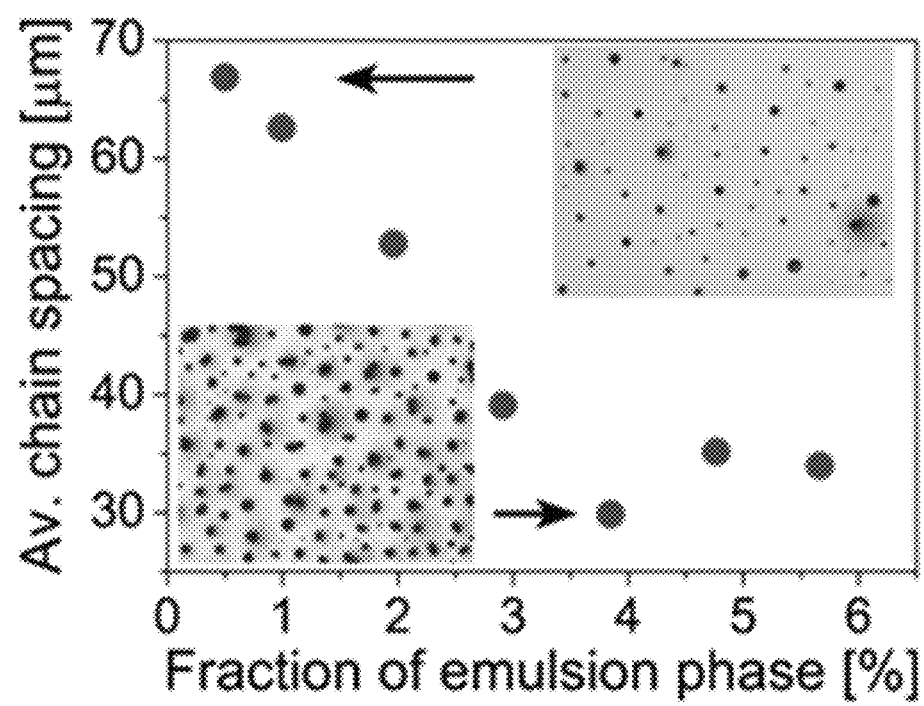
FIGS. 11A-11B are, according to certain embodiments, (A) a plot of average chain spacing as a function of the fraction of emulsion phase in water, with the insets showing top views of vertically chained emulsions; (B) top views of sintered LCO electrodes with anisotropic pore channels made by magnetically chained emulsions.
Figure 11B:
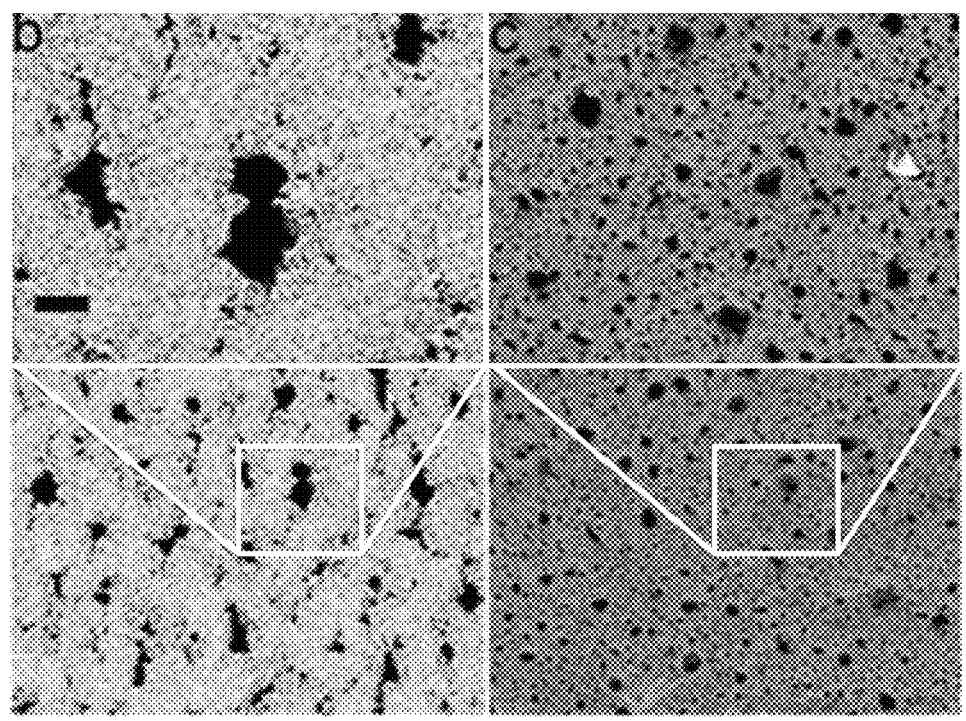
Figure 12A:
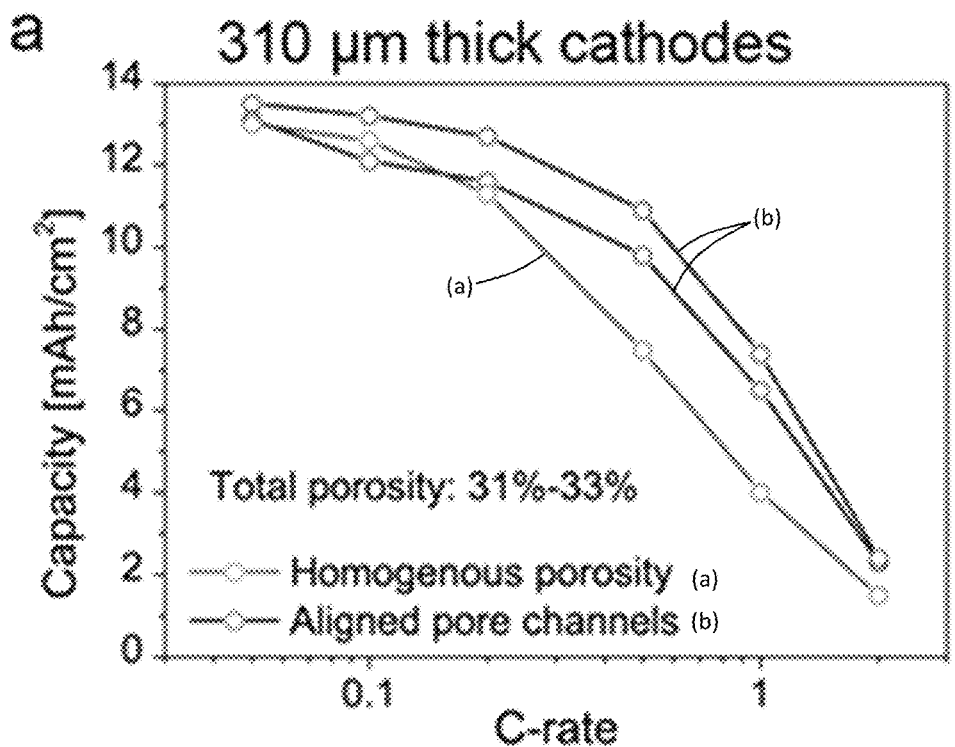
FIGS. 12A-12B are, according to some embodiments, (A) a plot of areal capacity vs discharge rate for 310 μm thick electrodes with aligned pores made by magnetically chained emulsions; and (B) an SEM cross-section, taken before polishing, through one of the sintered LCO cathodes that was tested in (A).
Figure 12B:
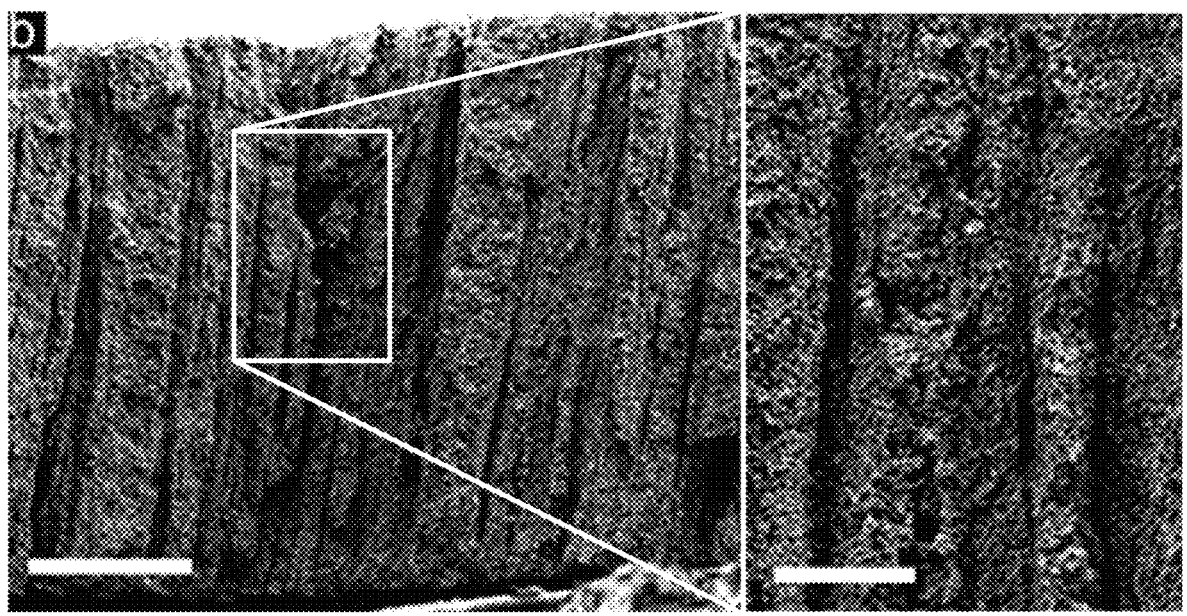

For electrodes in which oriented pores are made by magnetic chaining of emulsion droplets, the final microstructure can be controlled using the average emulsion droplet size and the fraction occupied by the magnetic emulsion phase. Since the maximum chain length can be constrained by the bottom of the mold and the solvent-air interface, smaller droplets at fixed concentration of the magnetic oil phase generally leads to more and thinner chains. This was demonstrated by chaining magnetic emulsion droplets of different average size in pure water within a fluid cell that has a thickness of about 130 μm (FIG. 10A). Since the chains experienced a slight repulsion from each other in the vertical direction, they tended to assemble in a hexagonal-like pattern. Although the emulsions made by ultrasonication were very polydisperse, a clear trend to shorter chain spacing was still observed with smaller droplets. Similarly, a higher concentration of the magnetic oil phase will lead to more chains that are distributed closer together (See FIG. 11A). The electrode slurry with the magnetic emulsion droplets did, in certain cases, differ considerably from the idealized case due to the polydispersity of the droplets and the fact the chains have a finite mobility that decreases with growth of the chains. This led to more pronounced aggregation of several chains, especially when the concentration of the emulsified phase is increased (FIG. 11A-11B). However, one can compensate for this effect. For instance, if the LCO slurry with the magnetic oil phase is subjected to longer ultrasonic treatment, the average emulsion droplet size is decreased and thus the final sintered electrode has thin pore channels with low average spacing (FIG. 10B-10C). When these electrodes were tested against lithium, very high discharge capacitates were obtained, of about 12 mAh/cm$^2$ and 13.5 mAh/cm$^2$ for 280 μm and 300 μm thick samples, respectively (FIGS. 10D and 12A-12B) at moderate rates. At higher rates, electrodes with closer channels exhibited better performance due to lower overall tortuosity (FIG. 10D). Recent results demonstrated that both the channel spacing and the overall fraction of porosity devoted to the pore channels has an important impact on the effective tortuosity, especially for pore channel fractions below 10%. When the anisotropic pores were made by aligned emulsions, the fraction of channel pores with respect to the whole electrode area was typically 5-7%, while the best electrodes made by magnetically aligned nylon rods had a coverage of 8-10%. Further improvement can therefore be expected by increasing the concentration of the magnetic emulsion phase to increase chain aggregation and thus obtain thicker pore channels.

Figure 13A:
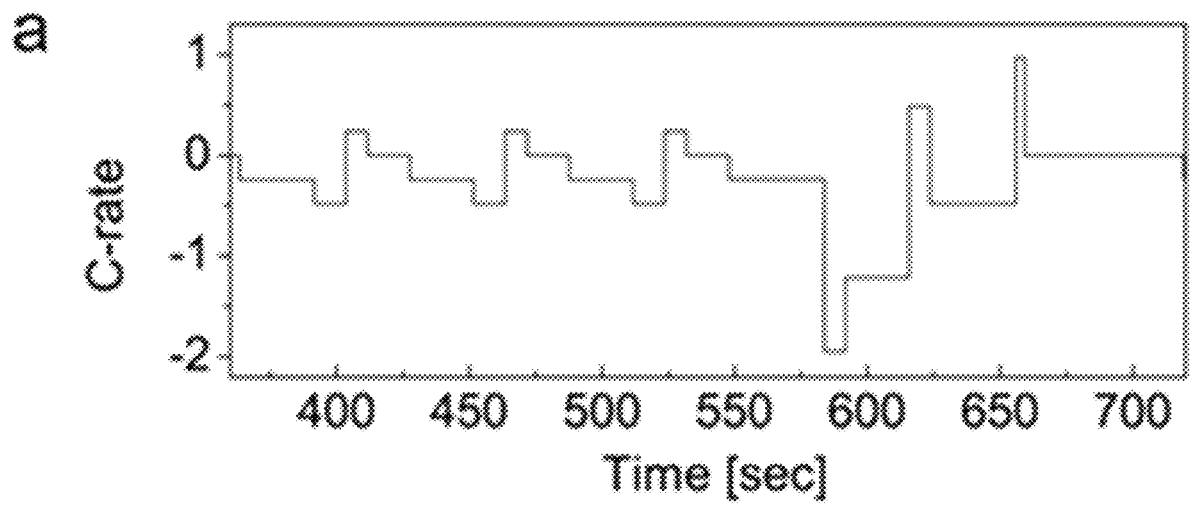
FIGS. 13A-13C are, according to certain embodiments, (A) a current prolife of a dynamic stress test used to simulate dynamic discharge, which is repeated until a lower voltage limit of 3V is reached; (B) a voltage vs time profile for an electrode with aligned pore channels and a reference electrode with homogenous porosity under the dynamic stress test condition; and (C) a voltage profile for the cells of (B) in terms of net capacity (discharge capacity minus charge capacity).
Figure 13B:
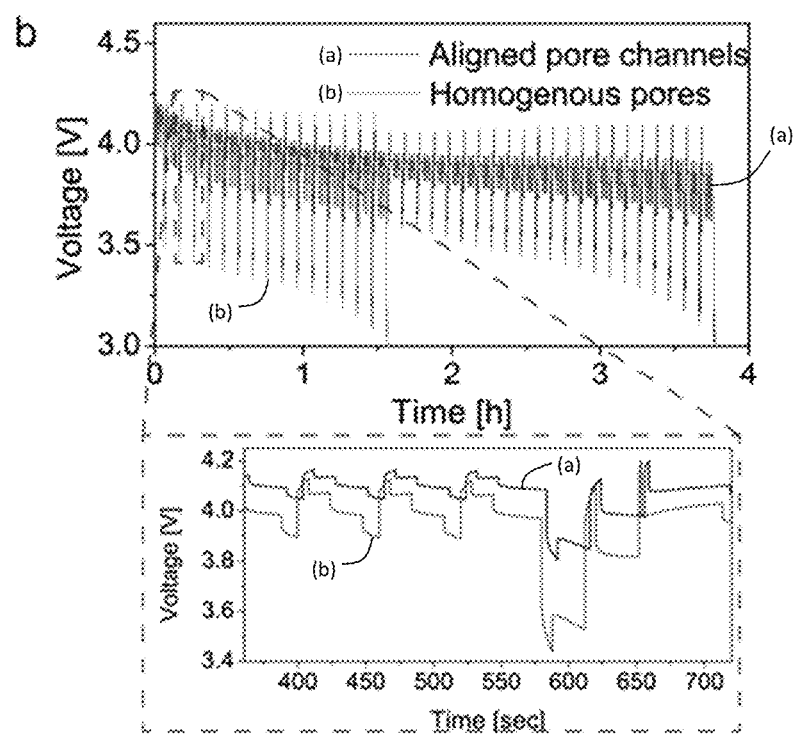
Figure 13C:
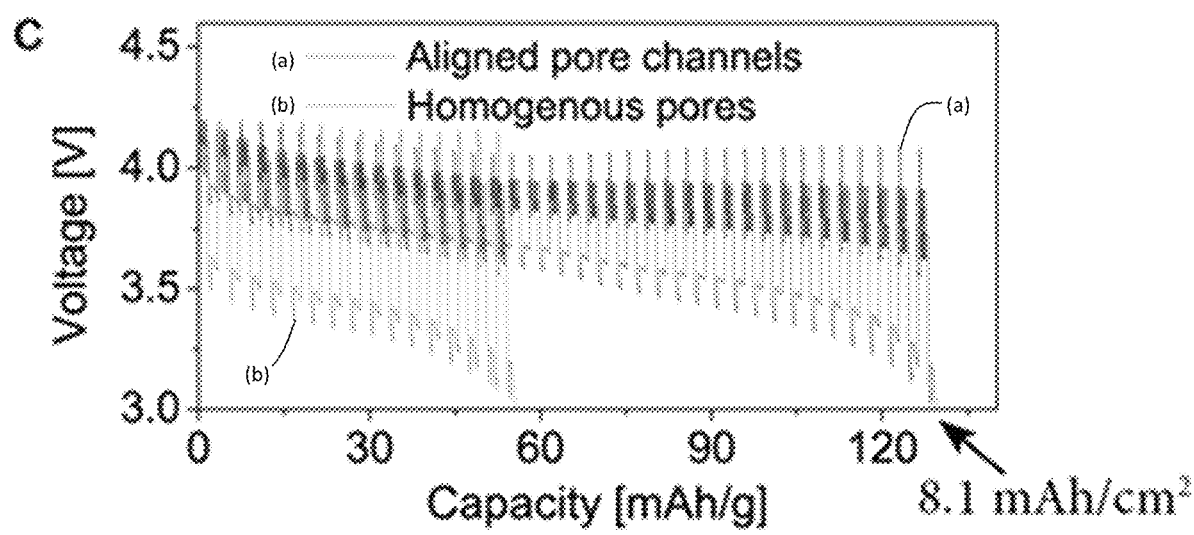
Figure 14A:
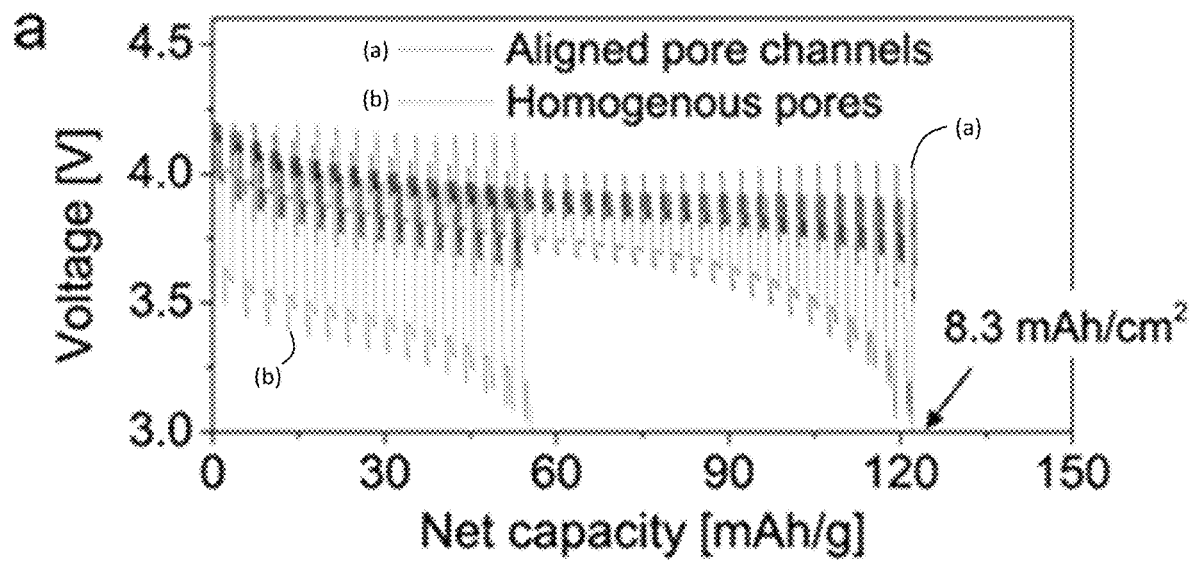
FIGS. 14A-14B are, according to some embodiments, (A) a plot of voltage v. net discharge capacity for a 210 µm thick electrode with aligned pore channels, compared to a similarly thick reference electrode with homogenous porosity; and (B) a plot of voltage vs. delivered net capacity during dynamic discharge. The short charging steps reduced the capacity and the discharge steps increased the capacity. The net capacity was taken to be the sum of all charge and discharge steps.
Figure 14B:
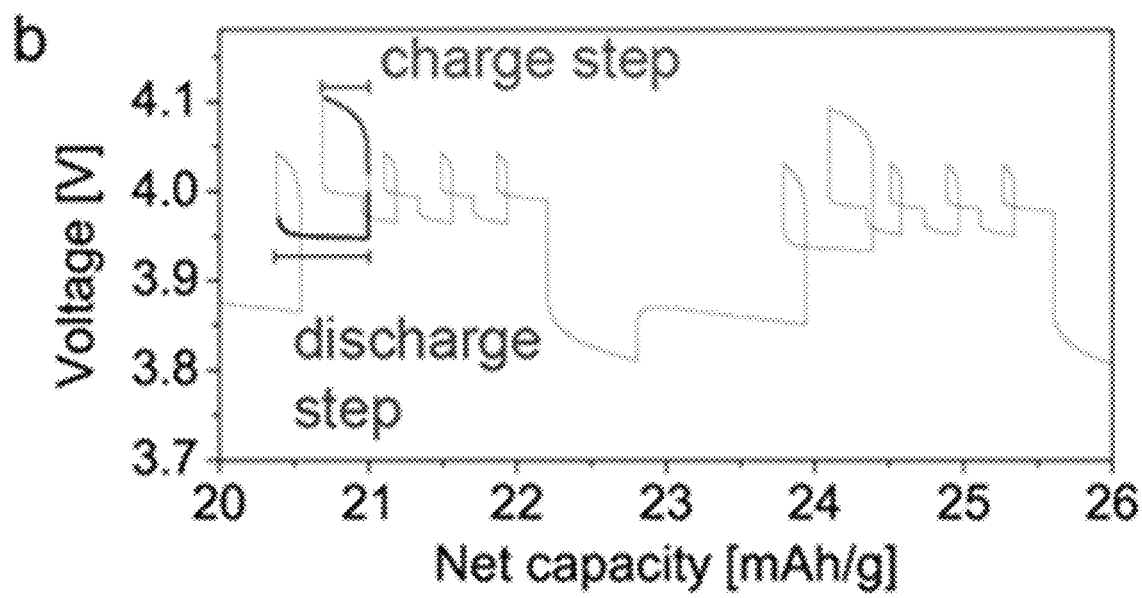

Increases in capacity at high rates can be detrimental in many applications. For instance, if batteries are utilized in electric vehicles, the discharge will generally not occur with a constant current, but rather, will exhibit a more complex current profile with high and medium current peaks (acceleration), lower currents (cruising), some rest steps and short charging instances (deceleration, breaking). These drive cycles vary considerably between urban driving and long distance driving, but the USABC has developed simplified tests that simulate this type of usage on batteries. FIG. 13A shows the current profile of the test protocol that is repeated until the lower voltage limit of 3V is reached. For convenience, the power ratings are transferred into C-rates. The maximum power used in this test is selected to satisfy the USABC 2020 EV battery goals (700 W/kg). The respective current or C rate was calculated by up-scaling electrodes with thickness of 200 μm to 220 μm to a full battery pack with separators, current collectors, and packaging. Since the electrodes fabricated according to certain of the embodiments described herein are thicker and use less current collector and separator, the peak power per gram of cathode is about 30% lower compared to a 100 μm composite electrode. As can be seen from FIG. 13B, electrodes with aligned pore channels show much better performance under such dynamic conditions, compared to a conventional, homogenously porous electrode. For a reference electrode with homogenous porosity, the high current pulses result in large drops of the cell voltage due to the high resistance, which is likely to be dominated by the ionic transport in the electrolyte. In contrast, cathodes with aligned pore channels have a lower tortuosity and thus are much more tolerant to these high rates, and as a result, they can be utilized more than two times as long and deliver over twice the capacity. The total delivered capacity of these cells reaches almost the theoretical maximum of 140 mAh/g (FIG. 13C). The capacity in FIG. 13C is displayed as net capacity which corresponds to the total discharge capacity minus capacity from the charging pulses (FIG. 14B). It is important to note that the areal capacities obtained from these 200-220 µm thick binder free cells with aligned pores is as high as 8.1-8.3 mAh/cm$^2$, which is more than double the areal capacity a conventional 100 µm composite cathode would deliver, even if the theoretical maximum could be reached (FIG. 14A).

In conclusion, the results of this example demonstrate a strong improvement of electrode performance for $LiCoO_2$ electrodes by introducing aligned pore channels that are templated with magnetically aligned sacrificial phases. The aligned pore channels lower the effective tortuosity of the electrodes and thus allow us to make electrodes that are much thicker than conventional cathodes but still deliver high capacities at high rates. Being able to make thick electrodes with high rate capability is an effective way to reduce the cost and increase the energy density of batteries in many applications such as electric vehicles. In this context, we show that under dynamic discharge profiles that might reflect the drive cycles of EVs more realistically than a constant discharge, electrodes with aligned pore channels deliver capacities above 8 mAh/cm$^2$. This is more than two times more than a reference electrode with homogenous porosity was able to deliver and a multiple of what can be obtained from conventional thin electrodes made from the same material. The use of magnetic fields for introducing the aligned pores channels into the electrodes is particularly interesting, since they can be scaled over large areas and thus are very attractive for industrial battery production.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
exposing a matrix comprising a fluid and emulsion droplets within the fluid to a magnetic field such that the magnetic field causes at least a portion of the emulsion droplets to chain; and
at least partially removing the fluid and/or the emulsion droplets from the matrix to form anisotropic pores within the matrix,
wherein at least one of the fluid and the emulsion droplets contain water and a water-soluble liquid alcohol.

2. The method of claim 1, wherein:
the emulsion droplets contain water and a water-soluble liquid alcohol, and
at least partially removing the fluid and/or the emulsion droplets from the matrix comprises at least partially removing the fluid to form anisotropic pores within the matrix.

3. The method of claim 1, wherein:
the fluid contains water and a water-soluble liquid alcohol, and
at least partially removing the fluid and/or the emulsion droplets from the matrix comprises at least partially removing the emulsion droplets to form anisotropic pores within the matrix.

4. A method, comprising:
exposing a precursor composition of a porous article to a magnetic field which causes longitudinal axes of elongated regions of emulsion droplets within a fluid of the precursor to become substantially aligned with each other;
consolidating the composition; and
at least partially removing the fluid and/or the elongated regions of the emulsion droplets from the composition, thereby forming the porous article,
wherein the emulsion droplets and/or the fluid comprise a mixture comprising water and a water-soluble liquid alcohol.

5. The method of claim 1, wherein the water-soluble liquid alcohol comprises a carbon chain length of up to 10 carbon atoms.

6. The method of claim 1, wherein the water-soluble liquid alcohol comprises at least one of methanol, ethanol, propanol, and butanol.

7. The method of claim 1, wherein the water-soluble liquid alcohol comprises ethanol.

8. The method of claim 1, wherein the matrix further comprises a conductive additive.

9. The method of claim 8, wherein the conductive additive comprises carbon black.

10. The method of claim 1, wherein the ratio of water to the sum of the water-soluble liquid alcohols in the matrix is at least 2:1, by weight, during at least a portion of the time prior to the at least partially removing the fluid and/or the emulsion droplets.

11. The method of claim 4, wherein forming the porous article is performed in the substantial absence of sintering.

12. The method of claim 1, wherein the emulsion droplets comprise a magnetic fluid.

13. The method of claim 1, wherein the matrix contains electrode material.

14. The method of claim 13, wherein the electrode material comprises $Li(Ni,Co,Al)O_2$, an $LiMnO_3$—$LiMO_2$ alloy, and/or graphite.

15. The method of claim 1, wherein exposing the matrix to the magnetic field causes emulsion droplets in the matrix to form multiple chains having longitudinal axes that are substantially aligned with each other.

16. The method of claim 3, wherein at least partially removing the emulsion droplets from the matrix comprises evaporating emulsion droplet material from the matrix.

17. The method of claim 3, wherein at least partially removing the emulsion droplets from the matrix comprises washing the emulsion droplets with a solvent.

18. The method of claim 3, comprising, prior to at least partially removing the emulsion droplets, consolidating the matrix.

19. The method of claim 1, wherein the matrix further comprises polyvinyl alcohol.

20. A method, comprising:
exposing a matrix comprising a fluid and emulsion droplets within the fluid to a magnetic field such that the magnetic field causes at least a portion of the emulsion droplets to chain; and
at least partially removing the fluid and/or the emulsion droplets from the matrix to form anisotropic pores within the matrix,
wherein at least one of the fluid and the emulsion droplets contain polyvinyl alcohol.

* * * * *